(12) United States Patent
Satou et al.

(10) Patent No.: US 9,029,045 B2
(45) Date of Patent: May 12, 2015

(54) GAS DIFFUSION ELECTRODE AND PRODUCTION METHOD FOR SAME; MEMBRANE ELECTRODE ASSEMBLY AND PRODUCTION METHOD FOR SAME

(75) Inventors: Kazuyuki Satou, Yokohama (JP); Atsushi Ohma, Yokohama (JP); Yoshitaka Ono, Yokohama (JP); Hiroshi Iden, Yokosuka (JP); Kei Sakai, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 551 days.

(21) Appl. No.: 13/379,204

(22) PCT Filed: Jun. 25, 2010

(86) PCT No.: PCT/JP2010/060826
§ 371 (c)(1),
(2), (4) Date: Dec. 19, 2011

(87) PCT Pub. No.: WO2010/150871
PCT Pub. Date: Dec. 29, 2010

(65) Prior Publication Data
US 2012/0094215 A1    Apr. 19, 2012

(30) Foreign Application Priority Data

Jun. 26, 2009  (JP) .................. 2009-151711
Jun. 26, 2009  (JP) .................. 2009-152442
Jun. 26, 2009  (JP) .................. 2009-153006

(51) Int. Cl.
*H01M 8/04* (2006.01)
*H01M 8/10* (2006.01)
*H01M 4/86* (2006.01)
*H01M 4/88* (2006.01)
*H01M 8/02* (2006.01)

(52) U.S. Cl.
CPC .......... *H01M 8/1004* (2013.01); *H01M 4/8605* (2013.01); *H01M 4/8652* (2013.01); *H01M 4/8657* (2013.01); *H01M 4/881* (2013.01); *H01M 4/8828* (2013.01); *H01M 4/8892* (2013.01); *H01M 4/8896* (2013.01); *H01M 8/0243* (2013.01); *H01M 8/0245* (2013.01); *Y02E 60/521* (2013.01)

(58) Field of Classification Search
None
See application file for complete search history.

(56) References Cited

U.S. PATENT DOCUMENTS 6,933,067 B2    8/2005  Kawahara et al.
7,232,627 B2    6/2007  Fukuda et al.
(Continued)

FOREIGN PATENT DOCUMENTS

CN    1601795 A    3/2005
CN    101174694 A    5/2008
JP    2001-93544 A   4/2001
(Continued)

*Primary Examiner* — Barbara Gilliam
*Assistant Examiner* — Adam A Arciero
(74) *Attorney, Agent, or Firm* — Foley & Lardner LLP

(57) ABSTRACT

[Object] To provide a gas diffusion electrode capable of a high current density operation of a fuel cell.
[Solving means] A gas diffusion electrode including a hydrophilic porous layer having an electrically conductive material and an ion conductive material; and a catalyst layer adjacent to the hydrophilic porous layer, wherein a water transport resistance of the hydrophilic porous layer is smaller than a water transport resistance of the catalyst layer.

32 Claims, 19 Drawing Sheets

(56) References Cited

U.S. PATENT DOCUMENTS

| | | | |
|---|---|---|---|
| 2002/0090543 A1* | 7/2002 | Okamoto | 429/44 |
| 2010/0056829 A1 | 3/2010 | Matsui et al. | |

FOREIGN PATENT DOCUMENTS

| | | |
|---|---|---|
| JP | 2001-198474 A | 7/2001 |
| JP | 2001 236976 A | 8/2001 |
| JP | 2002-42823 A | 2/2002 |
| JP | 2003-92112 A | 3/2003 |
| JP | 2006-4859 A | 1/2006 |
| JP | 3778506 B2 | 5/2006 |
| JP | 2006-286330 A | 10/2006 |
| JP | 2008-27810 A | 2/2008 |
| JP | 2008-98066 A | 4/2008 |
| JP | 2008-110340 A | 5/2008 |
| JP | 2008-198474 A | 8/2008 |
| JP | 2008-204664 A | 9/2008 |
| JP | 2008-276949 A | 11/2008 |

* cited by examiner

A

B

GAS DIFFUSION ELECTRODE AND PRODUCTION METHOD FOR SAME; MEMBRANE ELECTRODE ASSEMBLY AND PRODUCTION METHOD FOR SAME

TECHNICAL FIELD

This invention relates to a gas diffusion electrode and a production method thereof, and a membrane electrode assembly and a production method thereof.

BACKGROUND ART

In recent years, attention has been paid to fuel cells as electric sources for electric vehicles and stationary electric sources in concert with social requirements and movements on the background of energy and environmental problems. Fuel cells are classified into a variety of types according to kinds of electrolyte and kinds of electrode, in which typical examples include alkaline one, molten carbonate one, solid electrolyte one, solid polymer one. Of these, the spotlight of attention is focused on solid polymer electrolyte fuel cell which is able to be operated at low temperatures (usually not higher than 100° C.) and which is in recent years progressed in development and practical use as a low environmental pollution power source for automotive vehicle.

Configuration of solid polymer electrolyte fuel cell (PEFC) is in general a structure in which an electrolyte membrane-electrode assembly (MEA) is interposed between separators. MEA includes an electrolyte membrane interposed between a pair of electrodes, i.e., an anode and a cathode. Each electrode contains an electrode catalyst and an electrolyte exemplified by solid polymer electrolyte, and has a porous structure in order to diffuse reaction gas supplied from outside.

In solid polymer electrolyte fuel cell, it is possible to take out electricity to the outside through the following electrochemical reactions: First, hydrogen contained in fuel gas supplied to an anode (fuel electrode) side is oxidized to form proton and electron by catalytic particles as shown in a chemical formula (1) mentioned below. Subsequently, the produced proton reaches a cathode (oxygen electrode) side electrode catalyst layer through a solid polymer electrolyte contained in an anode side electrode catalyst layer and a solid polymer electrolyte membrane contacting to the anode side electrode catalyst. Additionally, electrons produced in the anode side electrode catalyst layer reach a cathode side electrode catalyst layer through an electrically conductive carrier constituting the anode side electrode catalyst layer, a gas diffusion layer contacting to the anode side electrode catalyst layer at a side opposite to the solid polymer electrolyte membrane, a separator and an outside circuit. Then, protons and electrons reaching the cathode side electrode catalyst layer react with oxygen contained in oxidizer gas to produce water as shown by chemical formula (2) mentioned below.

[Chem. 1]

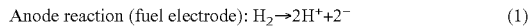

Anode reaction (fuel electrode): $H_2 \rightarrow 2H^+ + 2^-$     (1)

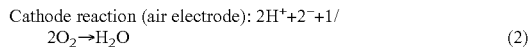

Cathode reaction (air electrode): $2H^+ + 2^- + 1/2 O_2 \rightarrow H_2O$     (2)

In an operation condition of low humidity and high current density, the amount of water moving with protons through the solid polymer electrolyte membrane from the anode to the cathode and the amount of produced water produced and aggregated in the cathode side electrode catalyst layer increase. At this time, this produced water stays in the cathode side electrode catalyst layer, inviting a flooding phenomena to occlude pores serving as reaction gas supply passages. By this, diffusion of the reaction gas is impeded to obstruct the electrochemical reaction thereby inviting lowering in cell performance.

Accordingly, hitherto a variety of trials to prevent the flooding phenomena by improving a water-drainage of gas diffusion layer. For example, in Patent Citation 1, a water retaining layer including a water retaining material, an electronically conductive material and a crystalline carbon fiber is disposed between a catalyst layer and a gas diffusion layer coated with a water repellent layer. It is disclosed that the existence of the crystalline carbon fiber can provide a solid polymer electrolyte fuel cell which ensures a water-drainage of the water retaining layer and has a stable electricity generating performance which is difficult to be affected by humidity fluctuation even upon fluctuation of relative humidity in gas.

PRIOR ART CITATION

Patent Citations

Patent Citation 1: Japanese Patent No. 3778506

SUMMARY OF INVENTION

Problems to be Solved by Invention

However, in the technique disclosed in Patent Citation 1, the added crystalline carbon fiber obstructs movement of protons in the electronically conductive material thereby making it difficult to obtain a fuel cell which can realize a high current density operation.

Accordingly, the present invention has been made upon paying attention on the above-mentioned problems and is intended to provide a gas diffusion electrode which can realize a high current density operation of a fuel cell.

Means for Solving the Problems

The present inventors have made eager studies on the above-mentioned problems. As a result, the present invention has been completed upon finding that the above-mentioned problems can be solved by a gas diffusion electrode including a hydrophilic porous layer and a catalyst layer adjacent to the above-mentioned hydrophilic porous layer, in which a water transport resistance of the above-mentioned porous layer is smaller than a water transport resistance of the above-mentioned catalyst layer.

Effects of the Invention

According to the gas diffusion electrode of the present invention, the water-drainage of produced water produced during electricity generation can be improved. Accordingly, a fuel cell provided with the gas diffusion layer makes a high current density operation possible.

MODE FOR CARRYING OUT THE INVENTION

<First Implementation Mode>

Figure 1:
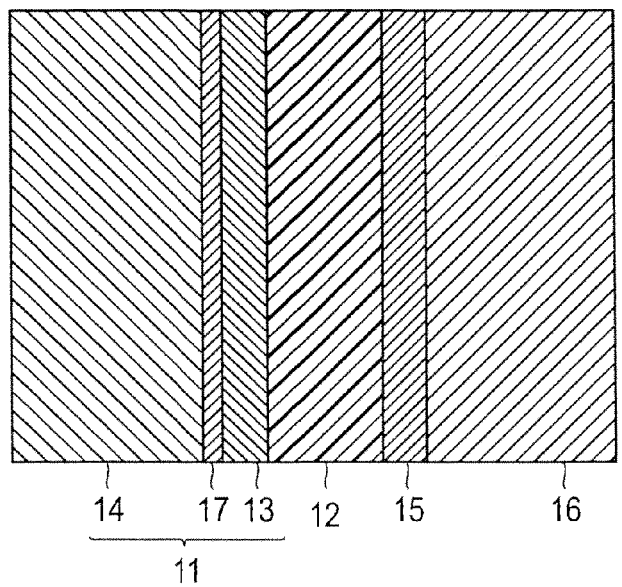
FIG. 1 is a cross-sectional schematic view of an embodiment of MEA including a gas diffusion electrode according to the present invention (a first implementation mode)

First, the first implementation mode of the present invention will be discussed.

A gas diffusion electrode of the first implementation mode includes a hydrophilic porous layer including an electrically conductive material and an ion conductive material, and a catalyst layer adjacent to the above-mentioned hydrophilic porous layer, in which a water transport resistance of the above-mentioned porous layer is smaller than a water transport resistance of the above-mentioned catalyst layer.

In a fuel cell, water is produced at a cathode side. At normal temperature, gas diffusion is impeded under a flooding phenomena. Accordingly, for a fuel cell, it is important to transport water produced at the cathode side as quickly as possible. Additionally, in case that produced water is much, it is particularly important to drain water at the anode side since water produced at the cathode side moves to the anode side.

As a result of making study to improve the water-drainage of produced water, the present inventors have found that a water transportation ability of the hydrophilic porous layer becomes high maintaining a gas diffusibility by making the water transport resistance of the hydrophilic porous layer smaller than the water transport resistance of the catalyst layer. In case of using such a hydrophilic porous layer as a gas diffusion layer of a fuel cell upon being located adjacent to the catalyst layer, the water-drainage of produced water can be improved, maintaining a gas diffusibility. Accordingly, a fuel cell provided with the gas diffusion electrode makes a high current density operation possible.

Here, the water transport resistance is an index representing an easiness of movement of liquid water in a layer. In other words, a larger value of the water transport resistance represents that liquid water is difficult to move, whereas a smaller value of the water transport resistance represents that liquid water is easy to move.

The water transport resistance of actual hydrophilic porous layer and catalyst layer at 80° C. can be measured by a measurement method of Table 1 mentioned below.

TABLE 1

1. Using a membrane electrode assembly, gases different in water vapor activity are flown respectively to two electrodes.
A temperature around the membrane electrode assembly and an inlet gas temperature are set at 80° C.
(Water vapor activity = water vapor partial pressure/saturated water vapor partial pressure = relative humidity/100)
2. Activities at inlet and outlet of the two electrode are respectively measured. Measurement of the activity is carried out by sufficiently cooling discharged humidified gas and measuring the mass of condensed water.
3. Water transportation amount between the electrodes:
calculated from an activity difference between the inlet and the outlet.
Average activity difference between the two electrodes:
calculated from a logarithmic mean of a calculated two electrode activity difference at the inlets and a calculated two electrode activity difference at the outlets.
4. A water transport resistance of the hydrophilic porous layer is determined from the water transportation amount between the electrodes and the average activity difference between the two electrodes.
The water transport resistance = the average activity difference between the two electrodes/the water transportation amount between the electrodes
5. The water transport resistances of membrane electrode assemblies different in thickness of catalyst layer are respectively measured, and a water transport resistance of the catalyst layer is calculated from a variation of the water transport resistance of the membrane electrode assembly relative to a variation of the thickness of the catalyst layer.

A porosity of the above-mentioned hydrophilic porous layer is preferably higher than a porosity of the above-mentioned catalyst layer. With such a relationship, a gas transport resistance of the above-mentioned hydrophilic porous layer is lowered thereby ensuring a water-drainage and a gas diffusibility.

If the relationship for the porosity as described above is established, the porosity of the above-mentioned hydrophilic porous layer is not particularly limited, in which specifically it is preferably 30 to 80% and more preferably 40 to 70%. Additionally, the porosity of the above-mentioned catalyst layer is preferably 30 to 80% and more preferably 40 to 70%. It is to be noted that the porosity can be determined as a rate of a volume of pores relative to a volume of a layer upon measuring the volume of pores (fine pores) existing within the layer under a pore size distribution measurement by a mercury press-in method. Additionally, concerning the porosity, the porosity of the hydrophilic porous layer can be controlled by intentionally changing a mixing mass ratio (I/C ratio) of an ion conductive material (I) and a electrically conductive material (C) in the hydrophilic porous layer. Table 2 shown below indicates the relationship between the I/C ratio and the porosity in the hydrophilic porous layer.

TABLE 2

| I/C ratio | Porosity |
|---|---|
| 0.9 | 58% |
| 1.3 | 50% |
| 1.5 | 24% |

A cover area of the above-mentioned ion conductive material relative to the electrically conductive material contained in the above-mentioned hydrophilic porous layer is preferably smaller than 200 m²/g. By virtue of the fact that the electrically conductive material has the cover area within the above-mentioned range with the ion conductive material, an inflection degree of a liquid water transportation path in the hydrophilic porous layer becomes small thereby making it possible to lower the water transport resistance in the hydrophilic porous layer thus further improving a water transportability. A lower limit value of the cover area is not particularly limited; however, it is preferably not lower smaller than 50 m²/g because if the cover area becomes too small, the ion conductive material becomes non-communicable so that there is a fear that water transportability in the ion conductive material lowers.

Here, the cover area with the ion conductive material relative to the electrically conductive material is calculated according to $S_{ion}=S_{BET} \times \theta_{ion}$ ($S_{ion}$: the cover area with the ion conductive material (m²/g), $S_{BET}$: a BET nitrogen specific surface area (m²/g), and $\theta_{ion}$: a covering ratio of the ion conductive material). Accordingly, the cover area with the ion conductive material is a value which can be calculated by measuring the BET nitrogen specific surface area of the electrically conductive material and the covering ratio of the ion conductive material if the electrically conductive material to be used is decided. Additionally, the cover area with the ion conductive material is said to be a value which can be controlled by a shape of the electrically conductive material. Further, the cover area with the ion conductive material relative to the electrically conductive material can be controlled even by changing a contained amount ratio between the electrically conductive material and the ion conductive material in the hydrophilic porous layer.

In the present specification, the covering ratio $\theta_{ion}$ is represented by a ratio (determined by $\theta_{ion}=C_{dl}$ at relative humidity 30%/$C_{dl}$ at relative humidity 100%) between an electric double layer capacity ($C_{dl}$) at a relative humidity 30% and an electric double layer capacity ($C_{dl}$) at relative humidity 100%. Here, the reason why the ratio between the relative humidity 30% and the relative humidity 100% is employed is as follows: Under a high humidity condition, the electric double layer formed at an interface between the electrically conductive material and water adsorbed at the surface of the electrically conductive material or at an interface between the electrically conductive material and the ion conductive material is measured. Under a low humidity condition, the electric double layer formed at an interface between the electrically conductive material and the ion conductive material is mainly measured. Here, the electric double layer capacity becomes nearly constant at the relative humidity of not higher than about 30%. Accordingly, in the present invention, the relative humidity 30% and the relative humidity 100% are respectively determined at representative points of the low humidity condition and the high humidity condition, in which the ratio in electric double layer capacity between them is employed to make an index representing a degree of coating of the ion conductive material on the electrically conductive material.

It is to be noted that, in the present specification, a value measured by a method mentioned below is employed as the electric double layer capacity.

First, the hydrophilic porous layer containing no catalyst component and the catalyst layer were respectively disposed at the different surfaces of an electrolyte membrane thereby producing the membrane electrode assembly. The assembly were interposed at its opposite surfaces between a pair of gas diffusion layers, further between carbon separators, and further between gold-plated collector plates thereby obtaining a cell similar to a usual fuel cell. In a condition where humidity-controlled hydrogen gas was supplied to the catalyst layer while humidity-controlled nitrogen gas was supplied to the hydrophilic porous layer, the electric potential of the hydrophilic porous layer was scanned 5 to 10 times within a range of 0.2 to 0.6 V relative to a reference electrode using the catalyst layers respectively as the reference electrode and an opposite electrode. These scans were made at a scanning speed of 50 mV/s. An obtained relationship between electric current and electric potential indicated a waveform similar to rectangle. This represented that oxidation and reduction reactions did not occur on the electrode, and charging and discharging of the electric double layer was a main factor of electric current. In this waveform, the electric double layer capacity was calculated by dividing an average value of absolute values of oxidation current and reduction current at a certain electric potential such as 0.3 V by a scanning speed. This measurement was made under a variety of humidity conditions, thereby obtaining the relationship between the electric double layer capacity and the relative humidity.

Additionally, a value measured by a method discussed below is employed as the BET nitrogen specific surface area of the electrically conductive material.

(Measuring Method of the Bet Nitrogen Specific Surface Area)

1. Sampling, Weighing and Preliminary Drying

About 0.04 to 0.07 g of powder was accurately weighed and encapsulated in a sample tube. This sample tube was subjected to a preliminary drying at 90° C. for several hours in a vacuum dryer and then subjected to a measurement. For weighing, an electronic weighing machine (AW220) produced by Shimadzu Corporation was used. Concerning a coated sheet, the purity net mass of about 0.03 to 0.04 g obtained by subtracting the mass of a Teflon (registered trade name) (base material) having the same area as the coated sheet from the whole mass of the coated sheet was used as a sample mass.

2. Measuring Condition (See Table 3 Shown Below)

TABLE 3

Measuring apparatus: High accuracy fully automatic gas absorption apparatus BELSORP36 produced by BEL Japan Inc.
Absorbed gas: N2
Dead volume measurement gas: He
Absorption temperature: 77 K (liquid nitrogen temperature)
Measurement pretreatment: 90° C. vacuum drying for several hours (set at a measuring stage after He purging)
Measuring mode: Adsorption step and desorption step at the same temperature
Measuring relative pressure $P/P_0$: about 0 to 0.99
Equilibrium setting time: 180 sec. for 1 relative pressure 3. Measuring Method A BET plot is prepared from a range of about 0.00 to 0.45 in relative pressure ($P/P_0$) in an absorption side of an adsorption and desorption isothermal curve, upon which the BET nitrogen specific surface area is calculated from the inclination and segment of the plot.

It is preferable that the BET nitrogen specific surface area of the electrically conductive material contained in the hydrophilic porous layer is smaller than the BET nitrogen specific surface area of a composite (hereinafter merely referred also to as "electrode catalyst") which is contained in the adjacent catalyst layer and in which a catalyst component is carried on an electrically conductive carrier. With such a relationship, the inflection degree of the liquid water transportation path in the hydrophilic porous layer becomes small thus to make it possible to lower the water transport resistance in the hydrophilic porous layer thereby improving the water transportability.

If the above-mentioned relationship in BET nitrogen specific surface area is established, the BET nitrogen specific surface area of the electrically conductive material contained in the above-mentioned hydrophilic porous layer is not particularly limited, in which it is preferably 10 to 800 $m^2/g$ and more preferably 20 to 600 $m^2/g$. Additionally, the electrically conductive carrier used in the above-mentioned catalyst layer has a BET nitrogen specific surface area of preferably 10 to 1200 $m^2/g$ and more preferably 20 to 800 $m^2/g$.

The thickness of the above-mentioned hydrophilic porous layer is preferably smaller than the thickness of the adjacent catalyst layer. With such a relationship, it is possible to lower the water transport resistance of the hydrophilic porous layer, thereby further improving the water transportability.

If the thickness relationship as discussed above is established, the thickness of the above-mentioned hydrophilic porous layer is not particularly limited, in which it is preferably not larger than 40 μm. Additionally, the thickness of the above-mentioned catalyst layer is preferably not larger than 15 μm.

The hydrophilic porous layer includes the electrically conductive material and the ion conductive material. In certain circumstances, the electrically conductive material may not carry catalyst. The hydrophilic porous layer may contain other materials than the electrically conductive material and binder. A content of the electrically conductive material and the ion conductive material in the hydrophilic porous layer is preferably not less than 80 mass % and more preferably not less than 90 mass %. Further, it is preferable that the hydrophilic porous layer is constituted of the electrically conductive material and the ion conductive material.

As discussed above, the water-drainage of produced water can be improved by making the water transport resistance of the hydrophilic porous layer smaller than the water transport resistance of the catalyst layer. Accordingly, in case that the gas diffusion electrode of the present invention including the hydrophilic porous layer and the catalyst layer is applied to the membrane electrode assembly (MEA) of the fuel cell, a high current density operation of the fuel cell is made possible.

A content ratio between the electrically conductive material and the ion conductive material in the hydrophilic porous layer is not particularly limited, in which it is suitably set according to intended purposes. Suitably, it is preferable that the electrically conductive material:the ion conductive material=1:0.6 to 1.5 (mass ratio), and it is more preferable that the electrically conductive material:the ion conductive material=1:0.7 to 1.3 (mass ratio). Within this range, a gas diffusibility can be ensured while the function of the ion conductive material can be exhibited. The content mass ratio between the above-mentioned electrically conductive material and ion conductive material can be calculated or controlled by measuring the previously mixed ion conductive material and electrically conductive material when an ink (slurry) for the hydrophilic porous layer is prepared, and by controlling a mixing ratio between them. Additionally, the content mass ratio between the electrically conductive material and the ion conductive material may be calculated by quantitatively determining the above-mentioned electrically conductive material and ion conductive material upon analysis of the hydrophilic porous layer.

Hereinafter, respective components constituting the gas diffusion electrode of the present invention will be discussed.

[Hydrophilic Porous Layer]

(Electrically Conductive Material)

The electrically conductive material contained in the hydrophilic porous layer is not particularly limited, in which specific examples of it include, for example, heat-treated Ketchen Black, acetylene black and metal oxide such as tin oxide, titanium oxide and the like.

It is more preferable to use Ketchen Black which is obtained by being thermally treated preferably at 2000 to 3000° C. preferably for 2 to 120 minutes.

As discussed above, it is preferable that the cover area with the ion conductive material to the electrically conductive material is less than 200 $m^2/g$. A lower limit value of the cover area is not particularly limited, in which it is preferably not less than 50 $m^2/g$ because, if the cover area becomes too small, the ion conductive material becomes non-communicable so that there is a fear that water transportability in the ion conductive material lowers.

Additionally, as discussed above, it is preferable that the BET nitrogen specific surface area of the electrically conductive material is smaller than the BET nitrogen specific surface area of the composite (hereinafter merely referred also to as "electrode catalyst") which is contained in the adjacent catalyst layer and in which the catalyst component is carried on the electrically conductive carrier.

The electrically conductive material may be of singly one kind or of two or more kinds used in combination.

In case that the electrically conductive material is powdery, its mean particle diameter is preferably 5 to 100 nm and more preferably 10 to 60 nm. By this, a gas diffusibility of the hydrophilic porous layer can be ensured. It is to be noted that, in the present specification, "particle diameter" means the maximum distance L between any two points on the profile line of an active material particle. As the value of "mean particle diameter", a value calculated as a mean value of the particle diameters of particles observed in several to several tens fields of view by using an observing means such as a scanning electron microscope (SEM) and a transmission electron microscope (TEM) is employed.

(Ion Conductive Material)

The ion conductive material is not particularly limited as far as it is ion-conductive and is a material which can bond the electrically conductive materials. Specific examples of it include, for example, polymer such as polyacrylamide, water-based urethane resin, silicone resin and the like; polymer electrolyte; and the like. Polymer electrolyte is preferable. By using polymer electrolyte as the ion conductive material, the hydrophilic porous layer can be stably disposed adjacent to a component (electrolyte membrane or catalyst layer) of MEA in case of disposition of the hydrophilic porous layer, thereby making it possible to lower the water transport resistance between the electrically conductive material and the electrolyte membrane or the catalyst layer. As a result, the water transport resistance between the electrically conductive material and the electrolyte membrane or the catalyst layer is improved thereby making it possible that an equilibrium can be reached at an earlier time. In case that the ion conductive material is polymer electrolyte, the electrolyte may be the same as or different from the polymer electrolyte used in the catalyst layer or the electrolyte membrane. Further in case of producing MEA including the hydrophilic porous layer, materials may be commonly used thereby achieving a labor-saving during production.

The ion conductive material to be used is not particularly limited. Specifically, the ion conductive material is roughly classified into fluorine-based electrolyte in which fluorine atom is contained in the whole or part of a polymer frame, and hydrocarbon-based electrolyte in which no fluorine atom is contained in a polymer frame.

Preferable examples of the fluorine-based electrolyte include specifically perfluorocarbon sulfonic acid based polymer such as Nafion (registered trade name, produced by Dupont), Aciplex (trade name, produced by Asahi Kasei Chemicals Corporation), Flemion (registered trade name, produced by Asahi Glass Co., Ltd.) and the like, polytrifluorostyrene sulfonic acid based polymer, perfluorocarbon phosphonic acid based polymer, trifluorostyrene sulfonic acid based polymer, ethylenetetrafluoroethylene-g-styrene sulfonic acid based polymer, ethylene-trarafluoroethylene copolymer, polyvinylidene fluoride-perfluorocarbon sulfonic acid based polymer, and the like. The fluorine-based electrolyte is excellent in durability and mechanical strength.

Preferable examples of the above-mentioned hydrocarbon-based electrolyte include preferably polysulfone sulfonic acid, polyaryletherketone sulfonic acid, polybenzimidazolealkyl sulfonic acid, polybenzimidazolealkyl phosphonic acid, polystyrene sulfonic acid, polyetheretherketone sulfonic acid, polyphenyl sulfonic acid, and the like.

The above-mentioned ion conductive material may be used one kind singly or in combination of two or more kinds.

Moving speed of water is important in the hydrophilic porous layer, and therefore EW of the ion conductive material is preferably low. EW is preferably not higher than 1200 g/eq., more preferably not higher than 1000 g/eq., and most preferably not higher than 700 g/eq. With such a range, diffusion of liquid water can be promoted thereby providing the hydrophilic porous layer which is compatible in a sub-zero temperature starting ability and a high current density operation at normal temperature. The lower limit of EW is not particularly limited, in which it is preferably usually not lower than 500 g/eq. It is to be noted that EW (Equivalent Weight) represents an ion exchange group equivalent mass.

As discussed above, the thickness of the hydrophilic porous layer is preferably larger than the adjacent catalyst layer.

[Catalyst Layer]

The catalyst layer is a layer where reaction actually proceeds. Specifically, an oxidation reaction of hydrogen proceeds in the anode-side catalyst layer, whereas a reduction reaction of oxygen proceeds in the cathode-side catalyst layer. The catalyst layer contains a catalyst component, an electrically conductive carrier carrying the catalyst component, and a proton conductive polymer electrolyte.

The catalyst component used in the anode-side catalyst layer is not particularly limited as far as it has a catalytic action to oxidation reaction of hydrogen, so that known catalysts can be similarly used for it. Additionally, the catalyst component used in the cathode-side catalyst layer is also not particularly limited as far as it has a catalytic action to reduction reaction of oxygen, so that known catalysts can be similarly used for it. Specifically, the catalyst component is selected from metals such as platinum, ruthenium, iridium, rhodium, palladium, osmium, tungsten, lead, iron, chromium, cobalt, nickel, manganese, vanadium, molybdenum, gallium, aluminum and the like, and alloy and the like thereof. It is a matter of course that other materials may be used for the catalyst component. Of these, the catalyst component containing at least platinum is preferably used in order to improve a catalytic activity, a poisoning resistance to carbon monoxide and the like, and a heat resistance. The composition of the above-mentioned alloy preferably contains 30 to 90 atomic % of platinum and 10 to 70 atomic % of a metal to be alloyed with platinum, according to kinds of metals to be alloyed with platinum. The composition of the alloy in case of using the alloy as the cathode-side catalyst is different according to kinds of metals to be alloyed so as to be suitably selected by persons skilled in the art, in which the composition of 30 to 90 atomic % of platinum and 10 to 70 atomic % of other metals to be alloyed is preferable. It is to be noted that the alloy is a generic name of ones which are prepared by adding one or more kinds of metal elements or non-metal elements to a metal element and which have metallic properties. As a structure of the alloy, there are an eutectic alloy which is, so to speak, a mixture where component elements form separate crystals, one in which component elements completely melt to form a solid solution, and one in which component elements form an intermetallic compound or a compound of metal and non-metal, in which either one may used for the present application. In this time, the catalyst component to be used for the anode catalyst layer and the catalyst component to be used for the cathode catalyst layer are selected from the above-mentioned ones. In the description of the present specification, the catalyst components of the anode catalyst layer and the cathode catalyst layer have similar definition between them, and therefore are referred to as "catalyst component" in the lump, unless otherwise specified. However, the catalyst components of the anode catalyst layer and the cathode catalyst layer are not required to be the same and therefore may be suitably selected so as to make the desired effects mentioned above.

The shape and size of the catalyst component is not particularly limited so that similar shape and size to those of known catalyst components may be used, in which the catalyst component is preferably granular. In this connection, the mean particle diameter of a catalyst particle is preferably 1 to 30 nm, more preferably 1.5 to 20 nm, most preferably 2 to 10 nm, and particularly preferably 2 to 5 nm. If the mean particle diameter of the catalyst particle is within such a range, a balance between a catalyst utilization factor in connection with an effective electrode area where an electrochemical reaction proceeds and a convenience in catalyst-carrying may be suitably controlled. It is to be noted that "the means particle diameter of the catalyst particle" may be measured as a crystal size determined from the half bandwidth of a diffraction peak of the catalyst component in a X-ray diffraction or as a mean value of the particle diameter of the catalyst component obtained from the image of a transmission electron microscope.

The electrically conductive carrier functions as a carrier for carrying the above-mentioned catalyst component, and as an electronically conductive path relating to electron transfer between it and the catalyst component.

As the electrically conductive carrier, it is sufficient to have a specific surface area for carrying the catalyst component in a desired dispersed state and a sufficient electronic conductivity, and it is preferable to be formed of a carbon-based material whose main component is carbon. Specifically, examples of the carbon-based material include carbon particles formed of carbon black, graphitization-treated carbon black, activated carbon, coke, natural graphite, artificial graphite, carbon nanotube, carbon nanohorn, carbon fibril structure, and/or the like. It is to be noted that the fact that "main component is carbon" means that carbon atom is contained as the main component, and therefore the fact is an idea including both a matter of being formed of only carbon atom and another matter of being substantially formed of carbon atom. According to cases, element(s) other than carbon atom may be contained in the electrically conductive carrier in order to improve the characteristics of a fuel cell. It is to be noted that the fact that "substantially formed of carbon atom" means that about 2 to 3 mass % or less of impurity getting mixed is permissible.

It is preferable that graphitized electrically conductive material such as graphitization-treated carbon black is used in the catalyst layer, particularly in the anode-side catalyst layer, in which graphitized carbon material is more preferably used for the electrically conductive carrier because a corrosion resistance of the electrically conductive material can be improved. However, the graphitized electrically conductive material is small in cover area with the ion conductive material and therefore small in evaporation area for liquid water, so as to have fears of freezing at sub-zero temperature or flooding at normal temperature. By disposing the hydrophilic porous layer adjacent to the catalyst layer using the graphitized electrically conductive material, the water-drainage can be improved thereby making the sub-zero temperature starting ability and the high current density operation at normal temperature compatible with each other and offering the a membrane electrode assembly provided with the corrosion resistance for the electrically conductive material as discussed after. The graphitization-treated carbon black is preferably spherical, in which the means lattice spacing $d_{002}$ of [002] planes calculated under X-ray diffraction is preferably 0.343 to 0.358 nm, and the BET specific surface area is preferably 100 to 300 m$^2$/g.

The BET nitrogen specific surface area of the electrically conductive carrier may be sufficient to allow the catalyst component to be carried under a highly dispersed state, in which it is preferably 20 to 1600 m$^2$/g and more preferably 80 to 1200 m$^2$/g. With the specific surface area within such a range, the balance between the dispersability of the catalyst component on the electrically conductive carrier and the effective utilization factor of the catalyst component can be suitably controlled.

A size of the electrically conductive carrier is not particularly limited, in which it is good that a mean particle diameter is 5 to 200 nm, preferably about 10 to 100 nm from the viewpoints of convenience of carrying, catalyst utilization factor and controlling the thickness of the electrode catalyst layer within a suitable range.

In the electrode catalyst, a carried amount of the catalyst component is preferably 10 to 80 mass %, more preferably 30 to 70 mass % relative to the whole amount of the electrode catalyst. If the carried amount of the catalyst component is within such a range, a balance between a dispersion degree of the catalyst component on the electrically conductive carrier and a catalyst performance can be suitably controlled. It is to be noted that the carried amount of the catalyst component can be measured by an inductively coupled plasma emission spectrochemical analysis method (ICP).

Additionally, carrying the catalyst component on the carrier can be accomplished by known methods. For example, the known methods such as impregnation method, liquid phase reduction carrying method, evaporation to dryness method, colloid adsorption method, evaporative decomposition method, reversed micelle (microemulsion) method, and the like can be used.

In the present invention, marketed products may be used as the electrode catalyst. Examples of such marked products include, for example, one produced by Tanaka Kikinzoku Kogyo K.K., one produced by N.E. Chemcat Corporation, one produced by E-TEK, one produced by Johnson Matthey, and the like. These electrode catalysts are ones in which platinum or platinum alloy is carried on a carbon carrier (a carried concentration of a catalyst species: 20 to 70 mass %). In the above-mentioned, examples of the carbon carrier are Ketchen Black, Vulcan, acetylene black, Black Pearls, graphitization-treated carbon carrier which is previously heat-treated at a high temperature (for example, graphitization-treated Ketchen Black), carbon nanotube, carbon nanohorn, carbon fiber, mesoporous carbon, and the like.

As discussed above, the BET nitrogen specific surface area of the electrode catalyst is preferably larger than the BET specific surface area of the electrically conductive material contained in the hydrophilic porous layer. Additionally, the thickness of the catalyst layer is preferably larger than the thickness of the adjacent hydrophilic porous layer, as discussed above.

The catalyst layer contains an ion conductive polymer electrolyte in addition to the electrode catalyst. The ion conductive polymer electrode is not particularly limited and suitably refers to hitherto known knowledge, in which, for example, an ion exchange resin constituting the above-mentioned polymer electrolyte membrane can be added as the above-mentioned polymer electrolyte into the catalyst layer. In case that the catalyst layer is the hydrophilic porous layer, the above-mentioned polymer electrolyte is used as the ion conductive material.

[Production Method for Gas Diffusion Electrode]

A production method for the gas diffusion electrode according to the present invention (first implementation mode) is not particularly limited, in which the following method and the like are used: (1) the electrically conductive material, the ion conductive material and a solvent are mixed with each other to prepare an ink for the hydrophilic porous layer, and then this is applied on a base material, followed by being dried to form the hydrophilic porous layer; and (2) an ink containing ink a catalyst component is applied on the formed hydrophilic porous layer, followed by being dried. Additionally, in case of using the electrically conductive material carrying the catalyst component, the catalyst component may be previously carried on the electrically conductive material by using known methods such as the impregnation method, the liquid phase reduction carrying method, the evaporation to dryness method, the colloid adsorption method, the evaporative decomposition method, the reversed micelle (microemulsion) method, and the like.

The solvent used for the hydrophilic porous layer is not particularly limited, in which its examples includes water; alcohol such as methanol, ethanol, 1-propanol, 2-propanol, 1-butanol, 1-pentanol, 2-pentanol, 3-pentanol and the like; and polyalcohol such as ethylene glycol, propylene glycol, 1,2-butane diol, 1,3-butane diol, 1,4-butane diol, glycerol and the like. These may be used one kind singly or in combination of two or more kinds.

As discussed above, the porosity of the hydrophilic porous layer can be controlled by intentionally changing the mixing mass ratio (I/C ratio) between the ion conductive material (I) and the electrically conductive material (C) when the ink is prepared. Accordingly, in case that the porosity is required to be controlled, the porosity can be easily controlled by suitably setting the I/C ratio.

It is to be noted that the solvent or dissolving agent in the present specification includes a dispersion medium in which solid contents such as binder, the electrically conductive material and the like are to be dispersed, i.e., all liquid contents other than solid contents. Accordingly, for example, in case of producing the ink for the hydrophilic porous layer by mixing the ion conductive material dispersed in water and the organic solvent, the solvent described in the present specification means both the water and the organic solvent.

A solid content rate of the ink for the hydrophilic porous layer (a rate of the solid content relative to whole mass of the hydrophilic porous layer) is not particularly limited, in which it is normally about 5 to 20 mass % from the viewpoints of improving a forming efficiency of the porous layer and a stability of the ink.

A preparation method for the ink for the hydrophilic porous layer is not particularly limited. Additionally, a mixing order of the ion conductive material, the electrically conductive material and the solvent is not particularly limited, in which specifically (i-1) to (i-3) discussed below are given.

(i-1) A solution containing the ion conductive material is prepared, and then the above-mentioned solution is mixed with the electrically conductive material. Thereafter, the solvent is further added thereby to prepare the ink for the hydrophilic porous layer;

(i-2) A solution containing the ion conductive material is prepared, and then the solvent is added. Thereafter, the electrically conductive material is further mixed (added) thereby to prepare the ink for the hydrophilic porous layer; and (i-3) The electrically conductive material and the solvent are mixed with each other. Subsequently, a separately prepared solution containing the ion conductive material is further added thereby to prepare the ink for the hydrophilic porous layer.

Of the above-mentioned methods, the methods (i-1) and (i-2) are preferable, and the method (i-1) is more preferable. By this, water and the organic solvent are uniformly mixed with each other so that a solvent compound is readily formed.

In the above-mentioned methods (i-1) to (i-3), the ion conductive material is dispersed in the solvent in the solution containing the ion conductive material. An ion conductive material content rate in the solution containing the ion conductive material in this case is not particularly limited, in which a solid content is preferably 1 to 40 mass %, and more preferably 5 to 20 mass %. With such a content rate, the polymer electrolyte can be suitably dispersed in the solvent.

The solution containing the ion conductive material may be prepared by a person himself or herself, or a commercial product may be used as the solution. The dispersion solvent for the ion conductive material in the solution containing the above-mentioned ion conductive material is not particularly limited, in which water, methanol, ethanol, 1-propanol, 2-propanol and the like are given. Water, ethanol and 1-propanol are preferable taking account of dispersibility. These dispersion solvents may be used one kind singly or in combination of two or more kinds.

Additionally, in a production process of the ink for the hydrophilic porous layer, after the ion conductive material, the electrically conductive material and the solvent are mixed with each other, a separate mixing step may be made in order to accomplish good mixing. A preferable example of such a mixing step is to sufficiently disperse a catalyst ink by a ultrasonic homogenizer, or to sufficiently pulverize this mixture slurry by a sand grinder, a circulating ball mill, a circulating bead mill and the like, followed by making a vacuum degassing operation.

Next, after the obtained ink for the hydrophilic porous layer is applied on the base material, the base material on which the ink for the hydrophilic porous layer is applied is dried.

An applying method of the ink for the hydrophilic porous layer onto the surface of the base material is not particularly limited, and therefore known methods can be used. Specifically, known methods such as spray (spray applying) method, Gulliver printing method, die coater method, screen printing method, doctor blade method, transfer printing method and the like can be used. Additionally, an apparatus used for applying the catalyst ink onto the surface of the base material is also not particularly limited, in which known apparatuses can be used. Specifically, applying apparatuses such as a screen printer, a spray apparatus, a bar coater, a die coater, a reverse coater, a comma coater, a gravure coater, a spray coater, a doctor knife and the like can be used. It is to be noted that the applying step may be accomplished once or repeatedly several times.

The base material on which the ink for the hydrophilic porous layer is applied is dried to remove the solvent. A drying time during drying of the base material on which the ink for the hydrophilic porous layer is applied is not particularly limited, in which 1 to 40 minutes are preferable. Additionally, a drying temperature is preferably 20 to 170° C. In addition, an atmosphere during drying is not particularly limited, in which drying is made preferably in an air atmosphere or in an inert gas atmosphere.

The base material on which the ink for the hydrophilic porous layer is to be applied may be suitably selected according to the mode of the finally obtained hydrophilic porous layer, in which a polymer sheet such as a polytetrafluoroethylene (PTFE) sheet or the like can be used.

Next, the catalyst ink is applied on the dried hydrophilic porous layer, and dried to form the catalyst layer thus completing the gas diffusion electrode. The catalyst layer can be formed by applying the catalyst ink including the electrode catalyst, the polymer electrolyte, the solvent and the like as described above onto the solid polymer electrolyte membrane by hitherto known methods such as spraying method, transfer printing method, doctor blade method, die coater method and the like.

An applying amount of the catalyst ink is not particularly limited as a catalytic action of the electrode catalyst to an electrochemical reaction can be sufficiently exhibited with the applying amount, in which it is preferable to apply the catalyst ink in such an amount that the mass of the catalyst component per unit area is 0.05 to 1 mg/cm$^2$. Each of the applying amount and the thickness of the above-mentioned catalyst ink is not required to be common between the anode side and the cathode side, and therefore it can be suitably adjusted.

[Membrane Electrode Assembly]

The gas diffusion electrode according to the present invention has an excellent water-drainage performance. Accordingly, in case that the gas diffusion electrode is applied to MEA, a high current density operation can be realized. Hereinafter, a preferable embodiment of MEA including the gas diffusion electrode of the above-mentioned embodiment will be discussed. It is to be noted that each drawing is expressed upon being exaggerated for the sake of convenience, and therefore there is a case where the dimension ratios of respective constituting elements in each drawing may be different from actual ones. Additionally, the same reference numerals are assigned to the same members in each drawing thereby to omit explanation therefor.

FIG. 1 is a schematic sectional view showing a first embodiment of MEA including the gas diffusion electrode according to the present invention (the first implementation mode). MEA 10 in FIG. 1 has such a configuration that an anode-side electrode catalyst layer 13 and a cathode-side electrode catalyst layer 15 are disposed opposite to each other and respectively at the opposite surfaces of a solid polymer electrolyte membrane 12, and this is interposed between an anode-side gas diffusion layer 14 and a cathode-side gas diffusion layer 16. Further, a hydrophilic porous layer 17 is disposed between the anode-side electrode catalyst layer 13 and the anode-side gas diffusion layer 14. By forming MEA having the hydrophilic porous layer 17, a transportation function for liquid water can be also improved in connection with the water-drainage from the catalyst layer. Accordingly, in case that MEA of this embodiment is applied to a fuel cell, a high current density operation is made possible.

This embodiment is an embodiment in which the hydrophilic porous layer 17 is disposed between the anode-side electrode catalyst 13 and the anode-side gas diffusion layer 14. However, limitation is not made to the above-mentioned embodiment, so that the hydrophilic porous layer may be disposed in the cathode electrode or disposed in both the anode electrode and the cathode electrode. Additionally, the hydrophilic porous layer may be disposed between the polymer electrolyte membrane and the electrode catalyst layer. It is preferable to take such an embodiment that the hydrophilic porous layer is disposed at least at the anode-side. It is important that a moving direction of water during absorption of produced water is from the cathode-side electrode catalyst layer through the electrolyte membrane to the anode-side electrode catalyst layer. By disposing the hydrophilic porous layer at the anode-side, more water produced at the cathode-side is transported to the side of the anode catalyst layer, so that the effects of the present invention can be further readily obtained.

Additionally, it is preferable to dispose the hydrophilic porous layer between the catalyst layer and the gas diffusion layer and adjacent to the catalyst layer, particularly the anode catalyst layer. At least the electrolyte membrane and the catalyst layer have a water retention function inside MEA. Since the anode catalyst layer and the cathode catalyst layer are disposed in such a manner that the membrane is interposed therebetween, the hydrophilic porous layer is disposed adjacent to the catalyst layer, so that liquid water existing inside MEA (the membrane and the catalyst layer) can smoothly move to and be retained in the hydrophilic porous layer. Additionally, by locating the hydrophilic porous layer without being in contact with the electrolyte membrane, the effects of the present invention can be obtained without impeding a proton conduction. Further, although the hydrophilic porous layer is difficult to maintain its form of a thin film, its structure can be easily maintained by disposing the hydrophilic porous layer adjacent to the gas diffusion layer. It is to be noted that the gas diffusion layer may have or not have a microporous layer (MPL) discussed after. Since MPL is large in water transport resistance, it is preferable that the gas diffusion layer (without MPL) is constituted of a gas diffusion layer base material from the viewpoint of water transportation. MPL is large in water transport resistance whereas the gas diffusion layer base material is small in the transport resistance because of being formed of macropores.

As discussed above, MEA of the present invention is characterized by the gas diffusion electrode. Accordingly, as other members constituting MEA, hitherto known configurations in the field of fuel cell can be employed as they are or upon being suitably improved. Hereinafter, typical modes of members other than the hydrophilic porous layer will be discussed for reference; however, the technical scope of the present invention is not limited to only the embodiments discussed below.

[Polymer Electrolyte Membrane]

The polymer electrolyte membrane is constituted of an ion exchange resin and has such a function that protons produced in the anode-side catalyst layer during operation of PEFC is selectively transmitted along its thickness direction to the cathode-side catalyst layer. Additionally, the polymer electrolyte membrane has a function to serve also as a partition wall which prevents mixing of a fuel gas supplied to the anode-side and an oxidizer gas supplied to the cathode-side.

A specific configuration of the polymer electrolyte membrane is not particularly limited, in which polymer electrolyte membranes which are hitherto known in the field of fuel cell can be suitably used. Polymer electrolyte membrane is roughly classified into fluorine-based polymer electrolyte membrane and hydrocarbon-based polymer electrolyte membrane according to kinds of ion exchange resins as constituting materials. Examples of ion exchange resin for constituting the fluorine-based polymer electrolyte membrane include, for example, perfluorocarbon sulfonic acid based polymer such as Nafion (registered trade name, produced by Dupont), Aciplex (trade name, produced by Asahi Kasei Chemicals Corporation), Flemion (registered trade name, produced by Asahi Glass Co., Ltd.) and the like, perfluorocarbon phosphonic acid based polymer, trifluorostyrene sulfonic acid based polymer, ethylenetetrafluoroethylene-g-styrene sulfonic acid based polymer, ethylene-trarafluoroethylene copolymer, polyvinylidene fluoride-perfluorocarbon sulfonic acid based polymer, and the like. From the viewpoints of electricity generation performances such as heat resistance, chemical stability and the like, these fluorine-based polymer electrolyte membranes are preferably used, and the fluorine-based polymer electrolyte membrane constituted of perfluorocarbon sulfonic acid based polymer is particularly preferably used.

Specific examples of the above-mentioned hydrocarbon-based electrolyte include sulfonated polyethersulfone (S-PES), sulfonated polyaryletherketone, sulfonated polybenzimidazole alkyl, phosphonated polybenzimidazole alkyl, sulfonated polystyrene, sulfonated polyetheretherketone (S-PEEK), sulfonated polyphenylene (S-PPP), and the like. These hydrocarbon-based polymer electrolyte membranes are preferably used from the productional viewpoints of raw materials being inexpensive, production process being simple, and selectivity of materials being high. It is to be noted that the above-mentioned ion exchange resin may be used one kind singly or in combination of two or more kinds.

Additionally, it is a matter of course that limitation is not made to the above-mentioned materials so that other materials may be used.

A thickness of the polymer electrolyte membrane may be suitably decided upon taking account of the characteristics of obtained MEA and PEFC, and therefore is not particularly limited. It is to be noted that the thickness of the polymer electrolyte member is preferably 5 to 300 µm, more preferably 10 to 200 µm, and further preferably 15 to 150 µm. If the thickness is at a value within such a range, a balance among strength during film production, durability in use and power output characteristics in use can be suitably controlled.

[Gas Diffusion Layer]

The gas diffusion layer has a function to promote diffusion of gas (fuel gas or oxidizer gas) supplied through a separator flow path into the catalyst layer and a function to serve as an electron conduction path.

A material constituting the base material of the gas diffusion layer is not particularly limited, in which hitherto known knowledge can be suitably referred to. Examples of the material include sheet-like materials having electrical conductivity and porosity such as a fabric made of carbon, a paper-like body formed by paper-making, a felt, nonwoven fabric, a metal mesh, a metal porous body and the like. A thickness of the base material may be suitably decided upon taking account of the characteristics of the obtained gas diffusion layer, in which it is preferably about 30 to 500 µm. If the thickness of the base material is a value within such a range, a balance between a mechanical strength and diffusibility of gas and water can be suitably controlled.

The gas diffusion layer preferably includes a water repellent agent for the purpose of improving a water repellent property thereby preventing a flooding phenomena. The water repellent agent is not particularly limited, in which examples of it include a fluorine-based polymer material such as polytetrafluoroethylene (PTFE), polyvinylidene fluoride (PVdF), polyhexafluoropropylene, tetrafluoroethylene-hexafluoropropylene copolymer (FEP) and the like, polypropylene, polyethylene, and the like.

Additionally, in order to further improve the water repellent property, the gas diffusion layer may be provided, at the side of the catalyst layer, with a carbon particle layer (microporous layer: MPL) formed of aggregate of carbon particles containing a water repellent agent.

The carbon particles contained in the carbon particle layer are not particularly limited, in which hitherto known materials such as carbon black, graphite, expandable graphite and the like can be suitably used. Of these, carbon black such as oil furnace black, channel black, lamp black, thermal black, acetylene black and the like can be preferably used. A mean particle diameter of the carbon particle is preferably about 10 to 100 nm. By this, a high water-drainage due to capillary tube action can be obtained while it becomes possible to improve contact of the carbon particles with the catalyst layer.

As the water repellent agent used in the carbon particle layer, ones similar to the above-mentioned water repellent agents are given. Of these, fluorine-based polymer materials can be preferably used because of being excellent in water repellency and corrosion resistance during electrode reaction, and the like.

A mixing ratio of the carbon particles and the water repellent agent is preferably about 90:10 to about 40:60 (carbon particles:water repellent agent) in mass ratio upon taking account of a balance between water repellent characteristics and electron conductivity. It is to be noted that a thickness of the carbon particle layer is not particularly limited, in which it may be suitably decided upon taking account of the water repellent characteristics of the obtained gas diffusion layer.

An effective diffusion coefficient of the gas diffusion layer is preferably not smaller than $3.39 \times 10^{-5} \times \epsilon^{\gamma}$ m$^2$/s (where $\epsilon$: the porosity of the gas diffusion layer; and $\gamma$: the inflection degree of the gas diffusion layer). Within such a range, lowering in gas transportability of the adjacent hydrophilic porous layer can be suppressed.

In case that the effective diffusion coefficient of the gas diffusion layer is higher than the above-mentioned value, a molecular diffusion is established in which collision among gas molecules become rate-limiting. When the effective diffusion coefficient becomes lower than this value, a Knudsen diffusion is established in which collision of gas molecules with pore walls becomes rate-limiting thereby raising a case where diffusibility is rapidly lowered. During electricity generation, there is a case where a lowering margin of diffusibility relative to lowering of the porosity due to adherence of produced water and the like becomes large. It is to be noted that the porosity $\epsilon$ of the above-mentioned gas diffusion layer can be calculated from a porosity amount and a volume obtained by the mercury press-in method.

(Production Method for Membrane Electrode Assembly)

The production method for MEA of the above-mentioned embodiment is not particularly limited, in which MEA can be produced by hitherto known production methods.

Preferably, a step for previously combining the catalyst layer and the hydrophilic porous layer is included. When the ink of the hydrophilic porous layer is applied onto the gas diffusion layer and dried, there may arise a case where a contact resistance rises. Accordingly, the above-mentioned fear can be solved by carrying out the step of previously combining the catalyst layer and the hydrophilic porous layer. By employing such a step, the membrane electrode assembly can be produced without degrading the transportability of electrons and water at an interface between the catalyst layer and the hydrophilic porous layer.

(Fuel Cell)

Next, PEFC as a preferable embodiment using MEA according to the present invention will be discussed with reference to drawings.

Figure 2:
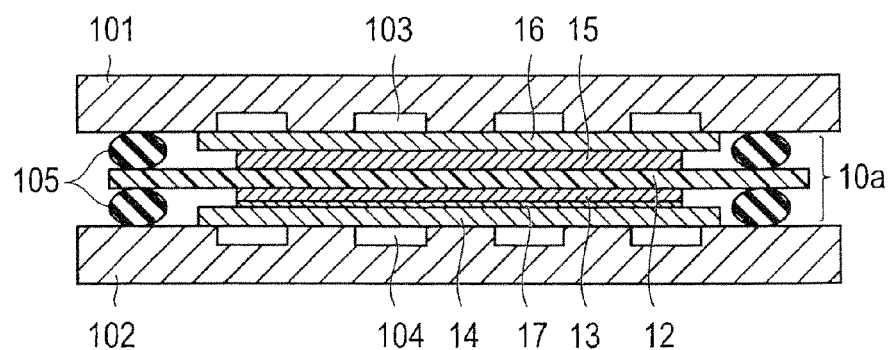
FIG. 2 is a cross-sectional schematic view showing a single cell of PEFC constituted by interposing MEA including the gas diffusion layer according to the present invention (the first implementation mode) between a pair of separators.

FIG. 2 is a schematic sectional view showing a single cell of PEFC in which MEA including the gas diffusion layer according to the present invention (the first implementation mode) is interposed between two separators.

PEFC 100 shown in FIG. 2 is configured by interposing MEA 10*a* between an anode-side separator 102 and a cathode-side separator 101. Additionally, fuel gas and oxidizer gas to be supplied to MEA are supplied through a plurality of gas supply grooves 104 and the like and a plurality of gas supply grooves 103 and the like formed respectively in the anode-side separator 102 and the cathode-side separator 101. Additionally, in PEFC in FIG. 2, a gasket 105 is disposed in such a manner as to surround the outer periphery of the electrode located at the surface of MEA 10. The gasket is a seal member and may take such a configuration as to be fixed through an adhesive layer (not shown) to the outer surface of the solid polymer electrolyte membrane 12 of MEA 10. The gasket functions to secure a sealing ability between the separator and MEA. It is to be noted that the adhesive layer used if necessary is preferably disposed in the shape of a frame extending along the whole peripheral section of the electrolyte membrane and corresponding to the shape of the gasket, upon taking account of securing an adhesiveness.

Hereinafter, respective constituent elements of PEFC other than MEA will be successively discussed in detail.

[Gasket]

The gasket is disposed to surround the catalyst layer and the gas diffusion layer (or the gas diffusion electrode) and functions to prevent leaking of the supplied gas (fuel gas or oxidizer gas) from the gas diffusion layer.

A material constituting the gasket is sufficient to be impermeable to gas, particularly oxygen or hydrogen, and therefore is not particularly limited. Examples of the constituting material of the gasket include, for example, rubber materials such as fluorine-contained rubber, silicone rubber, ethylene propylene rubber (EPDM), polyisobutylene rubber and the like, and polymer materials such as polyethylene naphthalate (PEN), polyethylene terephthalate (PET), polytetrafluoroethylene (PTFE), polyvinylidene fluoride (PVdF) and the like. It is to be noted that it is a matter of course that other materials may be used.

A size of the gasket is not particularly limited, in which it may be suitably decided taking account of a desired gas sealing ability and the relationship between it and the size of other members.

[Separator]

MEA is interposed between the separators to constitute a single cell. It is general that PEFC has a stack structure in which a plurality of single cells are connected in series with each other. At this time, the separator functions to electrically connect respective MEAs in series with each other, and is provided with flow paths and a manifold for allowing different fluids such as fuel gas, oxidizer gas and coolant to flow and also functions to maintain a mechanical strength of the stack.

A material constituting the separator is not particularly limited, in which hitherto known knowledge can be suitably referred to. Examples of the material include, for example, a carbon material such as dense carbon graphite, carbon plate and the like, and a metal material such as stainless steel and the like, and the like. The size of the separator and the shape of the flow paths are not particularly limited, in which they may be suitably determined taking account of the output characteristics of PEFC.

A production method for PEFC is not particularly limited, in which PEFC can be produced by referring to hitherto known knowledge in the field of fuel cell.

Hereinbefore, discussion has been made on the solid polymer electrolyte type fuel cell as an example; however, an alkali type fuel cell, a direct methanol type fuel cell, a micro fuel cell and the like are given as a fuel cell in addition to the polymer electrolyte type fuel cell, in which the present invention is applicable to any fuel cells. Of these, the solid polymer type fuel cell (PEFC) is preferably given because of being possible to be small-sized and to be made highly dense and high in power output.

The above-mentioned fuel cell is useful for a stationary power source in addition to a power source for a movable body such as a vehicle or the like whose mounting space is limited, and suitably used particularly for a vehicle which frequently makes starting/stopping of a system and power output fluctuation, more preferably suitably used for an automotive vehicle.

<Second Implementation Mode>

Next, the second implementation mode of the present invention will be discussed.

In a low temperature condition such as in winter season or the like, the temperature of a fuel cell sharply lowers below an appropriate operation temperature during stopping of operation. Particularly in a fuel cell in a condition below freezing point, water produced in the electrode catalyst layer stays in all over the reaction gas transportation path and there is a fear of the water being frozen, so that the water-drainage during starting at sub-zero temperature is an important factor. However, with conventional techniques, it is difficult to obtain a fuel cell high in starting ability at sub-zero temperature.

Accordingly, the present invention (the second implementation mode) is made upon paying attention on the above-mentioned problems, and has an object to provide a gas diffusion layer for a fuel cell whose sub-zero temperature starting ability can be improved by preventing staying of water.

A gas diffusion layer of the present invention (the second implementation mode) includes a hydrophilic porous layer including an ion conductive material and an electrically conductive material covered with the above-mentioned ion conductive material, and a porous gas diffusion layer base material. Additionally, at least a part of the hydrophilic porous layer is disposed in the gas diffusion layer base material. Further, at least a part of the gas diffusion layer base material is a hydrophilic treatment layer which has undergone a hydrophilic treatment.

According to the gas diffusion layer of the present invention (the second implementation mode), the evaporation area for water can be secured in the gas diffusion layer, and therefore the water-drainage of water produced during electricity generation can be secured even under a low temperature condition. Further, the evaporating ability of liquid water is improved by the hydrophilic porous layer, and a water vapor transportation characteristics in the gas diffusion layer is improved, so that staying of produced water inside MEA can be further prevented thereby to secure the starting ability of the fuel cell.

The present invention (the second implementation mode) relates to a gas diffusion layer including a hydrophilic porous layer containing an ion conductive material and an electrically conductive material covered with the ion conductive material, and a porous gas diffusion layer base material, in which at least a part of the hydrophilic porous layer is disposed to the gas diffusion layer base material, in which at least a part of the gas diffusion layer base material is a hydrophilic treatment section which has undergone a hydrophilic treatment.

Figure 3:
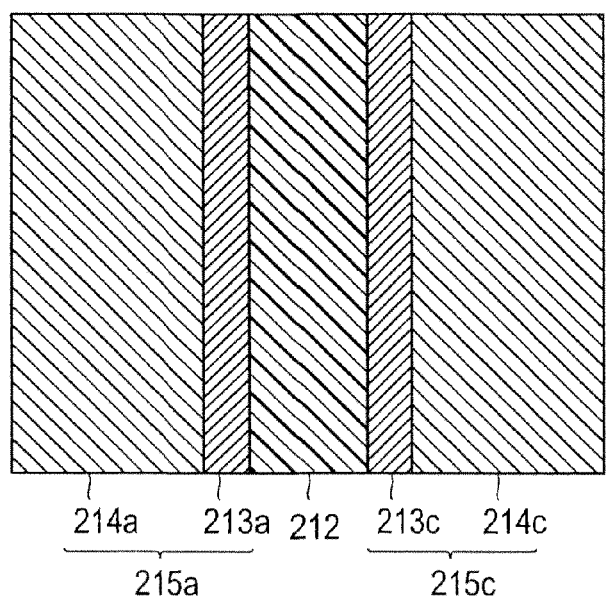
FIG. 3 is a schematic view showing a configuration of a general MEA.

In FIG. 3, the configuration of a general MEA is shown. In general, MEA 210 has such a configuration that an anode-side electrode catalyst layer 213a and a cathode-side electrode catalyst layer 213c are disposed opposite to each other and respectively at the opposite surfaces of a polymer solid electrolyte membrane 212, and this is interposed between an anode-side gas diffusion layer 213a and a cathode-side gas diffusion layer 213c. The electrode catalyst layer (213a, 213c) and the gas diffusion layer (214a, 214c) constitute a gas diffusion electrode (215a, 215c).

As discussed above, in a fuel cell, water is produced mainly in the cathode-side electrode catalyst layer 213c. Produced water is transported to the cathode-side gas diffusion layer 214c to be discharged to the outside of the cathode-side gas diffusion layer 214c, or transported successively to the polymer solid electrolyte 212, the anode-side electrode catalyst layer 213a and the anode-side gas diffusion layer 214a to be discharged to the outside of the anode-side gas diffusion layer 214a.

Here, in general, the electrode catalyst layer 213a, 213c contains ion conductive polymer electrolyte (ion conductive material). Accordingly, modes of transportation of water inside the electrode catalyst layer 213a, 213c mainly include transportation of water vapor in pores among electrode catalysts, transportation of liquid water in the ion conductive polymer electrolyte, and transportation of water vapor under vaporization of liquid water from the surface of the ion conductive polymer electrolyte.

However, in a low temperature condition, particularly during sub-zero temperature starting, the vaporization speed of liquid water from the surface of the ion conductive polymer electrolyte in the electrode catalyst layer may be lowered as compared with that at normal temperature. As a result, transportation of water from the catalyst layer to the gas diffusion layer unavoidably lowers. Additionally, in the gas diffusion layer which is generally formed of a porous material, transportation of liquid water is made in the pores of the porous material, and additionally water vapor makes its Knudsen diffusion in the pores so that the transportation proceeds. However, the speed of Knudsen diffusion of water vapor lowers at low temperatures, and therefore the transportability of water may be lowered. Accordingly, in low temperature conditions, the transportability of water in the gas diffusion layer unavoidably lowers as compared with that at normal temperature.

In view of the above, in the present invention (the second implementation mode), as a gas diffusion layer, a gas diffusion layer in which a hydrophilic porous layer containing an ion conductive material and an electrically conductive material covered with the ion conductive material, and a porous gas diffusion layer base material are laminated is used. By using the above-mentioned hydrophilic porous layer, a surface area of a gas-liquid interface through which liquid water is evaporable can be secured, thereby making it possible to secure the transportability of water at low temperatures. Further, in the gas diffusion layer of the present invention, at least a part of the above-mentioned hydrophilic porous layer is disposed to be buried in a surface of the above-mentioned gas diffusion layer base material, so that at least a part of the surface of the above-mentioned gas diffusion layer base material is a hydrophilic treatment section which has undergone a hydrophilic treatment. By taking such a mode, the surface area of the gas-liquid interface through which liquid water is evaporable can be further increased, thereby making it possible to improve drainage speed of water. As a result, water during sub-zero temperature starting becomes difficult to be accumulated in the pores thereby suppressing lowering in diffusibility of reaction gas thus making it possible to improve a sub-zero temperature electricity generation performance.

The above-mentioned hydrophilic treatment section preferably includes one or more selected from the group consisting of an ion conductive material, a metal oxide, and a hydrophilic polymer. Further specific examples of the ion conductive material include, for example, perfluorosulfonic acid, sulfonated polyetherether ketone and the like. Further specific examples of the metal oxide include, for example, titanium oxide, zirconium oxide and the like. Further specific examples of the hydrophilic polymer include, for example, polyacrylic acid, polyacrylamide and the like.

Figure 4:
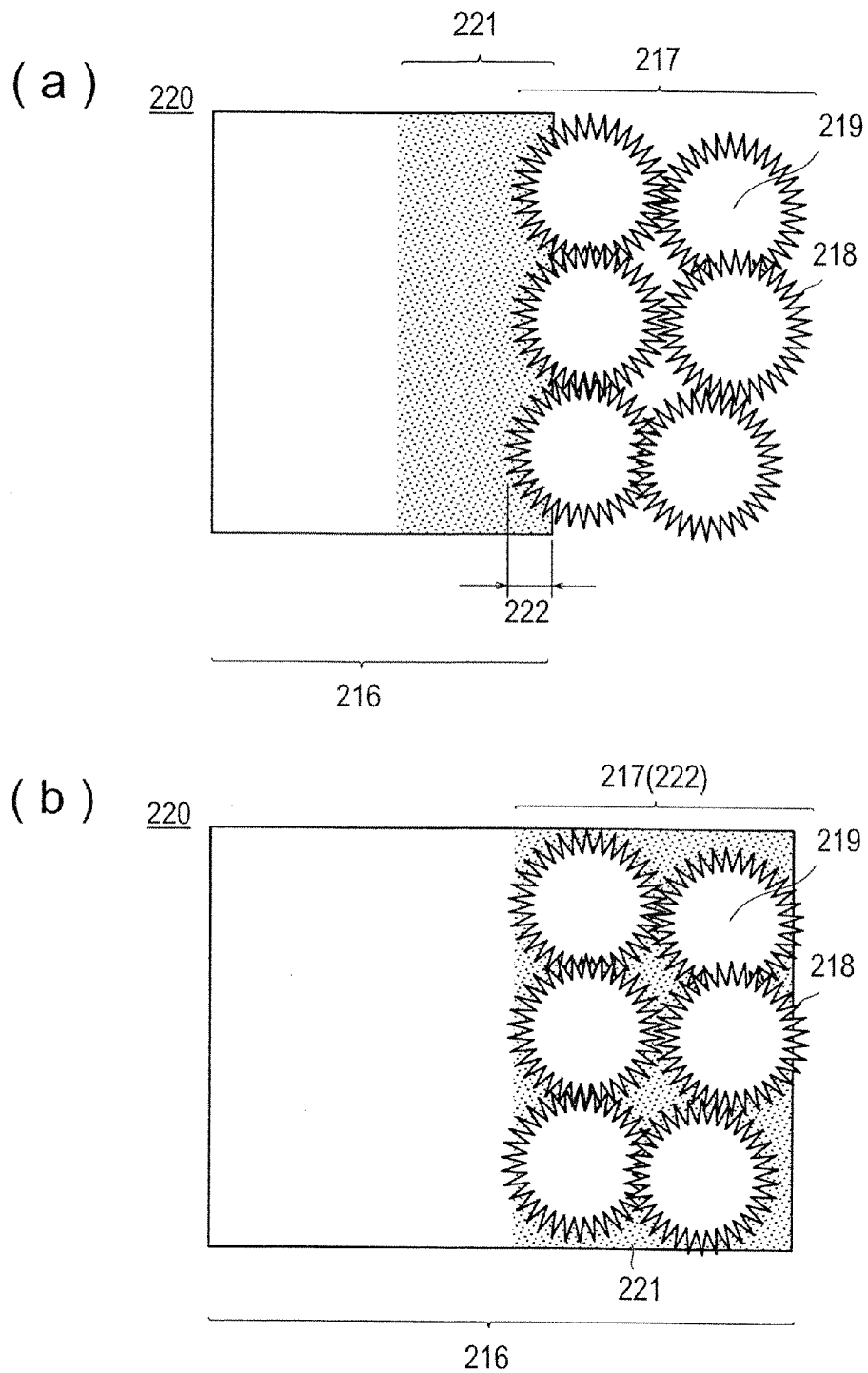
FIG. 4 in which (a) is a cross-sectional typical view showing a gas diffusion layer according to an embodiment of the present invention (a second implementation mode); and (b) is a cross-sectional typical view of a gas diffusion layer, showing a modified example of the above-mentioned embodiment.

(a) of FIG. 4 is a schematic illustration showing an embodiment of a gas diffusion layer according to the present invention (the second implementation mode). A gas diffusion layer 220 shown in (a) of FIG. 4 includes a porous gas diffusion layer base material 216 and a hydrophilic porous layer 217. The hydrophilic porous layer 217 includes an ion conductive material 218 and a granular electrically conductive material 219, in which the electrically conductive material 219 is covered with the ion conductive material 218. As discussed after, the gas diffusion layer 220 can be preferably assembled in MEA in such a manner that the gas diffusion layer base material 216 is located outside. Accordingly, water produced in the cathode-side catalyst layer can be transported in a direction of from an electrode catalyst layer (not shown) through the hydrophilic porous layer 217 to the gas diffusion layer base material 216. Accordingly, at least a part of the hydrophilic porous layer 217 is buried in the gas diffusion layer base material 216 so that the hydrophilic treatment section 221 is formed in at least a part of the gas diffusion layer base material 216, and therefore a continuous hydrophilic network can be constructed in a region of from the hydrophilic porous layer 217 to the gas diffusion layer base material 216. Further, by constructing such a hydrophilic network, in the region of from the hydrophilic porous layer 217 to the gas diffusion layer base material 216, the surface area of the ion conductive material 218 exposed to pores can be increased. Accordingly, evaporation of liquid water transported through the ion conductive material 218 effectively proceeds thereby making it possible to increase a water-drainage speed.

Here, it is required that the hydrophilic treatment section 221 as a section previously underwent a hydrophilic treatment exists in at least a part of a region 222 in which the hydrophilic porous layer 217 is buried, in the gas diffusion layer base material 216. Preferably whole of the region 222 in which the hydrophilic porous layer 217 is buried, in the gas diffusion layer base material 216 is the hydrophilic treatment section 221. For example, the hydrophilic treatment is made for a section having a thickness of 10 to 100% relative to the thickness of the gas diffusion layer base material 216 and extending from a surface on a side where the hydrophilic porous layer is formed, in a direction of the thickness of the gas diffusion layer base material 216, thus forming the hydrophilic treatment section 221. If the hydrophilic treatment section occupies the part of 10% or more of the gas diffusion layer base material 216 in thickness, the continuous hydrophilic network can be constructed in the region of from the hydrophilic porous layer 217 to the gas diffusion layer base material 216. An upper limit of a rate of formation of the hydrophilic treatment section 221 in the gas diffusion layer base material 216 is not particularly limited, so that whole (100% relative to the thickness of the gas diffusion layer base material 216) of the gas diffusion layer base material 216 may undergo the hydrophilic treatment.

At least a part of the hydrophilic porous layer 217 may be buried in the gas diffusion layer base material 216, in which a section having a thickness of 10 to 100% relative to the thickness of the hydrophilic porous layer 217 is preferably formed to be buried inside the gas diffusion layer bas material 217. In case that a section having a thickness of 10% or more relative to the thickness of the hydrophilic porous layer 217 is buried, a continuous hydrophilic network can be formed in the region of from the hydrophilic porous layer 217 to the gas diffusion layer base material 216. Further, the transportation distance for water can be shortened, and therefore the drainage speed of water can be improved. It is preferable that whole of the hydrophilic porous layer 217 is buried, i.e., the hydrophilic porous layer 217 is formed inside the gas diffusion layer 216, as shown in (b) of FIG. 4. This corresponds to a mode where 100% in thickness of the hydrophilic porous layer 217 is buried in the gas diffusion layer base material 216. With such a mode, the above-mentioned effects can be particularly remarkably obtained.

Preferably an effective diffusion coefficient D (m²/s) of water vapor in the gas diffusion layer base material including the hydrophilic treatment section satisfies the relationship of an equation shown below at 1 atm and at −20° C. using a porosity ε of the above-mentioned gas diffusion layer base material and an inflection degree γ of the above-mentioned gas diffusion layer base material.

$$D \geq 2.0 \times 10^{-5} \times \epsilon^{\gamma} \quad \text{[Eq. 1]}$$

In case that the pore diameters of pores existing in the gas diffusion layer base material is equal to or smaller than a mean free path (a mean distance of advance of a molecule for a time of from the first collision of the molecule to the next collision of the molecule) of water vapor, Knudsen diffusion becomes predominant in diffusion of water vapor in the gas diffusion layer base material. However, in this case, a diffusion coefficient is remarkably lowered relative to a diffusion under molecular diffusion. As a result, in order that water vapor produced in the gas diffusion layer is smoothly diffused in the gas diffusion layer base material so as to be discharged out of the gas diffusion layer, it is preferable that diffusion of water vapor within the gas diffusion layer base material meets the condition of the diffusion under the molecular diffusion.

A diffusion coefficient $D_{b,w\text{-}A}$ (m²/s) of water vapor under the molecular diffusion can be calculated according to Chapman-Enskog equation shown below, for example, with a binary component system of water vapor w and a gas kind A.

$$D_{b,w\text{-}A} = 0.0018583 \cdot \frac{\sqrt{T^3\left(\frac{1}{M_w} + \frac{1}{M_A}\right)}}{p\sigma_{w\text{-}A}^2 \Omega_{w\text{-}A}} \quad \text{[Eq. 2]}$$

$$\sigma_{w\text{-}A} = \frac{1}{2}(\sigma_w + \sigma_A)$$

$$\Omega_{w\text{-}A} = f(kT/\varepsilon_{w\text{-}A}), \varepsilon_{w\text{-}A} \equiv \sqrt{\varepsilon_w \varepsilon_A}$$

In the equation, T is an absolute temperature, and p is a pressure (atm); $M_w$ and $M_A$ are respectively molecular weights (g/mol) of water vapor and the gas kind A; $\sigma_w$ and $\sigma_A$ are respectively collision diameters (A) of water vapor and the gas kind A; k is Boltzmann constant; and $\epsilon_w$ and $\epsilon_A$ are respectively Lenard-Jones parameters of water vapor and the gas kind A.

Here, when a calculation is made using 2.641, 3.798 (nitrogen), 809.1 and 71.4 (nitrogen) respectively as $\sigma_w$, $\sigma_{N2}$, $\epsilon_w/k$ and $\epsilon_{N2}/k$ under the condition of 1 atm and 20° C., it is derived that the diffusion coefficient of water vapor relative to nitrogen under the molecular diffusion is about $2.0 \times 10^{-5}$ m²/s. When a mutual diffusion coefficient, for example, of hydrogen and oxygen is calculated for gas to be supplied to a fuel cell by a calculation similar to the above one, the diffusion coefficient becomes the lowest in case of being relative to nitrogen.

An effective diffusion coefficient D of water vapor within the gas diffusion layer is, using the porosity ε of the gas diffusion layer base material, and the inflection degree γ of the gas diffusion layer base material, represented by $$D = D_{b,w\text{-}A} \times \epsilon^{\gamma} \quad \text{[Eq. 3]}$$

Accordingly, if the effective diffusion coefficient D (m²/s) in the gas diffusion layer base material is not lower than $2.0 \times 10^{-5} \times \epsilon^{\gamma}$ at 1 atm and −20° C., it is judged that diffusion of water vapor proceeds mainly under the molecular diffusion, so that transportation of water vapor can be smoothly made. As a result, the drainage speed of water can be improved. Here, the porosity ε of the gas diffusion layer base material can be determined as a rate of a volume of pores relative to a volume of a layer upon measuring the volume of pores (fine pores) existing within the layer, for example, under a pore size distribution measurement by a mercury press-in method. The inflection degree γ of the gas diffusion layer base material can be calculated from an effective diffusion coefficient measuring result under a gas permeation test and a porosity measuring result under an analysis such as the mercury press-in method and the like.

Preferably, the pore diameters of pores in the above-mentioned gas diffusion layer base material is preferably not smaller than 1 μm in minimum value (minimum pore diameter). If the minimum pore diameter is not smaller than 1 μm, diffusion of water vapor under Knudsen diffusion can be almost ignored, so that the diffusion of water vapor under the molecular diffusion become predominant thereby making it possible to further improve the transportation speed of water vapor. As a result, the drainage speed of water can be improved. Here, the minimum pore diameter of the gas diffusion layer base material can be determined, for example, under a pore size distribution measurement by a mercury press-in method. An upper limit value of the minimum pore diameter is not particularly limited, in which it is substantially about 10 μm.

It is to be noted that the gas diffusion electrode of this embodiment may include the anode-side gas diffusion layer or the cathode-side gas diffusion layer, in which it is preferably applied to at least the anode-side gas diffusion electrode. When a fuel cell is started below the freezing point, water produced by electricity generation freezes thereby impeding transportation of oxygen, which is a factor of lowering the starting ability. Since the produced water is formed mainly at the cathode-side catalyst layer, it is important to improve the transportability of water to the anode-side in order to promote drainage of the produced water. By disposing the gas diffusion layer of this embodiment at the anode-side, more the produced water can be transported, thereby making it possible to improve the starting ability below the freezing point.

Hereafter, members constituting the gas diffusion layer of the second implementation mode will be discussed.

(Hydrophilic Porous Layer)

As discussed above, the hydrophilic porous layer includes the ion conductive material and the electrically conductive material covered with the ion conductive material.

In the hydrophilic porous layer used for the gas diffusion layer in the present invention, a cover area $S_{ion}$ of the electrically conductive material covered with the ion conductive material is preferably not smaller than 200 m²/g carbon, the cover area being given by $S_{ion} + S_{BET} \times \theta_{ion}$ where $S_{BET}$ is a BET nitrogen specific surface area of the electrically conductive material, and $\theta_{ion}$ is a covering ratio of the ion conductive material.

The present inventors have made studies to improve the drainage of produced water. As a result, it has been found that the cover area of the electrically conductive material contained in the hydrophilic porous layer and covered with the ion conductive material plays a very important role in water drainage. As a result of making further studies, knowledge discussed below has been obtained.

At sub-zero temperatures, transition of from liquid water to gas phase is difficult to occur, so that how to make transition of from liquid phase to gas phase is important. It has been grasped that the electrically conductive material plays an important role in improving the water transportability of from liquid phase to gas phase. The electrically conductive material having the cover area of not smaller than 200 m²/g carbon with the ion conductive material is large in vaporizing area for liquid water, so that a resistance in phase change of from liquid phase to gas phase can be lowered.

Here, the cover area is given by $S_{ion}=S_{BET}\times\theta_{ion}$ ($S_{ion}$: the cover area with the ion conductive material (m$^2$/g), $S_{BET}$: a BET nitrogen specific surface area (m$^2$/g), and $\theta_{ion}$: a covering ratio of the ion conductive material). Accordingly, the cover area with the ion conductive material is a value which can be calculated by measuring the BET nitrogen specific surface area of the electrically conductive material and the covering ratio of the ion conductive material if the electrically conductive material to be used is decided. Additionally, the cover area with the ion conductive material is said to be a value which can be controlled by a shape of the electrically conductive material.

In the present specification, the covering ratio $\theta_{ion}$ is represented by a ratio (determined by $\theta_{ion}=C_{dl}$ at relative humidity 30%/$C_{dl}$ at relative humidity 100%) between an electric double layer capacity ($C_{dl}$) at a relative humidity 30% and an electric double layer capacity ($C_{dl}$) at relative humidity 100%. Here, the reason why the ratio between the relative humidity 30% and the relative humidity 100% is employed is as follows: Under a high humidity condition, the electric double layer formed at an interface between the electrically conductive material and water adsorbed at the surface of the electrically conductive material or at an interface between the electrically conductive material and the ion conductive material is measured. Under a low humidity condition, the electric double layer formed at an interface between the electrically conductive material and the ion conductive material is mainly measured. Here, the electric double layer capacity becomes nearly constant at the relative humidity not higher than about 30%. Accordingly, in the present invention, the relative humidity 30% and the relative humidity 100% are respectively determined at representative points of the low humidity condition and the high humidity condition, in which the ratio in electric double layer capacity between them is employed to make an index representing a degree of coating of the ion conductive material on the electrically conductive material.

A value measured by a method mentioned below is employed as the electric double layer capacity.

First, the hydrophilic porous layer containing no catalyst component and the catalyst layer were respectively disposed at the different surfaces of an electrolyte membrane thereby producing the membrane electrode assembly. The assembly were interposed at its opposite surfaces between a pair of gas diffusion layers, further between carbon separators and further between gold-plated collector plates thereby obtaining a cell similar to a usual fuel cell. In a condition where humidity-controlled hydrogen gas was supplied to the catalyst layer while humidity-controlled nitrogen gas was supplied to the hydrophilic porous layer, the electric potential of the hydrophilic porous layer was scanned 5 to 10 times within a range of 0.2 to 0.6 V relative to a reference electrode using the catalyst layers respectively as the reference electrode and an opposite electrode. These scans were made at a scanning speed of 50 mV/s. An obtained relationship between electric current and electric potential indicated a waveform similar to rectangle. This represented that oxidation and reduction reactions did not occur on the electrode, and charging and discharging of the electric double layer was a main factor of electric current. In this waveform, the electric double layer capacity was calculated by dividing an average value of absolute values of oxidation current and reduction current at a certain electric potential such as 0.3 V by a scanning speed. This measurement was made under a variety of humidity conditions, thereby obtaining the relationship between the electric double layer capacity and the relative humidity.

Additionally, a value measured by a method discussed below is employed as the BET nitrogen specific surface area of the electrically conductive material.

(Measuring Method of the BET Nitrogen Specific Surface Area)

1. Sampling, Weighing and Preliminary Drying

About 0.04 to 0.07 g of powder was accurately weighed and encapsulated in a sample tube. This sample tube was subjected to a preliminary drying at 90° C. for several hours in a vacuum dryer and then subjected to a measurement. For weighing, an electronic weighing machine (AW220) produced by Shimadzu Corporation was used. Concerning a coated sheet, the purity net mass of about 0.03 to 0.04 g obtained by subtracting the mass of a Teflon (registered trade name) (base material) having the same area as the coated sheet from the whole mass of the coated sheet was used as a sample mass.

2. Measuring Condition (See Table 4 Shown Below)

TABLE 4

Measuring apparatus: High accuracy fully automatic gas absorption apparatus BELSORP36 produced by BEL Japan Inc.
Absorbed gas: N2
Dead volume measurement gas: He
Absorption temperature: 77 K (liquid nitrogen temperature)
Measurement pretreatment: 90° C. vacuum drying for several hours (set at a measuring stage after He purging)
Measuring mode: Adsorption step and desorption step at the same temperature
Measuring relative pressure P/P$_0$: about 0 to 0.99
Equilibrium setting time: 180 sec. for 1 relative pressure 3. Measuring Method A BET plot is prepared from a range of about 0.00 to 0.45 in relative pressure (P/P$_0$) in an absorption side of an adsorption and desorption isothermal curve, upon which the BET nitrogen specific surface area is calculated from the inclination and segment of the plot.

Additionally, in the hydrophilic porous layer used in the gas diffusion layer of the present invention (the second implementation mode), a transport resistance R$_{water}$ of liquid water in the ion conductive material under the condition of not higher than −20° C. is smaller than a transport resistance (diffusion resistance) R$_{vapor}$ of water vapor in pores. It is desirable that a transportation path for water through the hydrophilic material is sufficiently continuous. In other words, under low temperature conditions, vaporization of liquid water in the gas diffusion layer is difficult to occur as compared with in case of making starting at normal temperature. Accordingly, in order to raise a transportation speed of water under low temperature conditions, it is important to raise a transportation speed of liquid water in the ion conductive material. A sufficient transportation speed can be obtained in the hydrophilic porous layer under the above-mentioned condition.

It is assumed that transportation of water in the hydrophilic porous layer proceeds mainly under transportation of water vapor in pores in the hydrophilic porous layer and transportation of liquid water through the ion conductive material. The transport resistance R of water in the hydrophilic porous layer can be represented by an equation shown below, using the transport resistance R$_{vapor}$ of water vapor in pores of the hydrophilic porous layer, the transport resistance R$_{water}$ of liquid water through the ion conductive material, and the thickness Z of the hydrophilic porous layer.

$$R=Z(1/R_{vapor}+1/R_{water})^{-1} \quad [\text{Eq. 4}]$$

where the transport resistance $R_{vapor}$ (cm$^2$·s/mol) is given by an equation shown below.

$$R_{vapor} = RT/(D_{MPL,vapor} \cdot P_{sat}) \quad [\text{Eq. 5}]$$

where $P_{sat}$ is the saturated water vapor pressure of water; T is the absolute temperature; and $D_{MPL,vapor}$ is the effective diffusion coefficient in gas phase of water vapor in the hydrophilic porous layer.

the effective diffusion coefficient $D_{MPL,vapor}$ of water vapor in the hydrophilic porous layer can be calculated as discussed below.

Specifically, a diffusion coefficient Dt(r) in a pore having a radius r is represented by an equation shown below under a circumstance where molecular diffusion and Knudsen diffusion mixedly exist.

$$D_t(r) = \frac{1 + K_n(r)}{\frac{1}{D_m} + \frac{K_n(r)}{D_k(r)}} \quad [\text{Eq. 6}]$$

where $D_m$ is the diffusion coefficient under molecular diffusion; $D_k$ is the diffusion coefficient under Knudsen diffusion; $K_n$ is Knudesen number which is given by (mean free path of molecule/(pore diameter).

Here, it is taken into consideration that pores having various diameters $r_1, r_2, \ldots r_n$ are communicated with each other in the hydrophilic porous layer. An overall diffusion coefficient $D_A$ is represented by an equation shown below, using the diffusion coefficient Dt(r) (r: $r_1$-$r_n$) and the diffusion distance Z(r) (r: $r_1$-$r_n$) in a pore having a radium r (r: $r_1$-$r_n$).

$$D_A = \frac{Z(r_1) + Z(r_2) + \ldots + Z(r_n)}{\frac{Z(r_1)}{D_t(r_1)} + \frac{Z(r_2)}{D_t(r_2)} + \ldots + \frac{Z(r_n)}{D_t(r_n)}} \quad [\text{Eq. 7}]$$

Here, the pore diameter distribution can be determined by the mercury press-in method, and the diffusion distance Z(r) (r: $r_1$-$r_n$) in a pore having a radium r (r: $r_1$-$r_n$) can be calculated from an amount of pressed-in mercury in a pore having a radium r (r: $r_1$-$r_n$).

The thus determined $D_A$ is multiplied by the porosity $\epsilon_{MPL}$ of the hydrophilic porous layer thereby obtaining the effective diffusion coefficient $D_{MPL,vapor}$.

The transport resistance $R_{water}$ (s/m) of liquid water in the ion conductive material is represented by an equation shown below from a condition where transportation is made by the inclination of activity of water as a driving force, for example, in case of using the polymer electrolyte material such as Nafion as the ion conductive material.

$$R_{water} = \left(\frac{\rho}{M_m} D_{water} \frac{d\lambda}{da}\right)^{-1} \quad [\text{Eq. 8}]$$

where $\rho$ is the dry density of the ion conductive material; $M_m$ is the weight of the ion conductive material per unit water-containing group (for example, sulfonic acid group); $\lambda$ is the amount of water contained per unit water-containing group (for example, sulfonic acid group); a is the activity of water (water vapor partial pressure/saturated vapor pressure); and $D_{water}$ is the effective diffusion coefficient of liquid water in the ion conductive material. $\lambda$ is generally determined as an a-$\lambda$ characteristic from the experimental measurement of water vapor adsorption isothermal line. Accordingly, d$\lambda$/da is calculated by differentiating the characteristic. The effective diffusion coefficient $D_{water}$ is represented by an equation shown below, using the diffusion coefficient $D_w$ of water in the ion conductive material of bulk, the volume fraction $\epsilon_d$ of the ion conductive material, and the inflection degree $\gamma_d$ of the ion conductive material in the hydrophilic porous material.

$$D_{water} = D_w \times \epsilon_d^{\gamma d} \quad [\text{Eq. 9}]$$

Here, the diffusion coefficient $D_w$ of water in the ion conductive material of bulk is determined, for example, by a method described in S. Motupally et al JES, 147 (9) 3171 (2000).

Further, in the hydrophilic porous layer to be used in the present invention, the transportation path of liquid water is preferably sufficiently continuous. In other words, it is preferable that an ion-transportable material which can transport liquid water continuously covers a plurality of the electrically conductive materials under adhesion or integration thereby forming a continuous transportation path for water (liquid water). Continuity of the transportation path for water can be confirmed, for example, by measuring a variation of the electric double layer capacity ($C_{dl}$) relative to the relative humidity. As discussed above, under a high humidity condition, the electric double layer formed at an interface between the electrically conductive material and water adsorbed at the surface of the electrically conductive material or at an interface between the electrically conductive material and the ion conductive material is measured. Under a low humidity condition where contribution of the adsorbed water is minimized, the electric double layer formed at an interface between the electrically conductive material and the ion conductive material is mainly measured. Here, in case that the transportation path of liquid water in the ion conductive material is not continuous, the electric double layer is not formed with lowering in relative humidity so that the electric double layer capacity lowers. Accordingly, here, the electric double layer capacity at the relative humidity 40% and the electric double layer capacity at the relative humidity 30% are compared with each other, upon which the transportation path for liquid water is supposed to be sufficiently continuous when a change amount between the electric double layer capacities is not larger than 10%. The measuring method for the electric double layer capacity is discussed above.

A thickness of the hydrophilic porous layer is not particularly limited; however, it is preferably 2 to 40 µm, more preferably 2 to 25 µm. If the thickness of the hydrophilic porous layer is within the above range, the compatibility of water-drainage and gas diffusibility can be secured, which is preferable.

A porosity of whole the hydrophilic porous layer is not particularly limited, in which it is preferably 30 to 80%, more preferably 40 to 70%. If the porosity is within the above range, the water drainage and the gas diffusibility can be secured, which is preferable. The porosity can be determined as a rate of a volume of pores relative to a volume of a layer upon measuring the volume of pores (fine pores) existing within the layer under a pore size distribution measurement by a mercury press-in method.

The hydrophilic porous layer includes the electrically conductive material and the ion conductive material. As occasion demands, the electrically conductive material may carry a catalyst. The hydrophilic porous layer may contain materials other than the electrically conductive material and the ion conductive material. It is preferable that a content of the electrically conductive material and the ion conductive material in the hydrophilic porous layer is not less than 80 mass %, more preferably not less than 90 mass %. It is more preferable that the hydrophilic porous layer is constituted of the electrically conductive material and the ion conductive material.

Hereinafter, respective components constituting the hydrophilic porous layer of the second implementation mode will be discussed.

(Electrically Conductive Material)

Examples of the electrically conductive material include carbon materials such as natural graphite, artificial graphite, activated carbon, carbon black (oil furnace black, channel black, lamp black, thermal black, acetylene black and the like); metal oxides such as tin oxide, titanium oxide and the like; and the like. The carbon material is preferable. The above-mentioned electrically conductive materials may be used one kind singly or in combination of two or more kinds. It is more preferable to use carbon black, acetylene black which has a nitrogen BET specific surface area of 200 to 1600 $m^2/g$, Ketchen black, Black Pearls, Vulcan produced by Cabot Corporation, and activated carbon.

The above-mentioned electrically conductive material is preferably granular. The mean particle diameter of the granular electrically conductive material is preferably 5 to 100 nm and more preferably 10 to 60 nm. By this, a gas diffusibility of the hydrophilic porous layer can be ensured. It is to be noted that, in the present specification, "particle diameter" means the maximum distance L between any two points on the profile line of an active material particle. As the value of "mean particle diameter", a value calculated as a mean value of the particle diameters of particles observed in several to several tens fields of view by using an observing means such as a scanning electron microscope (SEM) and a transmission electron microscope (TEM) is employed.

(Ion Conductive Material)

The ion conductive material is not particularly limited as far as it is ion-conductive and is a material which can bond the electrically conductive materials. Examples of it include, for example, polymer such as polyacrylamide, water-based urethane resin, silicone resin and the like; polymer electrolyte; and the like. Polymer electrolyte is preferable. By using polymer electrolyte as the ion conductive material, the hydrophilic porous layer can be stably disposed adjacent to a component (electrolyte membrane or catalyst layer) of MEA in case of disposition of the hydrophilic porous layer, thereby making it possible to lower the water transport resistance between the electrically conductive material and the electrolyte membrane or the catalyst layer. As a result, the water transport resistance between the electrically conductive material and the electrolyte membrane or the catalyst layer is improved thereby making it possible that an equilibrium can be reached at an earlier time. In case that the ion conductive material is polymer electrolyte, the electrolyte may be the same as or different from the polymer electrolyte used in the catalyst layer or the electrolyte membrane. Further in case of producing MEA including the hydrophilic porous layer, materials may be commonly used thereby achieving a labor-saving during production.

The ion conductive material to be used is not particularly limited. Specifically, the ion conductive material is roughly classified into fluorine-based electrolyte in which fluorine atom is contained in the whole or part of a polymer frame, and hydrocarbon-based electrolyte in which no fluorine atom is contained in a polymer frame.

Preferable examples of the fluorine-based electrolyte include specifically perfluorocarbon sulfonic acid based polymer such as Nafion (registered trade name, produced by Dupont), Aciplex (trade name, produced by Asahi Kasei Chemicals Corporation), Flemion (registered trade name, produced by Asahi Glass Co., Ltd.) and the like, polytrifluorostyrene sulfonic acid based polymer, perfluorocarbon phosphonic acid based polymer, trifluorostyrene sulfonic acid based polymer, ethylenetetrafluoroethylene-g-styrene sulfonic acid based polymer, ethylene-trarafluoroethylene copolymer, polyvinylidene fluoride-perfluorocarbon sulfonic acid based polymer, and the like. The fluorine-based electrolyte is excellent in durability and mechanical strength.

Preferable examples of the above-mentioned hydrocarbon-based electrolyte include preferably polysulfone sulfonic acid, polyaryletherketone sulfonic acid, polybenzimidazolealkyl sulfonic acid, polybenzimidazolealkyl phosphonic acid, polystyrene sulfonic acid, polyetheretherketone sulfonic acid, polyphenyl sulfonic acid, and the like.

The above-mentioned ion conductive materials may be used singly or in combination of two or more kinds. Additionally, these ion conductive materials may be used in the state of solution or dispersion liquid.

Moving speed of water is important in the hydrophilic porous layer, and therefore EW of the ion conductive material is preferably low. EW is preferably not higher than 1200 g/eq., more preferably not higher than 1000 g/eq., and most preferably not higher than 700 g/eq. With such a range, the transport resistance of liquid water is reduced thereby improving the sub-zero temperature starting ability. The lower limit of EW is not particularly limited, in which it is preferably usually not lower than 500 g/eq. It is to be noted that EW (Equivalent Weight) represents an ion exchange group equivalent mass.

(Gas Diffusion Layer Base Material)

The gas diffusion layer base material has a function to promote diffusion of gas (fuel gas or oxidizer gas) supplied through the separator flow path, a function to serve as an electron conductive path and a function to support the hydrophilic porous layer.

A material for constituting the gas diffusion layer base material is not particularly limited, in which hitherto known knowledge can be suitably referred to Examples of the material include sheet-like materials having electrical conductivity and porosity such as a fabric made of carbon, a paper-like body formed by paper-making, a felt, and a nonwoven fabric. More specifically, preferable example of the material include a carbon paper, a carbon cloth, a carbon nonwoven fabric and the like. As the above-mentioned gas diffusion layer base material, commercial products may be used, in which examples include Carbon Paper TGP series produced by Toray Industries, Inc., carbon cloth produced by E-TEK, and the like.

A thickness of the gas diffusion layer base material may be decided upon taking account of the characteristics of the gas diffusion layer to be obtained, in which it may be about 30 to 500 μm. With such a thickness of the base material, a balance of mechanical strength and diffusibility of gas and water can be suitably controlled.

The gas diffusion layer base material used in the gas diffusion layer of the present invention has, at least a part thereof, a hydrophilic treatment section which has undergone a hydrophilic treatment.

As methods by which the gas diffusion layer base material undergoes the hydrophilic treatment, hitherto generally used ones can be used without particular limitation. Examples of the methods include methods and the like for oxidation-treating a desired section of the gas diffusion layer base material by using a gas phase method with oxygen gas, water vapor or the like; plasma irradiation; pyrogenic method (hydrogen combustion) employing water vapor generated under reaction of hydrogen and oxygen; a liquid phase method with strongly oxidizing aqueous solution containing potassium permanganate, nitric acid, chlorate, perchlorate, persulfate, perborate, percarbonate, hydrogen peroxide or the like; a gas phase method with ozone, nitrogen oxide, air or the like; and the like. It is preferable to use a method for applying a hydrophilic agent to a desired section of the gas diffusion layer base material. The above-mentioned hydrophilic agent is not particularly limited as far as it is hitherto general one, in which preferable examples of it include metal oxides such as titania, silica, alumina, magnesium oxide, calcium oxide, tin oxide and the like, and hydrophilic polymers containing hydrophilic group, such as perfluorocarbon sulfonic acid based polymers and the like represented by Nafion (registered trade name, produced by Dupont) and Flemion (registered trade name, produced by Asahi Glass Co., Ltd.). Otherwise, the above-mentioned ion conductive material may be used as the hydrophilic agent. By using these hydrophilic agents, a transportation path for liquid water can be effectively secured with inexpensive methods. The above-mentioned hydrophilic agent may be used one kind singly or in combination of two or more kinds.

The methods of making the hydrophilic treatment by using the above-mentioned hydrophilic agent are not particularly limited, in which the following method or the like are preferably used for example: A desired section of the gas diffusion layer base material is dipped in or impregnated with a solution containing the above-mentioned hydrophilic agent or a metal alkoxide solution containing an element of metal constituting a metal oxide used as a hydrophilic agent, and thereafter drying, calcination or the like is made if necessary. A solvent to be used for the above-mentioned solution is not particularly limited, in which examples thereof include water; alcohols such as methanol, ethanol, 1-propanol, 2-propanol, 1-butanol, 1-pentanol, 2-pentanol, 3-pentanol and the like; and polyalcohols such as ethylene glycol, propylene glycol, 1,2-butane diol, 1,3-butane diol, 1,4-butane diol, glycerol and the like. These may be used singly or in combination of two or more kinds.

(Production Method of Gas Diffusion Layer)

Figure 5:
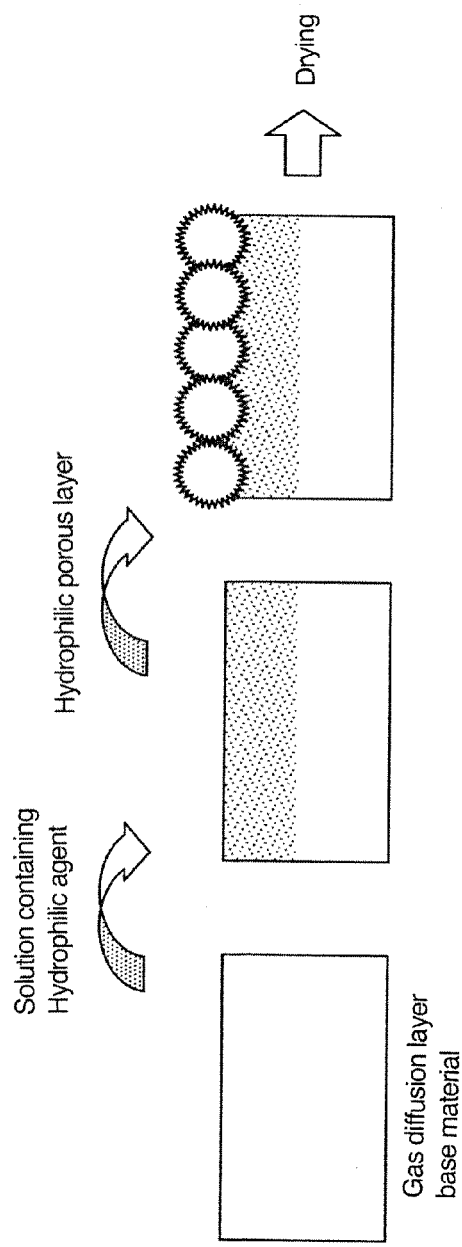
FIG. 5 is a typical view showing a production method of a gas diffusion layer.

A production method of the gas diffusion layer in which the hydrophilic porous layer is buried in the gas diffusion layer base material which has undergone the hydrophilic treatment is not particularly limited. For example, the following method and the like are used: As shown in FIG. 5, after the solution containing the hydrophilic agent is applied to the gas diffusion layer base material, an ink for the hydrophilic porous layer prepared by mixing the electrically conductive material, the ion conductive material and the solvent is further applied onto the gas diffusion layer base material before the above-mentioned solution is dried, followed by making drying. In case that the electrically conductive material carrying the catalyst component is used, it is preferable that the catalyst component has been previously carried on the electrically conductive material by using known methods such as impregnation method, liquid phase reduction carrying method, evaporation to dryness method, colloid adsorption method, evaporative decomposition method, reversed micelle method (microemulsion method), and the like.

A solvent to be used for the ink for the hydrophilic porous layer is not particularly limited, in which examples thereof include water; alcohols such as methanol, ethanol, 1-propanol, 2-propanol, 1-butanol, 1-pentanol, 2-pentanol, 3-pentanol and the like; and polyalcohols such as ethylene glycol, propylene glycol, 1,2-butane diol, 1,3-butane diol, 1,4-butane diol, glycerol and the like. These may be used one kind singly or in combination of two or more kinds.

Selection of the organic solvent is important for controlling the porosity of the hydrophilic porous layer. In case of preparing the hydrophilic porous layer whose density is low, it is preferable to use a solvent which is mixed with a high boiling point organic solvent whose boiling point exceeds 150° C., for the ink. In case of mixing the high boiling point organic solvent whose boiling point exceeds 150° C. is mixed in the ink, the mean pore diameter can become large, and additionally the porosity can become large.

The solvent in the ink for the hydrophilic porous layer may be constituted of only the high boiling point organic solvent. Additionally, a mixture of the high boiling point organic solvent and other solvent such as water and/or an organic solvent whose boiling point is lower than 150° C. (methanol, ethanol, 1-propanol, 2-propanol, 1-butanol, 1-pentanol, 2-pentanol, 3-pentanol and the like) may be used. In case of the mixture of the high boiling point organic solvent and other solvent, the rate of the high boiling point organic solvent in the solvent is preferably not less than 10 mass %, more preferably not less than 30 mass %. It is to be noted that it is more preferable that the rate of the high boiling point organic solvent is as high as possible, from the viewpoint of water retaining ability, so that the upper limit of the rate of the high boiling point organic solvent is not particularly limited; however, it is preferably not higher than 70 mass % upon taking account of dispersibility of the polymer electrolyte. In case of using the mixture of the high boiling point organic solvent and other solvent, it is known that the mean pore diameter and the porosity are increased.

Additionally, in preparation of the ink, the porosity can be controlled by intentionally changing a mixing ratio (I/C) of the ion conductive material (I) and the electrically conductive material (C).

It is to be noted that the solvent and dissolving agent in the present specification include a dispersion medium in which solid contents such as binder, the electrically conductive material and the like are dispersed, i.e., all liquid components other than solid components. Accordingly, for example, in case of producing the ink for the hydrophilic porous layer by mixing the ion conductive material dispersed in water and the organic solvent, the solvent in the present specification indicates both water and the organic solvent.

A solid content rate (a weight rate of the solid content relative to a whole weight of the ink for the hydrophilic porous layer) of the ink for the hydrophilic porous layer is not particularly limited, in which it is normally about 5 to 20 mass %. With such a range, the points of formation efficiency and stability of the porous layer are excellent.

A preparation method for the ink for the hydrophilic porous layer is not particularly limited. Additionally, a mixing order of the ion conductive material, the electrically conductive material and the solvent is not particularly limited, in which specifically (i-1) to (i-3) discussed below are given.

(i-1) A solution containing the ion conductive material is prepared, and then the above-mentioned solution is mixed with the electrically conductive material. Thereafter, the solvent is further added thereby to prepare the ink for the hydrophilic porous layer;

(i-2) A solution containing the ion conductive material is prepared, and then the solvent is added. Thereafter, the electrically conductive material is further mixed (added) thereby to prepare the ink for the hydrophilic porous layer; and (i-3) The electrically conductive material and the solvent are mixed with each other. Subsequently, a separately prepared solution containing the ion conductive material is further added thereby to prepare the ink for the hydrophilic porous layer.

Of the above-mentioned methods, the methods (i-1) and (i-2) are preferable, and the method (i-1) is more preferable. By this, water and the organic solvent are uniformly mixed with each other so that a solvent compound is readily formed.

In the above-mentioned methods (i-1) to (i-3), the ion conductive material is dispersed in the solvent in the solution containing the ion conductive material. An ion conductive material content rate in the solution containing the ion conductive material in this case is not particularly limited, in which a solid content is preferably 1 to 40 mass %, and more preferably 5 to 20 mass %. With such a content rate, the polymer electrolyte can be suitably dispersed in the solvent.

The solution containing the ion conductive material may be prepared by a person himself or herself, or a commercial product may be used as the solution. The dispersion solvent for the ion conductive material in the solution containing the above-mentioned ion conductive material is not particularly limited, in which water, methanol, ethanol, 1-propanol, 2-propanol and the like are given. Water, ethanol, 1-propanol are preferable taking account of dispersibility. These dispersion solvents may be used singly or in combination of two or more kinds.

Additionally, in a production process of the ink for the hydrophilic porous layer, after the ion conductive material, the electrically conductive material ad the solvent are mixed with each other, a separate mixing step may be made in order to accomplish good mixing. A preferable example of such a mixing step is to sufficiently disperse a catalyst ink by a ultrasonic homogenizer, or to sufficiently pulverize this mixture slurry by a sand grinder, a circulating ball mill, a circulating bead mill and the like, followed by making a vacuum degassing operation.

Besides, the solution containing the hydrophilic agent for forming the hydrophilic treatment section in the gas diffusion layer base material is prepared. The solvent to be used for the hydrophilic agent and for the solution containing the hydrophilic agent is discussed above.

Next, the above-mentioned solution containing the hydrophilic agent and the ink for the hydrophilic porous layer are successively applied onto the surface of the gas diffusion layer base material.

Applying methods of the solution containing the hydrophilic agent and the ink for the hydrophilic porous layer to the surface of the gas diffusion layer base material are not particularly limited, and therefore known methods can be used. Specifically, known methods such as spray (spray applying) method, Gulliver printing method, die coater method, screen printing method, doctor blade method, transfer printing method and the like can be used. Additionally, an apparatus used for applying the catalyst ink to the surface of the base material is also not particularly limited, in which known apparatuses can be used. Specifically, applying apparatuses such as a screen printer, a spraying device, a bar coater, a die coater, a reverse coater, a comma coater, a gravure coater, a spray coater, a doctor knife and the like can be used. It is to be noted that the applying step may be accomplished once or repeatedly several times.

It is to be noted that it is preferable that after the solution containing the hydrophilic agent is applied, the ink for the hydrophilic porous layer is successively applied before the solution is dried. It is preferable that the ink for the porous layer is applied within 60 minutes after the solution containing the hydrophilic agent is applied. With the above-mentioned mode, the continuous hydrophilic section can be formed from the hydrophilic porous layer to gas diffusion layer base material thereby improving the water transportability.

At this time, if a heat treatment is made after application of the ink for the hydrophilic porous layer, adhesion at an interface can be improved thereby lowering the water transportability. A condition of the heat treatment is not particularly limited, in which the heat treatment is preferably made at about 20 to 170° C. and for about 1 to 40 minutes. The step of the heat treatment may be made at any step in the MEA production process so as to be not limited to a mode in which the heat treatment is made immediately after the ink for the hydrophilic porous layer is applied to the base material.

Lastly, the base material on which the solution containing the hydrophilic agent and the ink for the hydrophilic porous layer are applied is dried to remove the solvent. A drying time is not particularly limited, in which 5 to 30 minutes are preferable. In addition, an atmosphere for drying is not particularly limited, in which drying is made preferably under an air atmosphere or under an inert gas atmosphere. The step of drying the solution containing the hydrophilic agent and the ink for the hydrophilic porous layer may be made at any step in the MEA production process as far as it is made after application of the ink for the hydrophilic porous layer so as to be not limited to a mode in which the drying is made immediately after the ink for the hydrophilic porous layer is applied to the base material.

(Gas Diffusion Electrode)

The gas diffusion layer of the second implementation mode has an excellent water-drainage performance even at sub-zero temperature starting. Accordingly, when the gas diffusion layer is applied to the gas diffusion electrode, a sub-zero temperature starting ability can be improved. Hereinafter, a preferable embodiment of the gas diffusion electrode including the gas diffusion layer of the above embodiment will be discussed. It is to be noted that each drawing is expressed upon being exaggerated for the sake of convenience, and therefore there is a case where the dimension ratios of respective constituting elements in each drawing may be different from actual ones. Additionally, the same reference numerals are assigned to the same members in each drawing thereby to omit explanation therefor.

Figure 6:
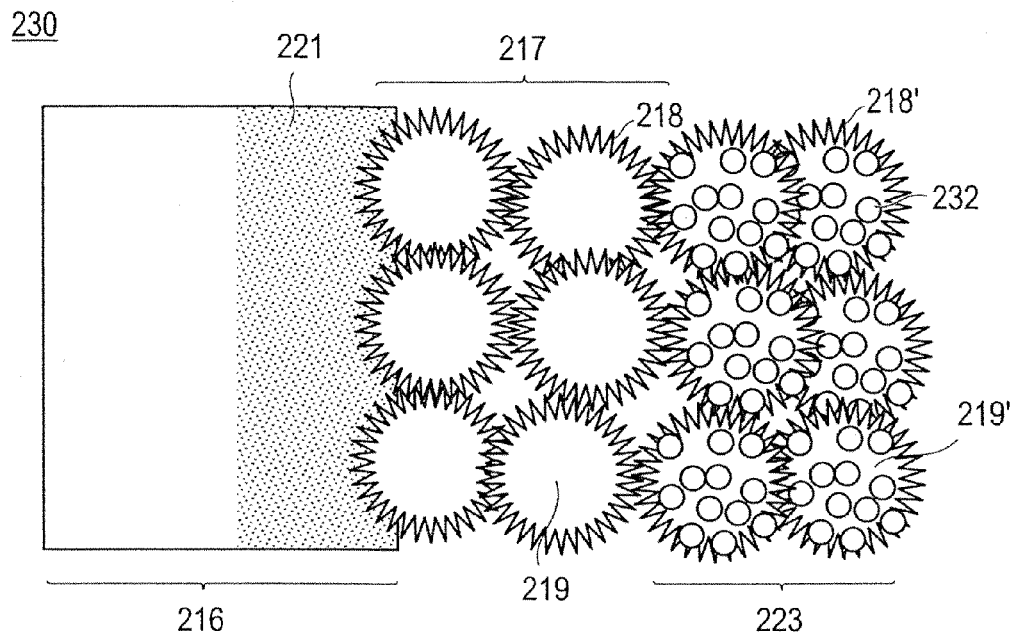
FIG. 6 is a cross-sectional typical view showing a gas diffusion layer according to an embodiment of the present invention (the second implementation mode)

FIG. 6 is a schematic illustration showing the embodiment of the preferable gas diffusion electrode 230 including the gas diffusion layer of the above embodiment. The gas diffusion electrode in FIG. 6 has a configuration in which the hydrophilic porous layer 217 is interposed between the electrode catalyst layer 223 and the gas diffusion layer base material 216. This is featured by the fact that the transportation path for liquid water is continuous in the electrode catalyst layer 223. In other words, it is preferable that the continuous transportation path for liquid water (communicated transportation path for liquid water) is formed under adhesion or integration among the ion conductive materials contained in the electrode catalyst layer 223. With the above-mentioned mode, the transportation path for liquid water from the catalyst layer to the hydrophilic porous layer and the gas diffusion layer base material can be secured. Accordingly, in case that the gas diffusion electrode of this embodiment is applied to a fuel cell, sub-zero temperature starting ability can be improved. Here, the transportation path for liquid water can be formed by covering the electrode catalyst 232 with the ion conductive material 218'. Concerning the continuity of the transportation path for liquid water, it can be confirmed that more continuity of the transportation path for liquid water can be secured as the electric double layer capacity ($C_{dl}$) is larger and as a variation of the electric double layer capacity relative to the relative humidity is smaller, upon measuring the variation of the electric double layer capacity relative to the relative humidity.

The above-mentioned gas diffusion electrode may be the anode-side gas diffusion electrode or the cathode-side diffusion electrode. Both the anode-side and the cathode-side electrodes may be the gas diffusion electrodes of this embodiment. The gas diffusion electrode of this embodiment is applied to at least the anode-side gas diffusion electrode. By disposing, in the anode-side, the gas diffusion layer in which a hydrophilic network is formed from the hydrophilic porous layer to the gas diffusion layer base material, more produced water can be transported thereby improving a starting ability below the freezing point.

In the description made below, typical modes of members other than the gas diffusion layer will be discussed regarding the gas diffusion electrode of the second implantation mode, in which the technical scope of the present invention is not limited to only modes mentioned below.

[Electrode Catalyst Layer]

The electrode catalyst layer is a layer where reaction actually proceeds. Specifically, an oxidation reaction of hydrogen proceeds in the anode-side electrode catalyst layer, whereas a reduction reaction of oxygen proceeds in the cathode-side electrode catalyst layer. The electrode catalyst layer contains a catalyst component, an electrically conductive carrier carrying the catalyst component, and the ion conductive material as a proton conductive polymer electrolyte.

The catalyst component used in the anode-side electrode catalyst layer is not particularly limited as far as it has a catalytic action to oxidation reaction of hydrogen, so that known catalysts can be similarly used for it. Additionally, the catalyst component used in the cathode-side catalyst layer is also not particularly limited as far as it has a catalytic action to reduction reaction of oxygen, so that known catalysts can be similarly used for it. Specifically, the catalyst component is selected from metals such as platinum, ruthenium, iridium, rhodium, palladium, osmium, tungsten, lead, iron, chromium, cobalt, nickel, manganese, vanadium, molybdenum, gallium, aluminum and the like, and alloy and the like thereof. It is a matter of course that other materials may be used for the catalyst component. Of these, the catalyst component containing at least platinum is preferably used in order to improve a catalytic activity, a poisoning resistance to carbon monoxide and the like, and a heat resistance. The composition of the above-mentioned alloy preferably contains 30 to 90 atomic % of platinum and 10 to 70 atomic % of a metal to be alloyed with platinum, according to kinds of metals to be alloyed with platinum. The composition of the alloy in case of using the alloy as the cathode-side catalyst is different according to kinds of metals to be alloyed so as to be suitably selected by persons skilled in the art, in which the composition of 30 to 90 atomic % of platinum and 10 to 70 atomic % of other metals to be alloyed is preferable. It is to be noted that the alloy is a generic name of ones which are prepared by adding one or more kinds of metal elements or non-metal elements to a metal element and which have metallic properties. As a structure of the alloy, there are an eutectic alloy which is, so to speak, a mixture where component elements form separate crystals, one in which component elements completely melt to form a solid solution, and one in which component elements form an intermetallic compound or a compound of metal and non-metal, in which either one may used for the present application. In this time, the catalyst component to be used for the anode-side electrode catalyst layer and the catalyst component to be used for the cathode-side electrode catalyst layer are selected from the above-mentioned ones. In the description made below, the catalyst components of the anode-side electrode catalyst layer and the cathode-side electrode catalyst layer have similar definition between them, and therefore are referred to as "catalyst component" in the lump, unless otherwise specified. However, the catalyst components of the anode-side electrode catalyst layer and the cathode-side electrode catalyst layer are not required to be the same and therefore may be suitably selected so as to make the desired effects mentioned above.

The shape and size of the catalyst component is not particularly limited so that similar shape and size to those of known catalyst components may be used, in which the catalyst component is preferably granular. In this connection, the mean particle diameter of a catalyst particle is preferably 1 to 30 nm, more preferably 1.5 to 20 nm, most preferably 2 to 10 nm, and particularly preferably 2 to 5 nm. If the mean particle diameter of the catalyst particle is within such a range, a balance between a catalyst utilization factor in connection with an effective electrode area where an electrochemical reaction proceeds and a convenience in catalyst-carrying may be suitably controlled. It is to be noted that "the means particle diameter of the catalyst particle" may be measured as a crystal size determined from the half bandwidth of a diffraction peak of the catalyst component in a X-ray diffraction or as a mean value of the particle diameter of the catalyst component obtained from the image of a transmission electron microscope.

The electrically conductive carrier functions as a carrier for carrying the above-mentioned catalyst component, and as an electronically conductive path relating to electron transfer between it and the catalyst component.

As the electrically conductive carrier, it is sufficient to have a specific surface area for carrying the catalyst component in a desired dispersed state and a sufficient electronic conductivity, and it is preferable to be formed of a carbon-based material whose main component is carbon. Specifically, examples of the carbon-based material include carbon particles formed of carbon black, graphitization-treated carbon black, activated carbon, coke, natural graphite, artificial graphite, carbon nanotube, carbon nanohorn, carbon fibril structure, and/or the like. It is to be noted that the fact that "main component is carbon" means that carbon atom is contained as the main component, and therefore the fact is an idea including both a matter of being formed of only carbon atom and another matter of being substantially formed of carbon atom. According to cases, element(s) other than carbon atom may be contained in the electrically conductive carrier in order to improve the characteristics of a fuel cell. It is to be noted that the fact that "substantially formed of carbon atom" means that mixing of about 2 to 3 mass % or less of impurity getting mixed is permissible.

It is preferable to use a graphitized carbon material such as graphitization-treated carbon black, as the electrically conductive carrier in the electrode catalyst layer, particularly in the anode-side electrode catalyst layer, because of making it possible to improve a corrosion resistance of the electrically conductive material. Further, by covering the graphitized carbon material with the ion conductive material, the transport resistance of liquid water can be lowered. By locating the hydrophilic porous layer to be adjacent to the electrode catalyst layer which uses the graphitized electrically conductive material, the water drainage can be improved, the sub-zero temperature starting ability can be improved, and a membrane electrode assembly provided with a corrosion resistance of the electrically conductive material is offered. The graphitization-treated carbon black is preferably spherical, in which the means lattice spacing $d_{002}$ of [002] planes calculated under X-ray diffraction is preferably 0.343 to 0.358 nm, and the BET specific surface area is preferably 100 to 300 $m^2/g$.

The BET specific surface area of the electrically conductive carrier may be sufficient to allow the catalyst component to be carried under a highly dispersed state, in which it is preferably 20 to 1600 m$^2$/g and more preferably 80 to 1200 m$^2$/g. With the specific surface area within such a range, the balance between the dispersability of the catalyst component on the electrically conductive carrier and the effective utilization factor of the catalyst component can be suitably controlled.

A size of the electrically conductive carrier is not particularly limited, in which it is good that a mean particle diameter is 5 to 200 nm, preferably about 10 to 100 nm from the viewpoints of convenience of carrying, catalyst utilization factor and controlling the thickness of the electrode catalyst layer within a suitable range.

In a composite (hereinafter referred to as also "electrode catalyst") in which the catalyst component is carried on the electrically conductive carrier, a carried amount of the catalyst component is preferably 10 to 80 mass %, more preferably 30 to 70 mass % relative to the whole amount of the electrode catalyst. If the carried amount of the catalyst component is within such a range, a balance between a dispersion degree of the catalyst component on the electrically conductive carrier and a catalyst performance can be suitably controlled. It is to be noted that the carried amount of the catalyst component can be measured by an inductively coupled plasma emission spectrochemical analysis method (ICP).

Additionally, carrying the catalyst component on the carrier can be accomplished by known methods. For example, the known methods such as impregnation method, liquid phase reduction carrying method, evaporation to dryness method, colloid adsorption method, evaporative decomposition method, reversed micelle (microemulsion) method, and the like can be used.

Otherwise, in the present invention, marketed products may be used as the electrode catalyst. Examples of such marked products include, for example, one produced by Tanaka Kikinzoku Kogyo K.K., one produced by N.E. Chemcat Corporation, one produced by E-TEK, one produced by Johnson Matthey, and the like. These electrode catalysts are ones in which platinum or platinum alloy is carried on a carbon carrier (a carried concentration of a catalyst species: 20 to 70 mass %). In the above-mentioned, examples of the carbon carrier are Ketchen Black, Vulcan, acetylene black, Black Pearls, graphitization-treated carbon carrier which is previously heat-treated at a high temperature (for example, graphitization-treated Ketchen Black), carbon nanotube, carbon nanohorn, carbon fiber, mesoporous carbon, and the like.

The electrode catalyst layer includes the ion conductive material as an ion conductive polymer electrolyte in addition to the electrode catalyst. By adding the ion conductive material, the transportation path for liquid water can be secured in the catalyst layer. Further, by allowing the ion conductive material in the catalyst layer to contact with the hydrophilic porous layer, the transportation path for liquid water from the catalyst layer to the hydrophilic porous layer can be secured. The ion conductive material is not particularly limited so that hitherto known knowledge can be suitably referred to, in which, for example, the ion conductive material constituting the above-mentioned porous layer may be used. The ion conductive material is preferably added in an amount of 50 to 150 mass % relative to the electrode catalyst.

EW of the ion conductive material is preferably low. EW is preferably not higher than 1200 g/eq., more preferably not higher than 1000 g/eq., and most preferably not higher than 700 g/eq. With such a range, the transport resistance of liquid water is reduced thereby improving the sub-zero temperature starting ability. The lower limit of EW is not particularly limited, in which it is preferably usually not lower than 500 g/eq. It is to be noted that EW (Equivalent Weight) represents an ion exchange group equivalent mass.

The electrode catalyst layer is produced by applying the catalyst ink including the electrode catalyst, the ion conductive material, the solvent and the like onto the solid polymer electrolyte membrane by hitherto known methods such as spray method, transfer printing method, doctor blade method, die coater method and the like. The solvent is not particularly limited, in which the same solvent as that used for the ink for the above-mentioned hydrophilic porous layer may be used.

An applied amount of the catalyst ink to the solid polymer electrolyte membrane is not particularly limited as far as it is an amount with which the electrode catalyst can sufficiently exhibit an action for catalyzing an electrochemical reaction, in which it is preferable to apply the catalyst ink in such a manner that the mass of the catalyst component per unit area becomes 0.05 to 1 mg/cm$^2$. It is preferable to apply the catalyst ink in such a manner that a thickness of the catalyst ink to be applied becomes 5 to 30 μm after the catalyst ink is dried. It is to be noted that the applied amount and the thickness of the above-mentioned catalyst ink at anode-side are respectively not required to be the same as those at the cathode-side, and therefore they may be suitably adjusted.

(Membrane Electrode Assembly)

The gas diffusion layer and the gas diffusion electrode of the second implementation mode has an excellent water drainage performance during a sub-zero temperature starting. Accordingly, in case of applying them to MEA, a sub-zero temperature starting ability can be improved. Hereinafter, a preferable embodiment of MEA including the gas diffusion layer or gas diffusion electrode, of the second implementation mode will be discussed.

Figure 7:
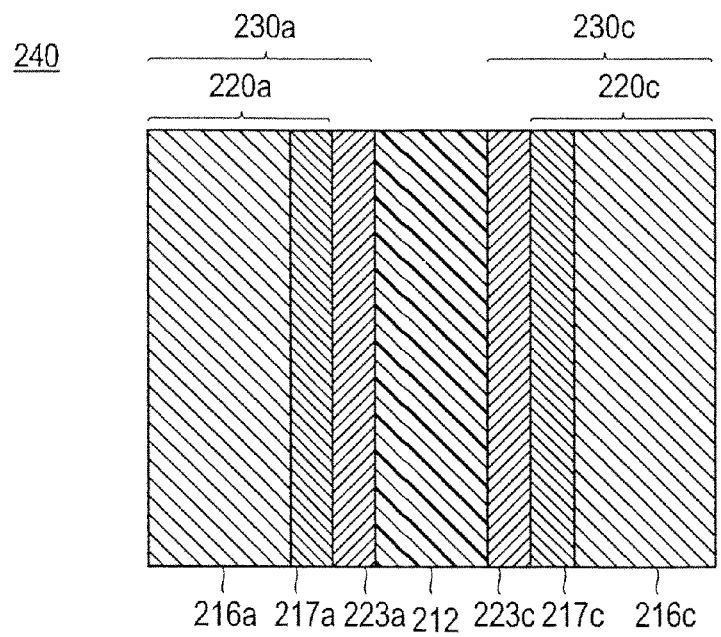
FIG. 7 is a cross-sectional view showing an embodiment of MEA.

FIG. 7 is a sectional typical view of an embodiment of a preferable MEA including the gas diffusion layer and the gas diffusion electrode, of the second implementation mode. MEA 240 in FIG. 7 has such a configuration that an anode-side electrode catalyst layer 223a and a cathode-side electrode catalyst layer 223b are oppositely disposed respectively at the opposite surfaces of a solid polymer electrolyte membrane 212, and this is interposed between an anode-side gas diffusion layer base material 216a and a cathode-side gas diffusion layer base material 216c. Further, a hydrophilic porous layer 217 is disposed between the anode-side electrode catalyst layer 223a and the anode-side gas diffusion layer base material 216a, and between the cathode-side electrode catalyst layer 223c and the cathode-side gas diffusion layer base material 216c. Here, the gas diffusion layer 220 including the gas diffusion layer base material 216a, 216c and the hydrophilic porous layer 217a, 217c and the gas diffusion electrode including the electrode catalyst layer 223a, 223c are respectively used as the gas diffusion layer of the present invention and the gas diffusion electrode of the present invention, thereby making it possible to promote a transportation of liquid water even during a sub-zero temperature starting. Accordingly, in case that MEA of this embodiment is applied to a fuel cell, a sub-zero temperature starting ability can be improved.

In this embodiment, the above-mentioned gas diffusion layer or gas diffusion electrode may be disposed at either the anode-side or the cathode-side. A preferable mode is such that the above-mentioned gas diffusion layer or the gas diffusion electrode is disposed at least at the anode-side. It has been discussed before that when a fuel cell is started below freezing point, water produced under electricity generation freeze thereby impeding transportation of oxygen, which is supposed to be a factor of lowering the starting ability. Accordingly, it is important that the moving direction of water during absorption of produced water is from the cathode-side electrode catalyst layer through the electrolyte membrane to the anode-side electrode catalyst layer. By disposing the above-mentioned gas diffusion layer or gas diffusion electrode at the anode-side, more produced water returns to the anode catalyst layer side thereby making it possible to improve the starting ability below freezing point. Additionally, during operation of the fuel cell, an improvement is made on a transportation ratio of produced water to the hydrogen electrode at which a reaction gas partial pressure is high and a diffusion coefficient of water vapor is high, so that produced water is transported to the electrolyte membrane, thereby making it possible to maintain the electrolyte membrane wet.

Action at the anode catalyst layer side will be discussed in detail hereinafter. The gas diffusion layer base material generally has a pore diameter of about 20 to 60 μm, so that transportation of water vapor under molecular diffusion is supposed to be predominant. Here, in case that an atmospheric gas is hydrogen (anode) or air (cathode), the case of the hydrogen atmosphere is higher about 3 to 4 times in diffusion coefficient of water vapor, than the other case. In other words, a condition where water vapor is liable to be transported is established. Accordingly, by using the gas diffusion layer at the anode, a vaporizing ability of liquid water can be improved under the action of the hydrophilic porous layer, so that the transportability of waver vapor in the gas diffusion layer base material is improved thereby making it possible to further raise a discharge effect of produced water to the flow path.

As other members constituting MEA, hitherto known configurations in the field of fuel cell can be employed as they are or upon being suitably improved. Hereinafter, typical modes of members other than the hydrophilic porous layer will be discussed for reference, in which the technical scope of the present invention is not limited to only the embodiments discussed below.

[Polymer Electrolyte Membrane]

The polymer electrolyte membrane is constituted of an ion exchange resin and has such a function that protons produced in the anode-side catalyst layer during operation of PEFC is selectively transmitted along its thickness direction to the cathode-side catalyst layer. Additionally, the polymer electrolyte membrane has a function to serve also as a partition wall which prevents mixing of a fuel gas supplied to the anode-side and an oxidizer gas supplied to the cathode-side.

A specific configuration of the polymer electrolyte membrane is not particularly limited, in which polymer electrolyte membranes which are hitherto known in the field of fuel cell can be suitably used. Polymer electrolyte membrane is roughly classified into fluorine-based polymer electrolyte membrane and hydrocarbon-based polymer electrolyte membrane according to kinds of ion exchange resins as constituting materials. Examples of ion exchange resin for constituting the fluorine-based polymer electrolyte membrane include, for example, perfluorocarbon sulfonic acid based polymer such as Nafion (registered trade name, produced by Dupont), Aciplex (trade name, produced by Asahi Kasei Chemicals Corporation), Flemion (registered trade name, produced by Asahi Glass Co., Ltd.) and the like, perfluorocarbon phosphonic acid based polymer, trifluorostyrene sulfonic acid based polymer, ethylenetetrafluoroethylene-g-styrene sulfonic acid based polymer, ethylenetrarafluoroethylene copolymer, polyvinylidene fluoride-perfluorocarbon sulfonic acid based polymer, and the like. From the viewpoints of electricity generation performances such as heat resistance, chemical stability and the like, these fluorine-based polymer electrolyte membranes are preferably used, and the fluorine-based polymer electrolyte membrane constituted of perfluorocarbon sulfonic acid based polymer is particularly preferably used.

Specific examples of the above-mentioned hydrocarbon-based electrolyte include sulfonated polyethersulfone (S-PES), sulfonated polyaryletherketone, sulfonated polybenzimidazole alkyl, phosphonated polybenzimidazole alkyl, sulfonated polystyrene, sulfonated polyetheretherketone (S-PEEK), sulfonated polyphenylene (S-PPP), and the like. These hydrocarbon-based polymer electrolyte membranes are preferably used from the productional viewpoints of raw materials being inexpensive, production process being simple, and selectivity of materials being high. It is to be noted that the above-mentioned ion exchange resin may be used one kind singly or in combination of two or more kinds. Additionally, it is a matter of course that limitation is not made to the above-mentioned materials so that other materials may be used.

A thickness of the polymer electrolyte membrane may be suitably decided upon taking account of the characteristics of obtained MEA and PEFC, and therefore is not particularly limited. It is to be noted that the thickness of the polymer electrolyte member is preferably 5 to 300 μm, more preferably 10 to 200 μm, and further preferably 15 to 150 μm. If the thickness is at a value within such a range, a balance among strength during film production, durability in use and power output characteristics in use can be suitably controlled.

(Production Method for Membrane Electrode Assembly)

A production method for MEA of the second implementation mode is not particularly limited, in which a production can be made by hitherto known production methods.

A preferable production method includes a step of applying a catalyst ink containing the electrode catalyst, the ion conductive material and the solvent onto the electrolyte membrane, a step of further applying a hydrophilic porous layer slurry containing the electrically conductive material, the ion conductive material and the solvent, and a step of placing a surface of the gas diffusion layer base material to which a solution containing the hydrophilic agent is applied, on a surface to which the above-mentioned hydrophilic porous layer slurry is applied, followed by making a hot press. These respective steps are preferably carried out successively. By successively carrying out the respective steps, it is possible to improve the continuity of the transportation path for liquid water, formed by the ion conductive material and the hydrophilic agent. Here, successively carrying out the respective steps means successively carrying out the respective steps at timings before the catalyst ink, the hydrophilic porous slurry and the solution containing the hydrophilic agent are dried. For example, after one step is carried out, the next step is carried out within preferably 60 seconds, more preferably 30 seconds.

Figure 8:
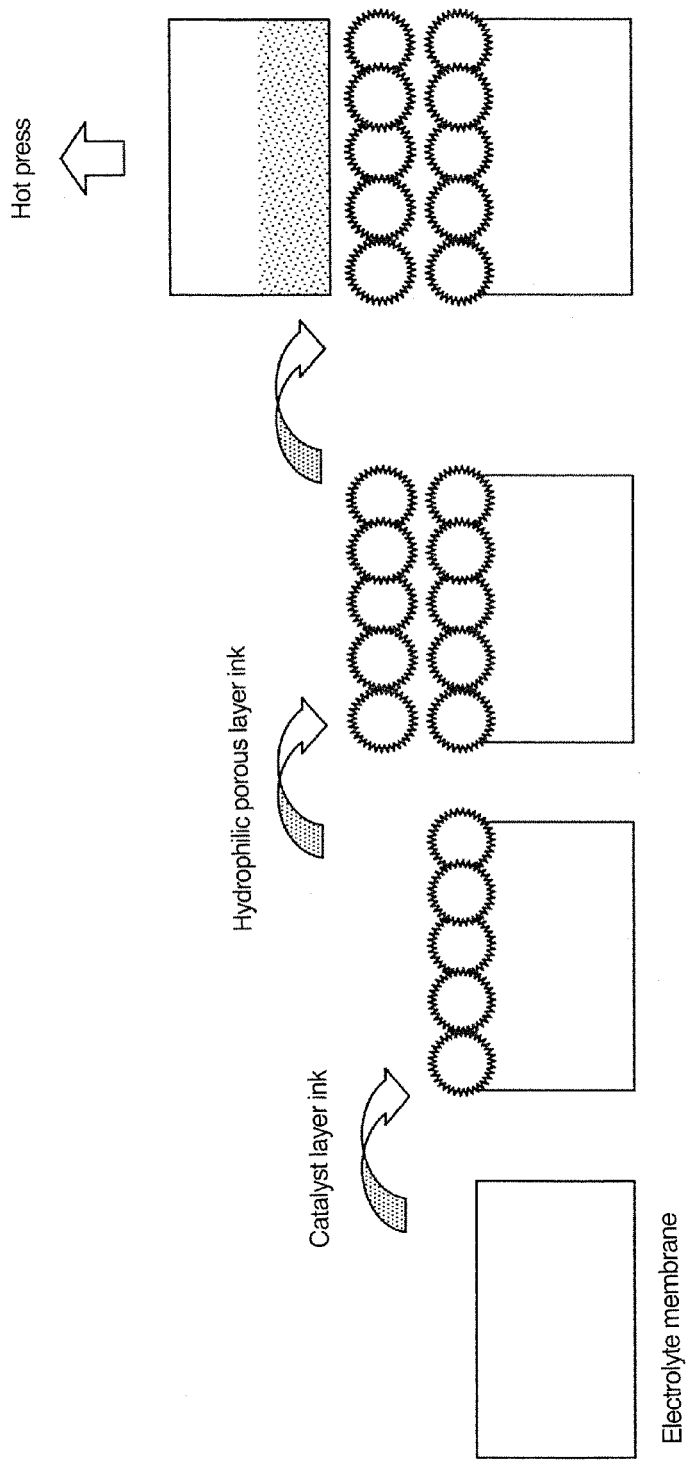
FIG. 8 is a typical view showing a production method of a gas diffusion layer.

A specific embodiment is shown in FIG. 8. For the embodiment of FIG. 8, first a one-side (for example, anode-side) gas diffusion electrode is produced on the electrolyte membrane. In other words, upon preparing the electrolyte membrane, the catalyst ink containing the electrode catalyst, the ion conductive material and the solvent is applied onto one surface of the electrolyte membrane. At this time, it is preferable not to make drying. Thereafter, the hydrophilic porous layer slurry containing the electrically conductive material, the ion conductive material and the solvent is further applied onto the surface onto which the catalyst ink has been applied. At this time, it is preferable not to make drying. Here, the ion conductive material and the solvent to be used for the catalyst ink are the same as or different from those to be used for the hydrophilic porous layer ink.

Further, the gas diffusion layer base material is separately prepared, and undergoes a hydrophilic treatment. Specifically, a solution containing the hydrophilic agent is applied onto the surface of the gas diffusion layer base material. Here, it is preferable not to make drying or a heat treatment. Since the mode of the hydrophilic treatment is discussed above, a detailed explanation is omitted. The surface of the gas diffusion layer base material which has undergone the hydrophilic treatment is placed on the surface on which the hydrophilic porous layer ink is applied, followed by making a hot press. A condition of the hot press is not particularly limited, in which the hot press may be carried out, for example, at 0.5 to 1.5 MPa and at 90 to 170° C.

As the other-side (for example, cathode-side) gas diffusion electrode, a hydrophilic porous layer-catalyst layer is formed, for example, by successively applying the hydrophilic porous layer slurry and the catalyst ink onto a base material such as the gas diffusion layer base material or a sheet formed of PTFE or the like. This is transfer-printed on the other surface of the above-mentioned electrolyte membrane. In case of using the sheet formed of PTFE as the base material, the sheet formed of PTFE is peeled off after the transfer-printing, followed by laminating the gas diffusion layer base material on the hydrophilic porous layer-catalyst layer.

(Fuel Cell)

Next, PEFC as a preferable embodiment using MEA of the second implementation mode will be discussed with reference to drawings.

Figure 9:
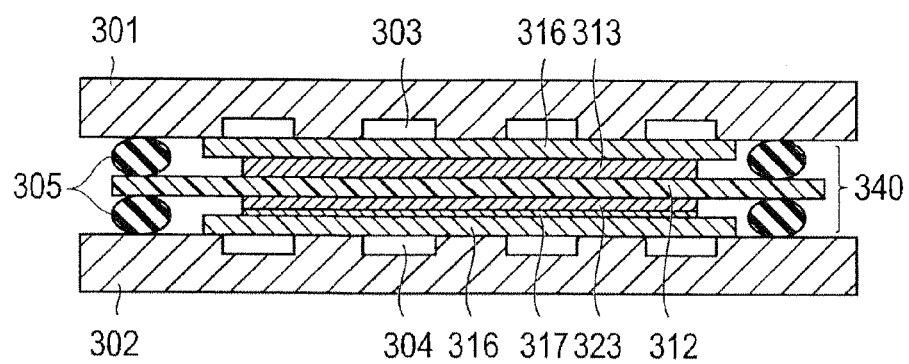
FIG. 9 is a typical cross-sectional view of PEFC including MEA of the present invention (the second implantation mode)

FIG. 9 is a typical sectional view showing a single cell of PEFC in which MEA for a fuel cell, of the second implementation mode is interposed between two separators.

PEFC 300 shown in FIG. 9 is configured by interposing MEA 340 between an anode-side separator 302 and a cathode-side separator 301. Additionally, fuel gas and oxidizer gas to be fed to MEA are supplied through a plurality of gas supply grooves 304, 303 and the like formed in each of the anode-side separator 302 and the cathode-side separator 301. Additionally, in PEFC in FIG. 9, a gasket 305 is disposed in such a manner as to surround the outer periphery of the electrode located at the surface of MEA 340. The gasket is a seal member and may take a configuration that it is fixed through an adhesive layer (not shown) to the outer surface of the solid polymer electrolyte membrane 312 of MEA 340. The gasket functions to secure a sealing ability between the separator and MEA. It is to be noted that the adhesive layer used if necessary is preferably disposed in the shape of a frame extending along the whole peripheral section of the electrolyte membrane and corresponding to the shape of the gasket, upon taking account of securing an adhesiveness.

Hereinafter, respective constituting elements of PEFC other than MEA will be successively discussed in detail.

[Gasket]

The gasket is disposed to surround the catalyst layer and the gas diffusion layer (or the gas diffusion electrode) and functions to prevent leaking of the supplied gas (fuel gas or oxidizer gas) from the gas diffusion layer.

A material constituting the gasket is sufficient to be impermeable to gas, particularly oxygen or hydrogen, and therefore is not particularly limited. Examples of the constituting material of the gasket include, for example, rubber materials such as fluorine-contained rubber, silicone rubber, ethylene propylene rubber (EPDM), polyisobutylene rubber and the like, and polymer materials such as polyethylene naphthalate (PEN), polyethylene terephthalate (PET), polytetrafluoroethylene (PTFE), polyvinylidene fluoride (PVdF) and the like. It is to be noted that it is a matter of course that other materials may be used.

A size of the gasket is not particularly limited, in which it may be suitably decided taking account of a desired gas sealing ability and the relationship between it and the size of other members.

[Separator]

MEA is interposed between the separators to constitute a single cell. It is general that PEFC has a stack structure in which a plurality of single cells are connected in series with each other. At this time, the separator functions to electrically connect respective MEAs in series with each other, and is provided with flow paths and a manifold for allowing different fluids such as fuel gas, oxidizer gas and coolant to flow and also functions to maintain a mechanical strength of the stack.

A material constituting the separator is not particularly limited, in which hitherto known knowledge can be suitably referred to. Examples of the material include, for example, carbon materials such as dense carbon graphite, carbon plate and the like, and metal materials such as stainless steel and the like, and the like. The size of the separator and the shape of the flow paths are not particularly limited, in which they may be suitably determined taking account of the output characteristics of PEFC.

A production method for PEFC is not particularly limited, in which PEFC can be produced by referring to hitherto known knowledge in the field of fuel cell.

Hereinbefore, discussion has been made on the polymer electrolyte type fuel cell as an example; however, an alkali type fuel cell, a direct methanol type fuel cell, a micro fuel cell and the like are given as a fuel cell in addition to the polymer electrolyte type fuel cell, in which the present invention is applicable to any fuel cells. Of these, the solid polymer type fuel cell (PEFC) is preferably given because of being possible to be small-sized and to be made highly dense and high in power output.

The above-mentioned fuel cell is useful for a stationary power source in addition to a power source for a movable body such as a vehicle or the like whose mounting space is limited, and suitably used particularly for a vehicle which frequently makes starting/stopping of a system and power output fluctuation, more preferably suitably used for an automotive vehicle.

<Third Implementation Mode>

Next, the third implementation mode of the present invention will be discussed.

In a low temperature condition such as in winter season or the like, the temperature of a fuel cell sharply lowers below an appropriate operation temperature during stopping of operation. Particularly in a fuel cell in a condition below freezing point or the like condition, water produced in the electrode catalyst layer stays in all over the inside of the gas diffusion layer and there is a fear that the water is frozen, so that the water-drainage during starting at sub-zero temperature is also an important factor. However, with conventional techniques, although a countermeasure for realizing a starting ability at sub-zero temperature and a countermeasure for realizing a high current density operation at normal temperature have been possible to be separately made, it is difficult to obtain a fuel cell which can compatibly realize the starting ability and the high current density operation.

Accordingly, the present invention (the third implementation mode) is made upon paying attention on the above-mentioned problems, and has an object to provide a hydrophilic porous layer for a fuel cell, for realizing a high current density operation at normal temperature and improving a sub-zero temperature starting ability.

The present inventors have made eager studies in view of the above problems. As a result, they have found that the above problems can be solved with the hydrophilic porous layer which uses both a material for promoting vaporization of liquid water and to material for promoting a transportation of liquid water, so as to complete the present invention.

By the hydrophilic porous layer of the present invention (the third implementation mode), a water drainage of produced water which is produced during electricity generation can be improved in both a normal temperature condition and a sub-zero temperature condition. Accordingly, a high current density operation at normal temperature is realized while a sub-zero temperature starting ability is improved.

The hydrophilic porous layer of the present invention (the third implementation mode) includes a liquid water vaporization promoting material (hereinafter referred merely also to as "liquid water vaporization promoting material") having a cover area of the electrically conductive material covered with the ion conductive material, of not less than 200 m$^2$/g and a liquid water transportation promoting material (hereinafter referred merely also to as "liquid water transportation promoting material") having a cover area of the electrically conductive material covered with the ion conductive material, of less than 200 m$^2$/g, the cover area being given by $S_{ion}=S_{BET} \times \theta_{ion}$ ($S_{ion}$: the cover area with the ion conductive material (m$^2$/g), $S_{BET}$: a BET nitrogen specific surface area, and $\theta_{ion}$: a covering ratio of the ion conductive material).

In the fuel cell, water is produced at the cathode-side. In a sub-zero temperature condition, water produced in the electrode catalyst layer stays in all over the inside of the gas diffusion layer and there is a fear that the water is frozen. Additionally, a gas diffusibility is lowered with frozen ice and liquid water. In a normal temperature condition, a gas diffusion is impeded under a flooding. Accordingly, in the fuel cell, how to smoothly transport water produced at the cathode-side is important. Additionally, when produced water is much, water produced at the cathode-side transfers to the anode-side, so that a water-drainage at the anode-side is particularly important.

The present inventors have made studies in order to improve the water-drainage of produced water. As a result, they have found that the cover area of the electrically conductive material contained in the hydrophilic porous layer, with the ion conductive material, plays a very important role for the water-drainage. As a result of further studies, knowledge discussed below has been obtained.

In a sub-zero temperature condition, transferring from liquid phase to vapor phase is difficult to occur, and therefore how to make transferring from liquid phase to vapor phase is important. Besides, there is a case where transportation of liquid water is advantageous as compared with transportation in vapor phase under the action of a temperature lowering. Accordingly, at the time of sub-zero temperature starting, transportation of water (liquid water+water vapor) as a whole can be improved by raising water transportation in vapor phase, thereby making it possible to suppress freezing of produced water. During operation at normal temperature, since transportation in vapor phase is advantageous, a material which can reduce a resistance in phase change of from liquid phase to vapor phase is required. Besides, in order to drain a large amount of produced water produced at the cathode-side, transportation of liquid water is required to be improved; if not, water drainage cannot be followed up. Accordingly, during operation at normal temperature, particularly by improving a water transportation in liquid phase, lowering in gas diffusibility due to flooding can be suppressed. In other words, in order to realize both the sub-zero temperature starting ability and the high current density operation at normal temperature, water transportation in both vapor phase and liquid phase is important. It has been confirmed that, for the water transportation in vapor and liquid phase, the electrically conductive material plays an important role, in which its function is different according to the cover area with the ion conductive material. The electrically conductive material (the liquid water vaporization promoting material) having a large cover area with the ion conductive material is large in vaporization area for liquid water, thereby making it possible to reduce the resistance in phase change from liquid phase to vapor phase. To the contrary, the electrically conductive material (liquid water transportation promoting material) having a small cover area with the ion conductive material is low in transport resistance for liquid water, thereby making it possible to promote transportation of liquid water.

On the basis of the above-discussed knowledge, the present inventors have found that the sub-zero temperature starting ability and the high current density operation at normal temperature can be realized by using, in combination, the electrically conductive material having a large cover area with the ion conductive material and the electrically conductive material having a small cover area with the ion conductive material, and have completed the present invention.

In the present invention (the third implementation mode), the liquid water vaporization promoting material indicates the electrically conductive material having a cover area with the ion conductive material to the electrically conductive material is not less than 200 m$^2$/g. The liquid water transportation promoting material indicates the electrically conductive material having a cover area with the ion conductive material to the electrically conductive material is less than 200 m$^2$/g. Here, the cover area is given by $S_{ion}=S_{BET} \times \theta_{ion}$ ($S_{ion}$: the cover area with the ion conductive material (m$^2$/g), $S_{BET}$: a BET nitrogen specific surface area (m$^2$/g), and $\theta_{ion}$: a covering ratio of the ion conductive material). Accordingly, the cover area with the ion conductive material is a value which can be calculated by measuring the BET nitrogen specific surface area of the electrically conductive material and the covering ratio of the ion conductive material if the electrically conductive material to be used is decided. Additionally, the cover area with the ion conductive material is said to be a value which can be controlled by a shape of the electrically conductive material.

In the present specification, the covering ratio $\theta_{ion}$ is represented by a ratio (determined by $\theta_{ion}=C_{dl}$ at relative humidity 30%/$C_{dl}$ at relative humidity 100%) between an electric double layer capacity ($C_{dl}$) at a relative humidity 30% and an electric double layer capacity ($C_{dl}$) at relative humidity 100%. Here, the reason why the ratio between the relative humidity 30% and the relative humidity 100% is employed is as follows: Under a high humidity condition, the electric double layer formed at an interface between the electrically conductive material and water adsorbed at the surface of the electrically conductive material or at an interface between the electrically conductive material and the ion conductive material is measured. Under a low humidity condition, the electric double layer formed at an interface between the electrically conductive material and the ion conductive material is mainly measured. Here, the electric double layer capacity becomes nearly constant at the relative humidity not higher than about 30%. Accordingly, in the present invention, the relative humidity 30% and the relative humidity 100% are respectively determined at representative points of the low humidity condition and the high humidity condition, in which the ratio in electric double layer capacity between them is employed to make an index representing a degree of coating of the ion conductive material on the electrically conductive material.

A value measured by a method mentioned below is employed as the electric double layer capacity.

First, the hydrophilic porous layer containing no catalyst component and the catalyst layer were respectively disposed at the different surfaces of an electrolyte membrane thereby producing the membrane electrode assembly. The assembly were interposed at its opposite surfaces between a pair of gas diffusion layers, further between carbon separators and further between gold-plated collector plates thereby obtaining a cell similar to a usual fuel cell. In a condition where humidity-controlled hydrogen gas was supplied to the catalyst layer while humidity-controlled nitrogen gas was supplied to the hydrophilic porous layer, the electric potential of the hydrophilic porous layer was scanned 5 to 10 times within a range of 0.2 to 0.6 V relative to a reference electrode using the catalyst layers respectively as the reference electrode and an opposite electrode. These scans were made at a scanning speed of 50 mV/s. An obtained relationship between electric current and electric potential indicated a waveform similar to rectangle. This represented that oxidation and reduction reactions did not occur on the electrode, and charging and discharging of the electric double layer was a main factor of electric current. In this waveform, the electric double layer capacity was calculated by dividing an average value of absolute values of oxidation current and reduction current at a certain electric potential such as 0.3 V by a scanning speed. This measurement was made under a variety of humidity conditions, thereby obtaining the relationship between the electric double layer capacity and the relative humidity.

Additionally, a value measured by a method discussed below is employed as the BET nitrogen specific surface area of the electrically conductive material.

(Measuring Method of the BET Nitrogen Specific Surface Area)

1. Sampling, Weighing and Preliminary Drying

About 0.04 to 0.07 g of powder was accurately weighed and encapsulated in a sample tube. This sample tube was subjected to a preliminary drying at 90° C. for several hours in a vacuum dryer and then subjected to a measurement. For weighing, an electronic weighing machine (AW220) produced by Shimadzu Corporation was used. Concerning a coated sheet, the purity net mass of about 0.03 to 0.04 g obtained by subtracting the mass of a Teflon (registered trade name) (base material) having the same area as the coated sheet from the whole mass of the coated sheet was used as a sample mass.

2. Measuring Condition (See Table 5 Shown Below)

TABLE 5

| |
|---|
| Measuring apparatus: High accuracy fully automatic gas absorption apparatus BELSORP36 produced by BEL Japan Inc. |
| Absorbed gas: N2 |
| Dead volume measurement gas: He |
| Absorption temperature: 77 K (liquid nitrogen temperature) |
| Measurement pretreatment: 90° C. vacuum drying for several hours (set at a measuring stage after He purging) |
| Measuring mode: Adsorption step and desorption step at the same temperature |
| Measuring relative pressure P/P$_0$: about 0 to 0.99 |
| Equilibrium setting time: 180 sec. for 1 relative pressure |

3. Measuring Method

A BET plot is prepared from a range of about 0.00 to 0.45 in relative pressure (P/P$_0$) in an absorption side of an adsorption and desorption isothermal curve, upon which the BET nitrogen specific surface area is calculated from the inclination and segment of the plot.

Figure 11:
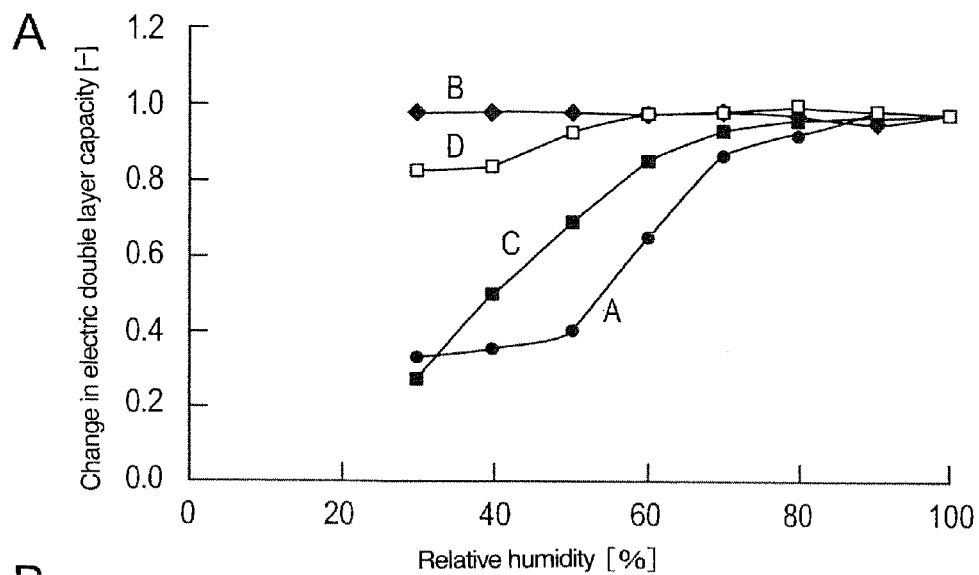
FIG. 11 in which A is a graph showing the relationship between the relative humidity and the electric double layer capacity in cases of using a variety of electrically conductive materials; B is a table showing $S_{BET}$, $\theta_{ion}$ and $S_{ion}$ of each electrically conductive material; and C is a graph showing the water transport resistance of each electrically conductive material.
Figure 11:
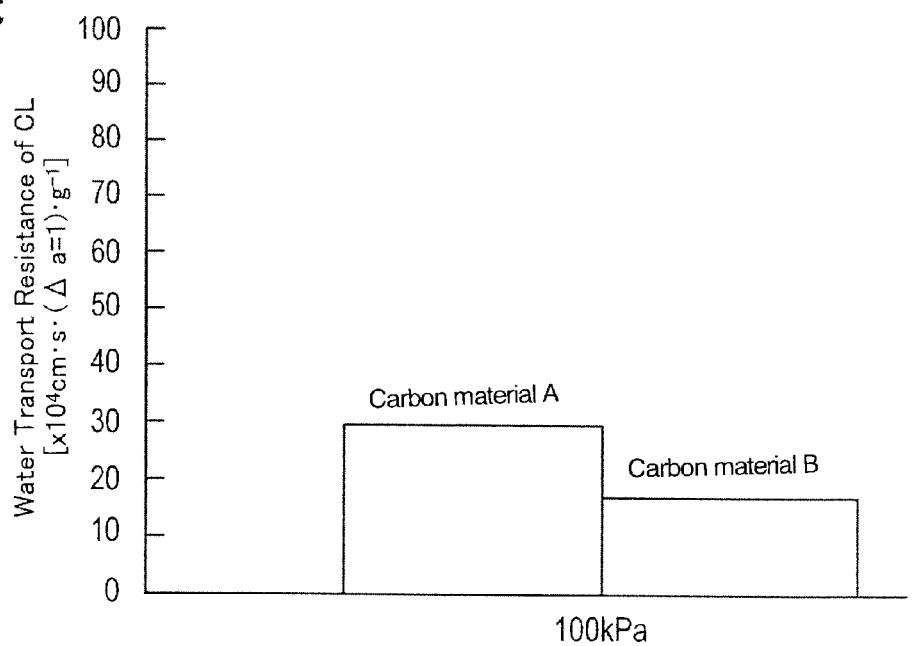

A and B of FIG. 11 are respectively a graph showing the relationship between the relative humidity and the electric double layer capacity in cases of using a variety of the electrically conductive materials and a table showing $S_{BET}$, $\theta_{ion}$ and $S_{ion}$ of each electrically conductive material. In B of FIG. 11, as carbon material, Carbon material A is Ketchen black EC (produced by Ketchen Black International Co., Ltd.); Carbon material B is a material which is prepared by making a heat treatment of 2000-3000° C. and 2 to 120 minutes to Ketchen black EC in an inert atmosphere; Carbon material C is acetylene black (SAB, produced by Denki Kagaku Kogyo Kabushiki Kaisha); and Carbon material D is acetylene black (OSAB, produced by Denki Kagaku Kogyo Kabushiki Kaisha).

Additionally, C of FIG. 11 is a graph showing a water transport resistance of Carbon material A and Carbon material B at 80° C. Carbon material B low in $S_{BET}$ and $S_{ion}$ is low in transport resistance of liquid water, and therefore it can promote the water-drainage during a high current density operation at normal temperature. To the contrary, Carbon material A high in $S_{BET}$ and $S_{ion}$ is high in transport resistance of liquid water thereby making it possible to secure a wide vaporization area for liquid water. As a result, a liquid water vaporization can be promoted thereby making it possible to improve a sub-zero temperature staring ability. It is to be noted that W (vaporization amount)=v (vaporization speed)*S (surface area) is represented.

Figure 22:
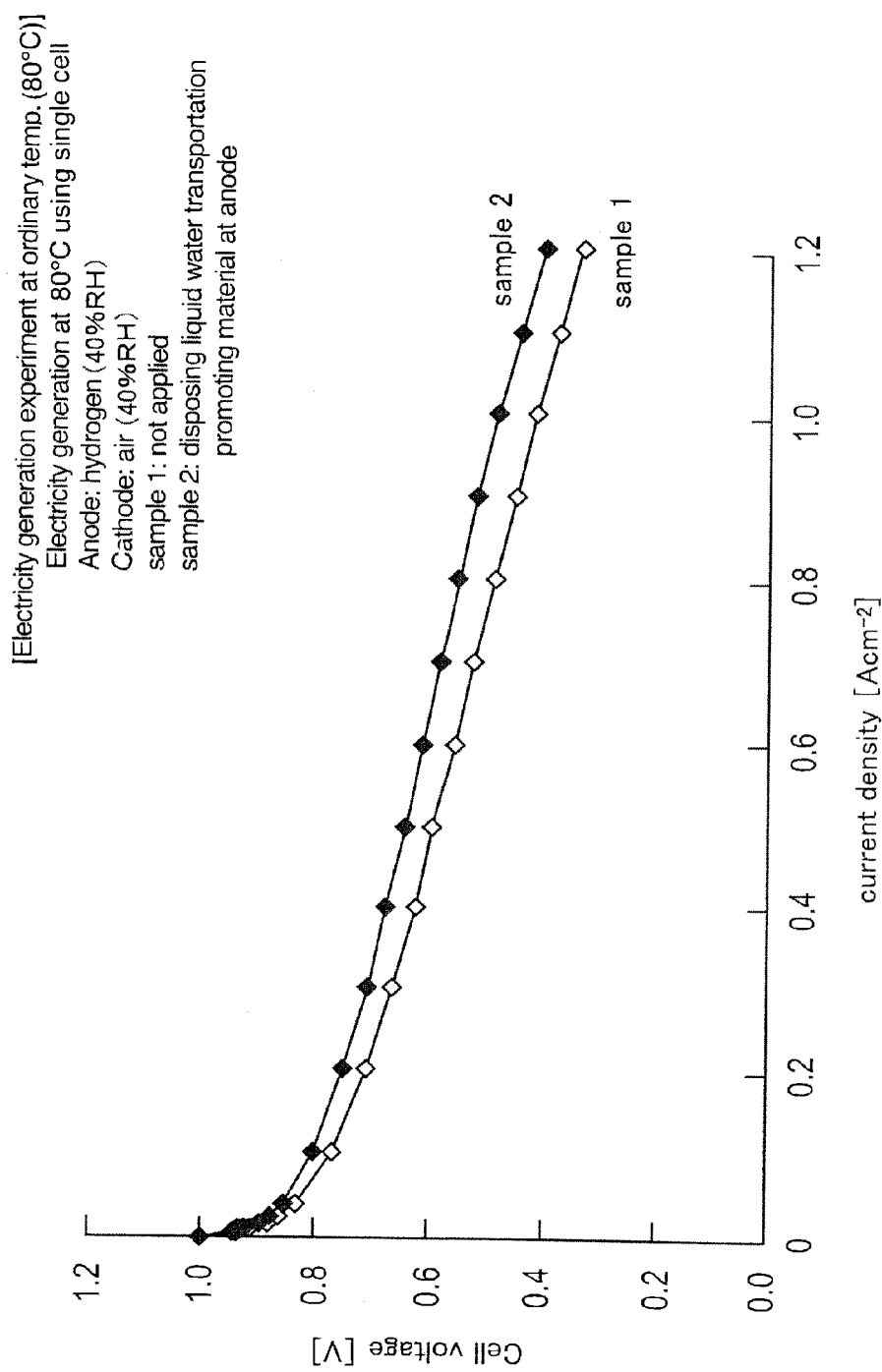
FIG. 22 is a view showing results of normal temperature electricity generation tests.

FIG. 22 is a graph showing results of electricity generation at normal temperature. Electricity generation tests sample 1 (electricity generation result by a usual catalyst layer structure containing no hydrophilic porous layer) and sample 2 (a case where the hydrophilic porous layer containing the liquid water transportation promoting material was disposed in the anode) were carried out. As apparent from the graph, the sample 2 can maintain a high voltage even at a high current density as compared with the sample 1.

Thus, it will be understood that a high current density can be realized under the presence of the liquid water transportation promoting material in the hydrophilic porous layer while a sub-zero temperature starting ability can be improved under the presence of the liquid water vaporization promoting material in the hydrophilic porous layer. Accordingly, by combining the liquid water transportation promoting material and the liquid water vaporization promoting material, a high current density operation is realized, and additionally a sub-zero temperature starting ability is also improved.

A thickness of the hydrophilic porous layer is not particularly limited; however, it is preferably not larger than 40 μm, more preferably 2 to 25 μm. If the thickness of the hydrophilic porous layer is within the above range, a compatibility of water-drainage and gas diffusibility can be secured, which is preferable.

A porosity of whole the hydrophilic porous layer is not particularly limited, in which it is preferably 30 to 80%, more preferably 40 to 70%. If the porosity is within the above range, the water drainage and the gas diffusibility can be secured, which is preferable. The porosity can be determined as a rate of a volume of pores relative to a volume of a layer upon measuring the volume of pores (fine pores) existing within the layer under a pore size distribution measurement by a mercury press-in method.

The hydrophilic porous layer includes the electrically conductive material and the ion conductive material. As occasion demands, the electrically conductive material may carry a catalyst. The hydrophilic porous layer may contain materials other than the electrically conductive material and a binder. A content of the electrically conductive material and the ion conductive material in the hydrophilic porous layer is preferably not less than 80 mass %, more preferably not less than 90 mass %. It is more preferable that the hydrophilic porous layer is constituted of the electrically conductive material and the ion conductive material.

As discussed above, a water-drainage of produced water can be improved by combining the electrically conductive materials different in cover area with the ion conductive material. Accordingly, in case of using the hydrophilic porous layer to the membrane electrode assembly (MEA), a starting ability at a sub-zero temperature and a high current density operation at normal temperature can be compatible with each other. Specifically, at a sub-zero temperature starting, freezing is prevented by improving a water-drainage, thereby making it possible to suppress damage of a fuel cell due to freezing and to suppress a voltage lowering due to lowering in gas diffusibility. Additionally, during a high current density operation at normal temperature, it is possible to suppress a voltage lowering due to lowering in gas diffusibility under staying of liquid water.

Next, a preferable embodiment of the hydrophilic porous layer will be discussed with reference to figures. It is to be noted that each figure is typically shown for the purpose of easiness for understanding each embodiment, in which the size, content ratio, layer thickness and the like may be different from actual those. The same reference numerals are assigned to the same members (materials), so that there are cases where explanation is omitted.

Figure 12:
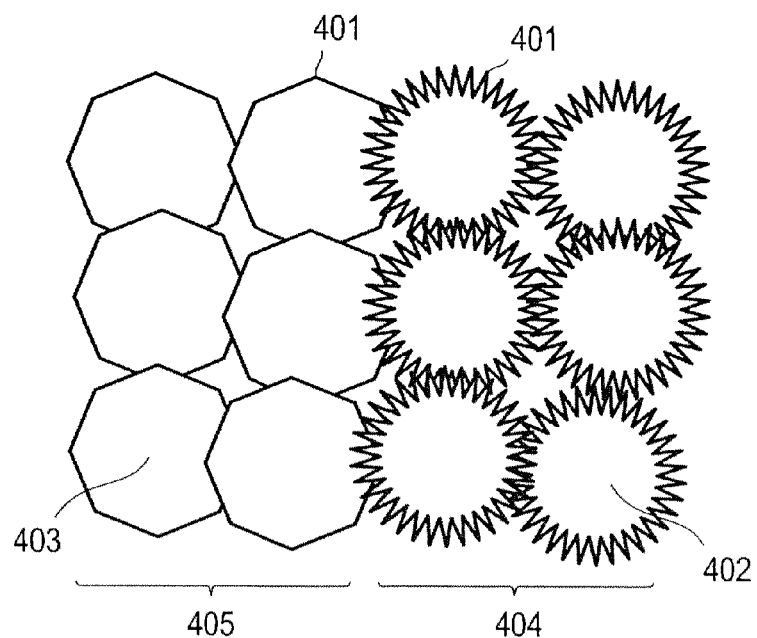
FIG. 12 in which A is a cross-sectional typical view showing a hydrophilic porous layer of a first embodiment of a third implementation mode; and B is a cross-sectional typical view of a hydrophilic porous layer of a modified example of the first embodiment.
Figure 12:
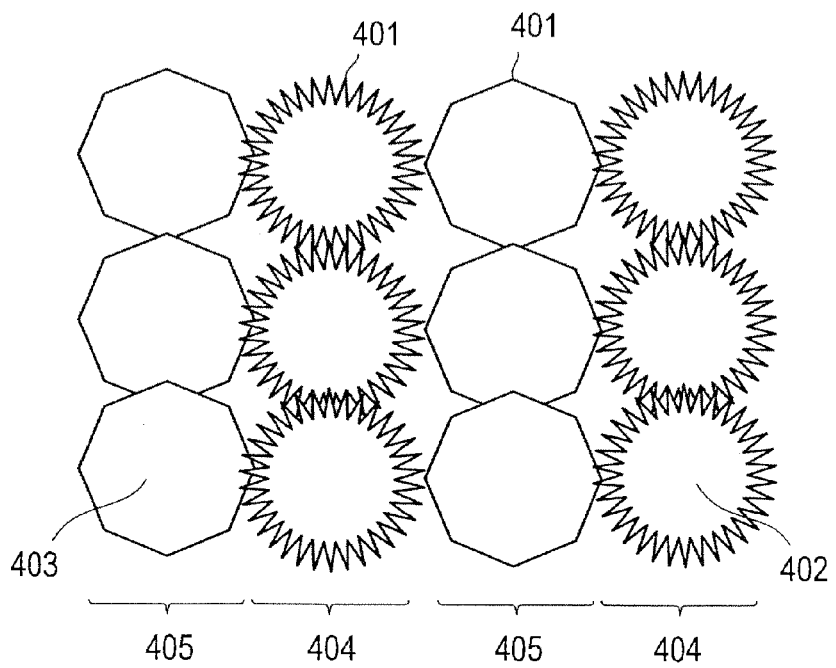

In a preferable embodiment (hereinafter referred to also as a first embodiment) of the hydrophilic porous layer, a layer containing the liquid water vaporization promoting material and a layer containing the liquid water transportation promoting material form a stratified structure. A of FIG. 12 is a cross-sectional typical figure of the hydrophilic porous layer of this embodiment. In A of FIG. 12, a liquid water vaporization promoting material layer 404 formed of the liquid water vaporization promoting material 402 and the ion conductive material 401 and a liquid water transportation promoting material layer 405 formed of the liquid water transportation promoting material 403 and the ion conductive material 401 are laminated. A laminating direction of them is the same as a laminating direction (thickness direction) of the membrane electrode assembly. It is to be noted that a member (preferably the gas diffusion layer or the catalyst layer) to which the liquid water vaporization promoting material layer and the liquid water transportation promoting material layer are adjacent may be any member when the membrane electrode assembly is formed. For example, there are a mode in which the liquid water vaporization promoting material layer is on the side of the catalyst layer while the liquid water transportation promoting material layer is on the side of the gas diffusion layer; a mode in which the liquid water vaporization promoting material layer is on the side of the gas diffusion layer while the liquid water transportation promoting material layer is on the side of the catalyst layer; and the like. An existing state of the ion conductive material is typically shown in the figure, and therefore it may be different from an actual existing state. This is similar to in figures discussed below.

The layer (liquid water vaporization promoting layer) containing the liquid water vaporization promoting material and the layer (liquid water transportation promoting layer) containing the liquid water transportation promoting material are formed into a stratified structure thereby producing an integral structure like the first embodiment, thereby providing the hydrophilic porous layer for a fuel cell, simultaneously exhibiting functions which are different in characteristics. In other words, the liquid water vaporization promoting material and the liquid water transportation promoting material respectively simultaneously function a vaporization and a transportability for liquid water to simultaneously function. As a result, in case of making their application to a fuel cell, it is possible to make compatible a starting ability at sub-zero temperature and a high current density operation at normal temperature with each other. In case of forming the stratified structure, a liquid water vaporization function and a liquid water transportation function in the thickness direction can be easily controlled. The liquid water evaporation promoting layer contains at least the liquid water vaporization promoting material and the ion conductive material, and is preferably constituted of the liquid water vaporization promoting material and the ion conductive material. Additionally, the liquid water transportation promoting layer contains at least the liquid water transportation promoting material and the ion conductive material, and is preferably constituted of the liquid water transportation promoting material and the ion conductive material.

B of FIG. 12 is a cross-sectional typical view of the hydrophilic porous layer, showing a modified example of the first embodiment. In this embodiment, the liquid water vaporization promoting material layer 404 formed of the liquid water vaporization promoting material 402 and the ion conductive material 401 and the liquid water transportation promoting material layer 405 formed of the liquid water transportation promoting material 403 and the ion conductive material 401 are alternately laminated. The laminating direction is the same as a laminating direction (thickness direction) of the membrane electrode assembly. In this embodiment, the stratified structure takes a structure where one layer and one layer are alternate; however, the laminating mode of the liquid water vaporization promoting layer and the liquid water transportation promoting layer is not particularly limited. A mode in which the liquid water vaporization promoting material and the liquid water transportation promoting material are alternately laminated is preferable to improve a water-drainage at the time of freezing and at the time of normal temperature. Additionally, when the membrane electrode assembly is formed, the member (preferably the gas diffusion layer or the catalyst layer) to which the outer-most layer is adjacent may be any member. For example, there are a mode in which the liquid water vaporization promoting layer of the outer-most layer is on the side of the catalyst layer while the liquid water transportation promoting layer of the outer-most layer is on the side of the gas diffusion layer; a mode in which the liquid water vaporization promoting layer of the outer-most layer is on the side of the gas diffusion layer while the liquid water transportation promoting layer of the outer-most layer is on the side of the catalyst layer; and the like.

In the first embodiment and its modified example, a thickness of each liquid water vaporization promoting layer or each liquid water transportation promoting layer is not particularly limited, in which it is preferably not larger than 40 μm, more preferably 2 to 25 μm. Additionally, laminating six layers or less is preferable from the viewpoint of an operating efficiency.

Figure 13:
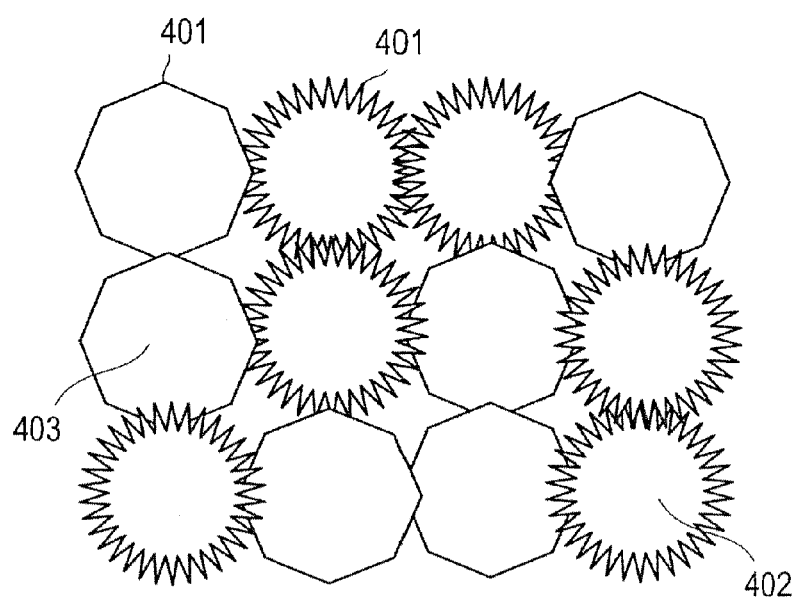
FIG. 13 is a cross-sectional typical view showing a hydrophilic porous layer of a second embodiment of the third implementation mode.

Another preferable embodiments (hereafter referred to as also a second embodiment) of the hydrophilic porous layer is configured such that the liquid water vaporization promoting material and the liquid water transportation promoting material exist in a mixed state in the hydrophilic porous layer. FIG. 13 is a cross-sectional typical view of the hydrophilic porous layer of this embodiment. The hydrophilic porous layer in FIG. 13 is constituted of the liquid water vaporization promoting material 402, the liquid water transportation promoting material 403, and the ion conductive material 401, in which the liquid water vaporization promoting material 402 and the liquid water transportation promoting material 403 are disposed in a random state.

The liquid water vaporization promoting material and the liquid water transportation promoting material constituting the hydrophilic porous layer are disposed to form a random structure like the second embodiment, thereby providing the porous layer for a fuel cell, simultaneously exhibiting functions different in characteristics. As a result, in case of making their application to a fuel cell, a starting ability at sub-zero temperature and a high current density operation at normal temperature can be compatible with each other. In case of taking the random structure, a liquid water vaporization function and a liquid water transportation function can be easily controlled with a mixing ratio between them.

In the first and second embodiments, an abundance ratio of the liquid water vaporization promoting material and the liquid water transportation promoting material in whole the hydrophilic porous layer is not particularly limited, in which it is preferable that the liquid water vaporization promoting material:the liquid water transportation promoting material=1:0.1 to 10 in mass ratio, and it is more preferable that the liquid water vaporization promoting material:the liquid water transportation promoting material=1:0.5 to 5. In order that the abundance ratio falls within such a preferable range in whole the hydrophilic porous layer, it is sufficient that contents of the liquid water vaporization promoting material and the liquid water transportation promoting material may be suitably decided so as to allow the abundance ratio to fall within such a preferable range in whole the hydrophilic porous layer.

Additionally, a content mass ratio between the electrically conductive material (total of the liquid water vaporization promoting material and the liquid water transportation promoting material) and the ion conductive material is not particularly limited, in which it is suitably set according to a desired object. Preferably, the electrically conductive material:the ion conductive material=1:0.6 to 1.5, and more preferably the electrically conductive material:the ion conductive material=1:0.7 to 1.3. Within such a range, a gas diffusibility can be secured, and the function of the ion conductive material can be exhibited. It is to be noted that the content mass ratio between the above-mentioned electrically conductive material and ion conductive material can be calculated and controlled by previously measuring the ion conductive material and the electrically conductive material to be mixed when the ink (slurry) for the hydrophilic porous layer is prepared and by adjusting a mixing ratio between them. Additionally, the content mass ratio between the electrically conductive material and the ion conductive material may be also calculated by determining the quantities of the above-mentioned electrically conductive material and ion conductive material.

In the present invention, the hydrophilic porous layer is a layer containing the electrically conductive material and the ion conductive material, in which any of modes may be taken as far as the electrically conductive material includes the liquid water vaporization promoting material and the liquid water transportation promoting material in the modes. In other words, there is a case that even one called an electrode catalyst layer may be included in the hydrophilic porous layer used in the present invention, from the viewpoint of a using object of it to be used in a fuel cell, without being adhered to its name. For example, a catalyst layer may be used as the hydrophilic porous layer in MEA as far as it takes a mode in which a catalyst is carried on an electrically conductive material.

Hereinafter, discussion will be made on respective components constituting the hydrophilic porous layer of the present invention.

(Electrically Conductive Material)

The electrically conductive material is used upon combining the liquid water vaporization promoting material and the liquid water transportation promoting material.

Examples of the electrically conductive material include carbon materials such as natural graphite, artificial graphite, activated carbon, carbon black (oil furnace black, channel black, lamp black, thermal black, acetylene black and the like); metal (Sn, Ti and the like) oxides; and the like. These electrically conductive materials are classified into the liquid water vaporization promoting material and the liquid water transportation promoting material according to its cover area. The electrically conductive material is preferably the carbon material or the metal (Sn, Ti and the like) oxides, and more preferably the carbon material.

The liquid water vaporization promoting material is preferably the electrically conductive material having a cover area with the ion conductive material per unit electrically conductive material is not smaller than 200 $m^2/g$. More preferably, the liquid water vaporization promoting material is the electrically conductive material having a cover area with the ion conductive material of 200 to 1600 $m^2/g$. With the electrically conductive material having the cover area within the above range, a resistance in phase change of from liquid phase to vapor phase of produced water produced at the cathode side can be reduced. In other words, the transportation of liquid water is hasten, the transportation of water vapor is promoted, thereby suppressing staying and freezing of produced water are suppressed.

The liquid water vaporization promoting material is not particularly limited, in which examples of it include carbon black, acetylene black having a BET nitrogen specific surface area of 20 to 400 $m^2/g$, Ketchen black, Black Pearls, Vulcan produced by Cabot Corporation, activated carbon, and the like.

The BET nitrogen specific surface area of the liquid water vaporization promoting material is preferably 20 to 1600 $m^2/g$, and more preferably 80 to 1200 $m^2/g$.

The liquid water evaporation promoting material may be used one kind singly or in combination of two or more kinds.

The liquid water transportation promoting material is the electrically conductive material having a cover area with the ion conductive material of smaller than 200 $m^2/g$ per unit electrically conductive material. More preferably, the liquid water transportation promoting material is the electrically conductive material having a cover area with the ion conductive material of 10 to 199 $m^2/g$. With the electrically conductive material having the cover area within the above range, a resistance in phase change of from liquid phase to vapor phase of produced water produced at the cathode side can be reduced.

The liquid water transportation promoting material is not particularly limited, in which examples of it include heat-treated Ketchen black having a BET nitrogen specific surface area of 20 to 199 $m^2/g$, acetylene black having a BET nitrogen specific surface area of 500 to 1600 $m^2/g$, metal (Sn, Ti and the like) oxides, and the like.

Since the electrically conductive material has the cover area within the above range, the inflection degree of the liquid water transportation path is made small thereby making it possible to lower the water transport resistance of the liquid water maintained in the ion conductive material, thus making it possible to transport water in an unfrozen state. The Ketchen black having a BET nitrogen specific surface area of 20 to 199 m²/g can be obtained by heat-treating Ketchen black. A heat treatment condition may be suitably set to allow the BET nitrogen specific surface area within the above range. Preferably, such Ketchen black can be obtained by heat-treating Ketchen black at a temperature of 2000 to 3000° C. and for a time of 2 to 120 minutes.

The BET nitrogen specific surface area of the liquid water transportation promoting material is preferably 20 to 1600 m²/g and more preferably 80 to 1200 m²/g.

The liquid water transportation promoting material may be used one kind singly or in combination of two or more kinds.

A mean particle diameter of the electrically conductive material is preferably 5 to 200 nm, and more preferably 10 to 100 nm. By this, a gas diffusibility of the hydrophilic porous layer can be secured. It is to be noted that, in the present specification, "particle diameter" means the maximum distance L between any two points on the profile line of an active material particle. As the value of "mean particle diameter", a value calculated as a mean value of the particle diameters of particles observed in several to several tens fields of view by using an observing means such as a scanning electron microscope (SEM) and a transmission electron microscope (TEM) is employed.

(Ion Conductive Material)

The ion conductive material is not particularly limited as far as it is ion-conductive and is a material which can bond the electrically conductive materials. Examples of it include, for example, polymer such as polyacrylamide, water-based urethane resin, silicone resin and the like; polymer electrolyte; and the like. Polymer electrolyte is preferable. By using polymer electrolyte as the ion conductive material, the hydrophilic porous layer can be stably disposed adjacent to a component (electrolyte membrane or catalyst layer) of MEA in case of disposition of the hydrophilic porous layer, thereby making it possible to lower the water transport resistance between the electrically conductive material and the electrolyte membrane or the catalyst layer. As a result, the water transport resistance between the electrically conductive material and the electrolyte membrane or the catalyst layer is improved thereby making it possible that an equilibrium can be reached at an earlier time. In case that the ion conductive material is polymer electrolyte, the electrolyte may be the same as or different from the polymer electrolyte used in the catalyst layer or the electrolyte membrane. Further in case of producing MEA including the hydrophilic porous layer, materials may be commonly used thereby achieving a labor-saving during production.

The ion conductive material to be used is not particularly limited. Specifically, the ion conductive material is roughly classified into fluorine-based electrolyte in which fluorine atom is contained in the whole or part of a polymer frame, and hydrocarbon-based electrolyte in which no fluorine atom is contained in a polymer frame.

Preferable examples of the fluorine-based electrolyte include specifically perfluorocarbon sulfonic acid based polymer such as Nafion (registered trade name, produced by Dupont), Aciplex (trade name, produced by Asahi Kasei Chemicals Corporation), Flemion (registered trade name, produced by Asahi Glass Co., Ltd.) and the like, polytrifluorostyrene sulfonic acid based polymer, perfluorocarbon phosphonic acid based polymer, trifluorostyrene sulfonic acid based polymer, ethylenetetrafluoroethylene-g-styrene sulfonic acid based polymer, ethylene-trarafluoroethylene copolymer, polyvinylidene fluoride-perfluorocarbon sulfonic acid based polymer, and the like. The fluorine-based electrolyte is excellent in durability and mechanical strength.

Preferable examples of the above-mentioned hydrocarbon-based electrolyte include preferably polysulfone sulfonic acid, polyaryletherketone sulfonic acid, polybenzimidazolealkyl sulfonic acid, polybenzimidazolealkyl phosphonic acid, polystyrene sulfonic acid, polyetheretherketone sulfonic acid, polyphenyl sulfonic acid, and the like.

The above-mentioned ion conductive material may be used singly or in combination of two or more kinds.

Moving speed of water is important in hydrophilic porous layer, and therefore EW of the ion conductive material is preferably low. EW of the polymer electrolyte is preferably not higher than 1200 g/eq., more preferably not higher than 1000 g/eq., and most preferably not higher than 700 g/eq. With such a range, diffusion of liquid water can be promoted thereby providing the hydrophilic porous layer which is compatible in a sub-zero temperature starting ability and a high current density operation at normal temperature. The lower limit of EW is not particularly limited, in which it is preferably usually not lower than 500 g/eq. It is to be noted that EW (Equivalent Weight) represents an ion exchange group equivalent mass.

(Production Method of the Hydrophilic Porous Layer)

Production method of the hydrophilic porous layer are not particularly limited, in which, for example, the following method and the like can be used: The electrically conductive material, the ion conductive material and a solvent are mixed with each other to prepare an ink; this ink is applied to the base material; and thereafter drying is made. Additionally, in case of using the electrically conductive material carrying the catalyst component, it is preferable to cause the electrically conductive material to previously carry the catalyst component by using known methods such as impregnation method, liquid phase reduction carrying method, evaporation to dryness method, colloid adsorption method, evaporative decomposition method, reversed micelle (microemulsion) method, and the like.

Here, in the above first embodiment, preferably the ink containing the liquid water vaporization promoting material and the ink containing the liquid water transportation promoting material are separately produced. The reason for this is to cause the inks containing different electrically conductive materials to be separately formed into layer-like structures.

Additionally, in case of the above second embodiment, preferably the ink containing the liquid water evaporation promoting material and the liquid water transportation promoting material is produced. By producing a mixture ink containing two kinds of electrically conductive materials of the liquid water evaporation promoting material and the liquid water transportation promoting material, adhesiveness between the different electrically conductive materials is improved to reduce the water transport resistance at the interface. As a result, a continuous transportation path for water (liquid water) can be secured thereby making it possible that a sub-zero temperature starting ability and a high current density operation become compatible with each other.

The solvent to be used for the ink for the hydrophilic porous layer is not particularly limited, in which examples thereof include water; alcohols such as methanol, ethanol, 1-propanol, 2-propanol, 1-butanol, 1-pentanol, 2-pentanol, 3-pentanol and the like; polyalcohols such as ethylene glycol, propylene glycol, 1,2-butane diol, 1,3-butane diol, 1,4-butane diol, glycerol and the like; organic solvents which will be described below and have a boiling point exceeding 150° C.; and the like. These may be used one kind singly or in combination of two or more kinds.

Selection of the organic solvents is important to control the porosity of the hydrophilic porous layer.

Figure 14:
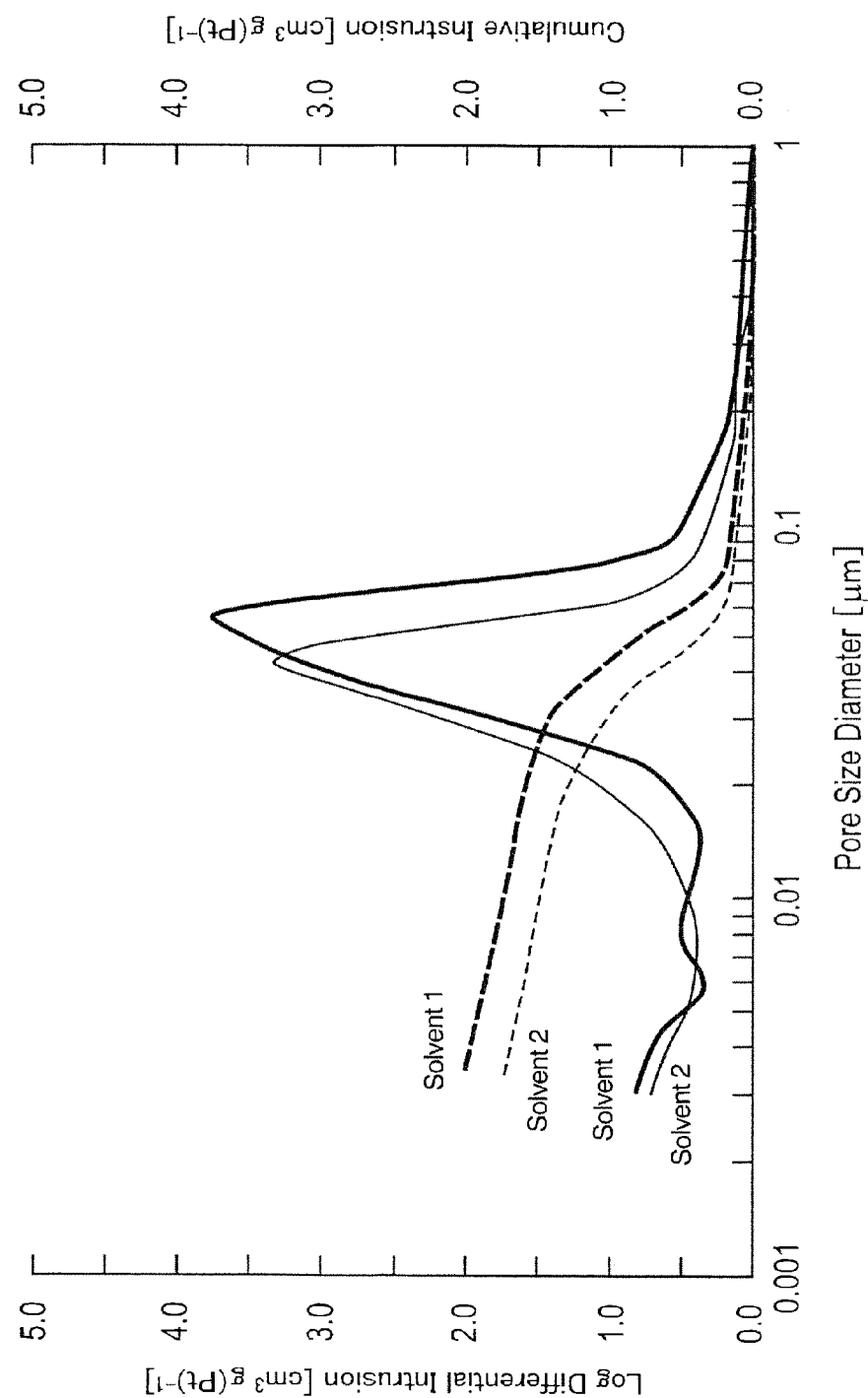
FIG. 14 is a view showing the difference in distribution of the pore diameters in hydrophilic porous layers, according to kinds of solvents in inks.

As discussed after, in case of producing the hydrophilic porous layer which is low in density of the electrically conductive material, it is preferable to use, for the ink, a solvent mixed with a high boiling point organic solvent whose boiling point exceeds 150° C. In case that the high boiling point organic solvent whose boiling point exceeds 150° C. is mixed with the ink, the mean pore diameter can be increased while the porosity can also be increased. Accordingly, by using such an ink, the hydrophilic porous layer having a low density can be produced as compared with a case where no high boiling point organic solvent is used. Difference in distribution of pore diameter of the hydrophilic porous layer according to the solvent kinds in the inks is shown in FIG. 14. In FIG. 14, Pore Size Diameter indicates the pore diameter; Cumulative Intrusion (mL/g) indicates the cumulative volume; and Log Differential Intrusion (mL/g) indicates the differentiated pore volume. In FIG. 14, the composition of Solvent 1 is water: NPA (normal propyl alcohol):propylene glycol=4:1:3 (mass ratio); and the composition of Solvent 2 is water:NPA=6:4.

Examples of the high boiling point organic solvent whose boiling point exceeds 150° C. include ethylene glycol (boiling point: 197.6° C.), propylene glycol (boiling point: 188.2° C.), 1,2-butane diol (boiling point: 190.5° C.), 1,3-butane diol (boiling point: 207.5° C.), 1,4-butane diol (boiling point: 229.2° C.), glycerol (boiling point: 290° C.), NMP (N-methylpyrrolidone) (boiling point: 202° C.), DMSO (dimethyl sulfoxide) (boiling point: 189° C.), and the like. These may be used one kind singly or in combination of two or more kinds. It is to be noted that the high boiling point organic solvent is preferably uniformly mixed with water.

The solvent for the ink for the hydrophilic porous layer may be constituted of only the high boiling point organic solvent. Additionally, a mixture of the high boiling point organic solvent and other solvent(s) (for example, water and/or organic solvent having a boiling point lower than 150° C. (methanol, ethanol, 1-propanol, 2-propanol, 1-butanol, 1-pentanol, 2-pentanol, 3-pentanol and the like)) may be used. In case of using the mixture of the high boiling point organic solvent and other solvent(s), the rate of the high boiling point organic solvent in the solvent is preferably not less than 10 mass % and more preferably not less than 30 mass %. It is to be noted that the upper limit of the rate of the high boiling point organic solvent in the solvent is particularly limited since the rate of the high boiling point organic solvent is preferable to be higher from the viewpoint of a water maintaining ability; however, it is preferably not more than 70 mass % upon taking account of dispersibility of the polymer electrolyte. In case of using the mixture of the high boiling point organic solvent and other solvent(s), it is supposed that also the mean pore diameter and the porosity can be increased.

Additionally, the porosity can be controlled by intentionally changing the mixing ratio (I/C ratio) between the ion conductive material (I) and the electrically conductive material (C) when the ink is prepared. In Table shown below, variation in the porosities upon changing the I/C ratio are indicated. It is confirmed that the porosity decreases as the I/C ratio increases.

TABLE 6

| I/C | Porosity |
| --- | --- |
| 0.7 | 73% |
| 0.9 | 64% |
| 1.3 | 51% |

Accordingly, in case that the porosity is required to be controlled, I/C is suitably set thereby making it possible to easily control the porosity.

It is to be noted that the solvent in the present specification includes a dispersion medium in which solid contents such as binder, the electrically conductive material and the like are to be dispersed, i.e., all liquid contents other than solid contents. Accordingly, for example, in case of producing the ink for the hydrophilic porous layer by mixing the ion conductive material dispersed in water and the organic solvent, the solvent described in the present specification means both the water and the organic solvent.

A solid content rate (rate of the solid content relative to whole mass of the hydrophilic porous layer) of the ink for the hydrophilic porous layer is not particularly limited, in which it is normally about 5 to 20 mass %. With this range, the points of the forming efficiency of the porous layer and the stability of the ink are excellent.

A preparation method for the ink for the hydrophilic porous layer is not particularly limited. Additionally, a mixing order of the ion conductive material, the electrically conductive material and the solvent is not particularly limited, in which specifically (i-1) to (i-3) discussed below are given.

(i-1) A solution containing the ion conductive material is prepared, and then the above-mentioned solution is mixed with the electrically conductive material. Thereafter, the solvent is further added thereby to prepare the ink for the hydrophilic porous layer;

(i-2) A solution containing the ion conductive material is prepared, and then the solvent is added. Thereafter, the electrically conductive material is further mixed (added) thereby to prepare the ink for the hydrophilic porous layer; and (i-3) The electrically conductive material and the solvent are mixed with each other. Subsequently, a separately prepared solution containing the ion conductive material is further added thereby to prepare the ink for the hydrophilic porous layer.

Of the above-mentioned methods, the methods (i-1) and (i-2) are preferable, and the method (i-1) is more preferable. By this, water and the organic solvent is uniformly mixed with each other so that a solvent compound is readily formed.

In the above-mentioned methods (i-1) to (i-3), the ion conductive material is dispersed in the solvent in the solution containing. An ion conductive material content rate in the solution containing the ion conductive material in this case is not particularly limited, in which a solid content is preferably 1 to 40 mass %, and more preferably 5 to 20 mass %. With such a content rate, the polymer electrolyte can be suitably dispersed in the solvent.

The solution containing the ion conductive material may be prepared by a person himself or herself, or a commercial product may be used as the solution. The dispersion solvent for the ion conductive material in the solution containing the above-mentioned ion conductive material is not particularly limited, in which water, methanol, ethanol, 1-propanol, 2-propanol and the like are given. Water, ethanol, and 1-propanol are preferable taking account of dispersibility. These dispersion solvents may be used one kind singly or in combination of two or more kinds.

Additionally, in a production process of the ink for the hydrophilic porous layer, after the ion conductive material, the electrically conductive material and the solvent are mixed with each other, a separate mixing step may be made in order to accomplish good mixing. A preferable example of such a mixing step is to sufficiently disperse a catalyst ink by a ultrasonic homogenizer, or to sufficiently pulverize this mixture slurry by a sand grinder, a circulating ball mill, a circulating bead mill and the like, followed by making a vacuum degassing operation.

Next, after the obtained ink for the hydrophilic porous layer is applied on the base material, the base material on which the ink for the hydrophilic porous layer is applied is dried.

An applying method of the ink for the hydrophilic porous layer onto the surface of the base material is not particularly limited, and therefore known methods can be used. Specifically, known methods such as spray (spray applying) method, Gulliver printing method, die coater method, screen printing method, doctor blade method, transfer printing method and the like can be used. Additionally, an apparatus used for applying the catalyst ink onto the surface of the base material is also not particularly limited, in which known apparatuses can be used. Specifically, applying apparatuses such as a screen printer, a spray apparatus, a bar coater, a die coater, a reverse coater, a comma coater, a gravure coater, a spray coater, a doctor knife and the like can be used. It is to be noted that the applying step may be accomplished once or repeatedly several times.

It is to be noted that, in case of the above first embodiment, preferably the ink containing the liquid water vaporization promoting material and the ink containing the liquid water transportation promoting material may be successively applied. At this time, by making a heat treatment, adhesiveness at an interface can be improved to reduce the water transport resistance. As a result, by securing a continuous transportation path for water (liquid water), the sub-zero temperature starting ability and the high current density operation are made compatible with each other. A condition of the heat treatment is not particularly limited, in which it is preferable to make the heat treatment at 20 to 170° C. for about 1 to 40 minutes. It is to be noted that the step of the heat treatment is sufficient to be made at any stage of a MEA production process, so that limitation is not made to an embodiment in which the ink for the hydrophilic porous layer is dried immediately after the ink for the hydrophilic porous layer is applied onto the base material.

Lastly the base material onto which the ink for the hydrophilic porous layer is applied is dried thereby to remove the solvent. A drying time for drying the base material onto which the ink for the hydrophilic porous layer is applied is not particularly limited, in which it is preferably 5 to 30 minutes. Additionally, an atmosphere for drying is not particularly limited, in which drying is preferably made in the atmosphere of air or in the atmosphere of an inert gas. A step for drying the ink for the hydrophilic porous layer may be made at any step in a MEA production process, so that limitation is not made to a mode in which the ink for the hydrophilic porous layer is dried immediately after the ink for the hydrophilic porous layer is applied onto the base material.

The base material on which the ink for the hydrophilic porous layer is to be applied may be suitably selected according to the mode of the finally obtained hydrophilic porous layer, in which the electrode catalyst layer, the gas diffusion layer, a polymer sheet such as a polytetrafluoroethylene (PTFE) sheet or the like, or the like can be used.

(Membrane Electrode Assembly for Fuel Cell)

The hydrophilic porous layer of the present invention has an excellent water-drainage even during a sub-zero temperature starting and even during a normal temperature operation. Accordingly, a sub-zero temperature starting ability and a high current density operation can be realized. Hereinafter, a preferable embodiment of MEA including the hydrophilic porous layer of the present invention will be discussed. It is to be noted that each drawing is expressed upon being exaggerated for the sake of convenience, and therefore there is a case where the dimension ratios of respective constituting elements in each drawing may be different from actual ones. Additionally, the same reference numerals are assigned to the same members in each drawing thereby to omit explanation therefor.

Figure 15:
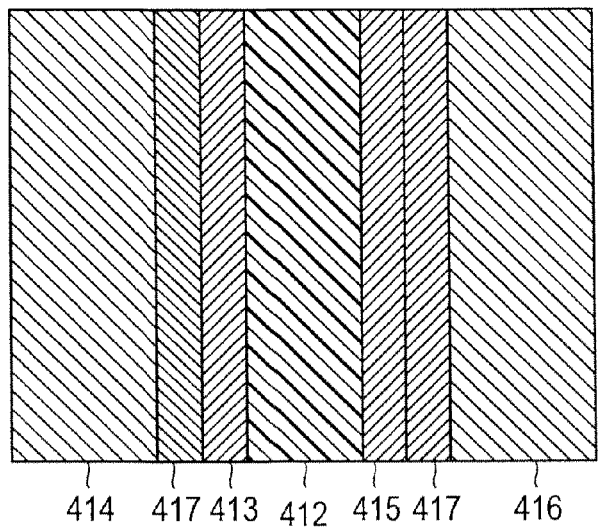
FIG. 15 is a cross-sectional typical view showing an embodiment of MEA including a hydrophilic porous layer.

FIG. 15 is a sectional typical view of a preferable embodiment (a third embodiment) of a MEA including the hydrophilic porous layer of the above-mentioned embodiment. MEA 410 in FIG. 15 has a such a configuration that an anode-side electrode catalyst layer 413 and a cathode-side electrode catalyst layer 415 are oppositely disposed respectively at the opposite surfaces of a solid polymer electrolyte membrane 412, and this is interposed between an anode-side gas diffusion layer 414 and a cathode-side gas diffusion layer 416. Further, a hydrophilic porous layer 417 is disposed between the anode-side electrode catalyst layer 413 and the anode-side gas diffusion layer 414, and between the cathode-side electrode catalyst layer 415 and the cathode-side gas diffusion layer 416. Since MEA has the hydrophilic porous layer 417, both an evaporation function and a transportation function for liquid water can be promoted in connection with water-drainage for the catalyst layer. Accordingly, when MEA of this embodiment is applied to a fuel cell, a sub-zero starting ability and a high current density operation at normal temperature can be compatible with each other.

The third embodiment is a mode in which the hydrophilic porous layer 417 is disposed between the anode-side electrode catalyst layer 413 and the anode-side gas diffusion layer 414 and between the cathode-side electrode catalyst layer 415 and the cathode-side gas diffusion layer 416. However, limitation is not made to the above-mentioned arrangement mode, so that the hydrophilic porous layer 417 may be disposed on either the cathode-side or the anode-side. Additionally, the hydrophilic porous layer may be disposed between the polymer electrolyte membrane and the electrode catalyst layer. A mode where the hydrophilic porous layer is disposed at least on the anode-side is preferable. It has been discussed above that a factor of the reason for starting ability lowering is freezing of water produced under electricity generation so that transportation of oxygen is impeded when a fuel cell is started below freezing point. Accordingly, it is important that the moving direction of water during absorption of produced water is from the cathode-side electrode catalyst layer through the electrolyte membrane to the anode-side electrode catalyst layer. By disposing the hydrophilic porous layer on the anode-side, more produced water returns to the anode catalyst layer side thereby making it possible to improve a starting ability below freezing point.

Additionally, it is preferable to dispose the hydrophilic porous layer adjacent particularly to the anode catalyst layer, preferably between the catalyst layer and the gas diffusion layer. At least the membrane and catalyst layer have a water maintaining function inside MEA. Since the catalyst layers (anode/cathode) are so disposed that the membrane is interposed between them, it becomes possible that liquid water existing inside MEA (membrane and catalyst layer) smoothly move to and is maintained in the hydrophilic porous layer because of the fact that the hydrophilic porous layer is disposed adjacent to the catalyst layer. Additionally, the hydrophilic porous layer is of the shape of a thin film and therefore difficult to maintain its shape; however, the structure can be easily maintained by disposing it adjacent to the gas diffusion layer. It is to be noted that the gas diffusion layer may have or not have a micropore layer (MPL) which will be discussed after. Since MPL is high in water transport resistance, it is preferable that the gas diffusion layer is constituted of the gas diffusion layer base material (without MPL) from the viewpoint of water transportation. MLP is high in water transport resistance, whereas the gas diffusion layer base material is low in the transport resistance because of being formed of macropores.

Figure 16:
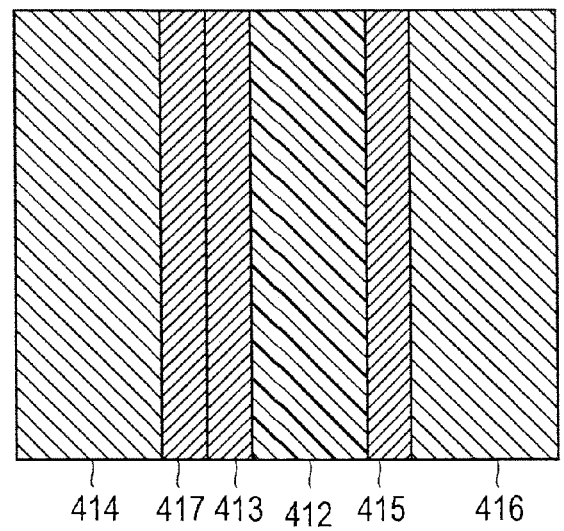
FIG. 16 is a cross-sectional typical view showing another embodiment of MEA including a hydrophilic porous layer.

FIG. 16 is a cross-sectional typical view showing another embodiment (a fourth embodiment) of preferable MEA including the hydrophilic porous layer of the present invention (the third implementation mode). MEA 410' in FIG. 16 has a such a configuration that an anode-side electrode catalyst layer 413 and a cathode-side electrode catalyst layer 415 are oppositely disposed respectively at the opposite surfaces of a solid polymer electrolyte membrane 412, and this is interposed between an anode-side gas diffusion layer 414 and a cathode-side gas diffusion layer 416. Further, a hydrophilic porous layer 417 is disposed between the anode-side electrode catalyst layer 413 and the anode-side gas diffusion layer 414, and between the cathode-side electrode catalyst layer 415 and the cathode-side gas diffusion layer 416. Since the hydrophilic porous layer 417 is disposed only at the anode electrode, a function to transport produced water at the cathode to the anode side through the diaphragm can be promoted while suppressing an oxygen transportation inhibition due to freezing or flooding of liquid water inside the gas diffusion layer on the cathode side. Accordingly, when MEA of this embodiment is applied to a fuel cell, a sub-zero temperature starting ability and a high current density operation at normal temperature can be compatible with each other.

Figure 17:
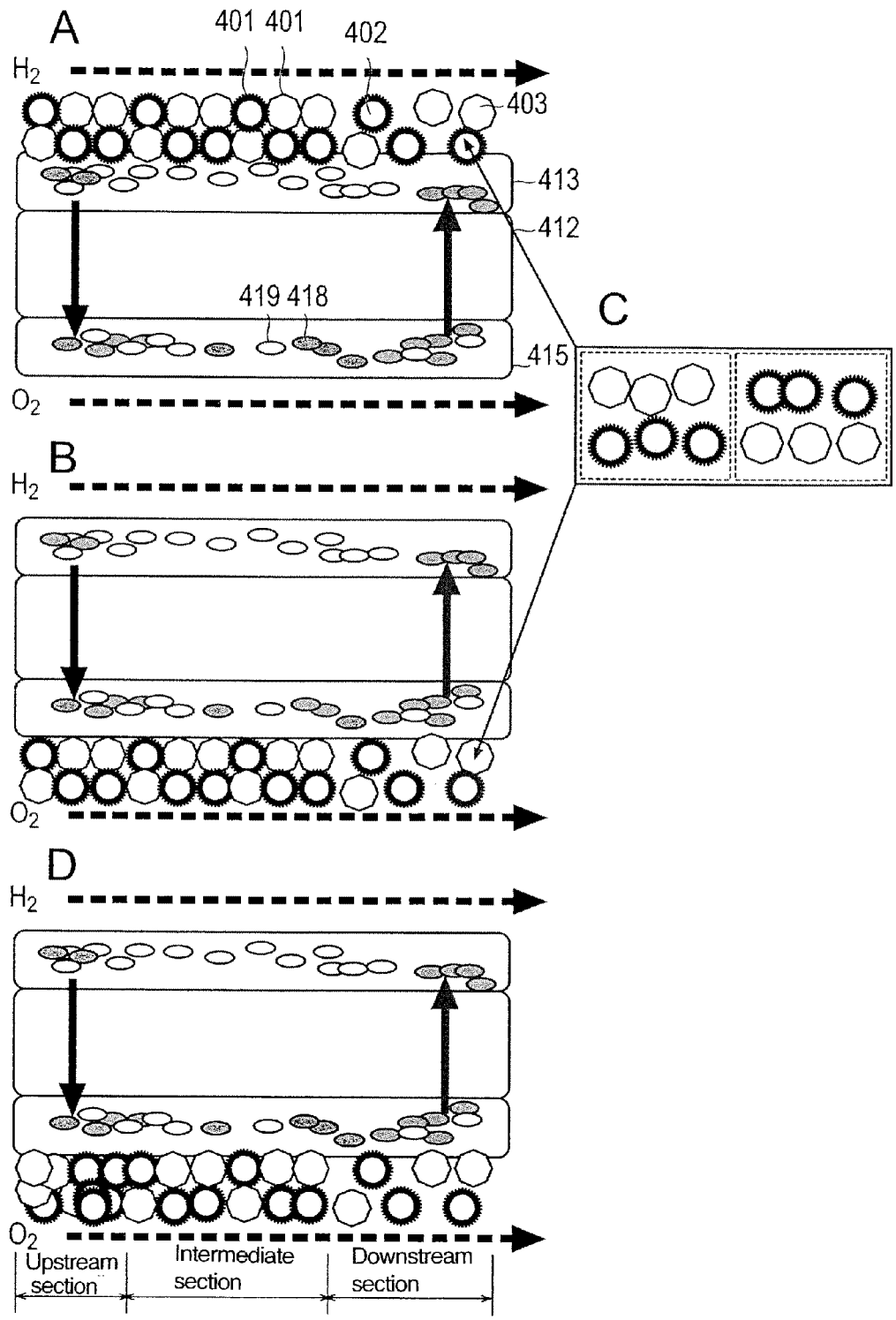
FIG. 17 in which A to D are cross-sectional typical views showing another embodiments of MEA including hydrophilic porous layers.

MEA in which a section (referred hereinafter to as a downstream section) of the hydrophilic porous layer opposite to a cathode gas outlet has a structure sparser than that of a section (referred hereinafter to as an upstream section) of the hydrophilic porous layer opposite to a cathode gas inlet is also a preferable embodiment (a fifth embodiment). A section of the hydrophilic porous layer other than the upstream section and the downstream section is referred to as an intermediate section. A cross-sectional typical view of the fifth embodiment is shown in FIG. 17. In FIG. 17, the gas diffusion layer is not shown for the purpose of simplicity of illustration. A in FIG. 17 corresponds to a case where the hydrophilic porous layer is disposed in the anode electrode; and B in FIG. 17 corresponds to a case where the hydrophilic porous layer is disposed in the cathode electrode. Here, "structure sparser" means that the porosity of the downstream section is higher than the porosity of the upstream section. Specifically, on the assumption that the porosity of the upstream section is 1, the porosity of the downstream section is preferably 0.37 to 0.9 and more preferably 0.57 to 0.9.

Thus, the hydrophilic porous layer having the sparser structure is disposed at least one of the anode catalyst layer or the cathode catalyst layer, opposite to the cathode gas outlet at which staying of liquid water tends to occur, and therefore larger transportation path for water vapor can be secured thereby to improve a water-drainage. Accordingly, when MEA of this embodiment is applied to a fuel cell, a sub-zero temperature starting ability and a high current density operation at normal temperature can be compatible with each other. Such a planar distribution is particularly effective for a large-sized fuel cell MEA.

The hydrophilic porous layer including the downstream section having the sparser structure as in this embodiment can be easily produced by using, as the ink, one mixed with the high boiling point solvent whose boiling point exceeding 150° C. as discussed above. Additionally, this can be produced by controlling I/C.

The section of the hydrophilic porous layer opposite to a cathode gas outlet represents a section of at least 0-1/5 L, preferably 0-1/3 L on the assumption that an end portion in a cathode gas outlet direction is 0 relative to a whole length L of the hydrophilic porous layer in a gas flow direction. Additionally, the section of the hydrophilic porous layer opposite to the cathode gas inlet represents a section of at least 0-1/5 L on the assumption that an end portion in a cathode gas inlet direction is 0 relative to the whole length L of the hydrophilic porous layer in a gas flow direction. The hydrophilic porous layer around a central section, other than the above-mentioned upstream and downstream sections is the intermediate section. The structure of the intermediate section is not particularly limited, in which it is preferably the same in configuration as the upstream section (A and B in FIG. 17), or sparser than that of the upstream section and denser than the downstream section (D in FIG. 17). The denser hydrophilic porous layer is disposed at the cathode gas inlet as in the mode of D in FIG. 17, and therefore a liquid water transportation of from the cathode to the anode can be promoted thereby making it possible to lower the water transport resistance for the whole membrane electrode assembly. Accordingly, when MEA of this embodiment is applied to a fuel cell, a sub-zero temperature starting ability and a high current density operation at normal temperature can be compatible with each other. Additionally, the water transport resistance to a section which tends to be put into a dried condition in the anode electrode is lowered thereby providing a membrane electrode assembly for a fuel cell, provided with a dry-out resistance.

At A and B in FIG. 17, while the downstream section exists in a state where the liquid water evaporation promoting material and the liquid water transportation promoting material are mixed with each other, the downstream section may take a mode where a layer containing the liquid water evaporation promoting material and a layer containing the liquid water transportation promoting material are laminated (C in FIG. 17).

Figure 18:
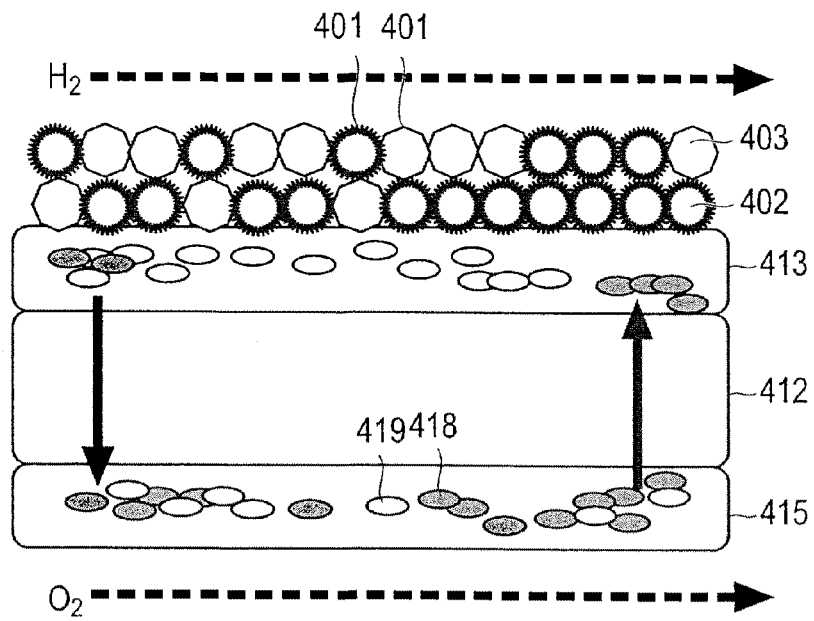
FIG. 18 is cross-sectional typical view showing another embodiment of MEA including a hydrophilic porous layer.

Additionally, the hydrophilic porous layer of the present invention (the third embodiment) can take a variety of modifications in order to attain a desired performance. For example, in case of intending to more raise the sub-zero temperature starting ability, (1) a mode (the sixth embodiment) where the section of the hydrophilic porous layer opposite to the cathode gas outlet contains the liquid water evaporation promoting material more than the liquid water transportation promoting material is preferable. FIG. 18 is a cross-sectional typical view illustrating the mode of the above-mentioned (1). For the purpose of simplicity of illustration, the gas diffusion layer is not shown. Additionally, while the hydrophilic porous layer is disposed only in the anode electrode in this embodiment, it may be disposed only in the cathode electrode or in both the anode electrode and the cathode electrode. Further, in this embodiment, the contents of the liquid water evaporation promoting material and the liquid water transportation promoting material are nearly the same in the upstream and intermediate sections; however, limitation is not made to such modes, in which a composition ratio of the liquid water evaporation promoting material and the liquid water transportation promoting material in the upstream and intermediate sections may be suitably designed.

The hydrophilic porous layer in which the electrically conductive material having a large cover area is much blended is adjacent to at least one of the anode catalyst layer or the cathode catalyst layer, opposite to the cathode gas outlet (making up counterflows), and therefore a liquid water evaporation function can be further promoted. As a result, a water transportation of from the cathode electrode to the anode electrode can be improved thereby lowering the water transport resistance in whole MEA. Accordingly, when MEA of this embodiment is applied to a fuel cell, a sub-zero temperature starting ability and a high current density operation at normal temperature can be compatible with each other, in which the sub-zero temperature starting ability is particularly excellent.

In an embodiment of FIG. 18, in the section opposite to the cathode gas outlet, a content mass of the liquid water vaporization promoting material is preferably 1.1 to 10 and preferably 5 to 10 on the assumption that a content mass of the liquid water transportation promoting material is 1. With such a range, a sub-zero starting ability can be effectively improved.

Figure 19:
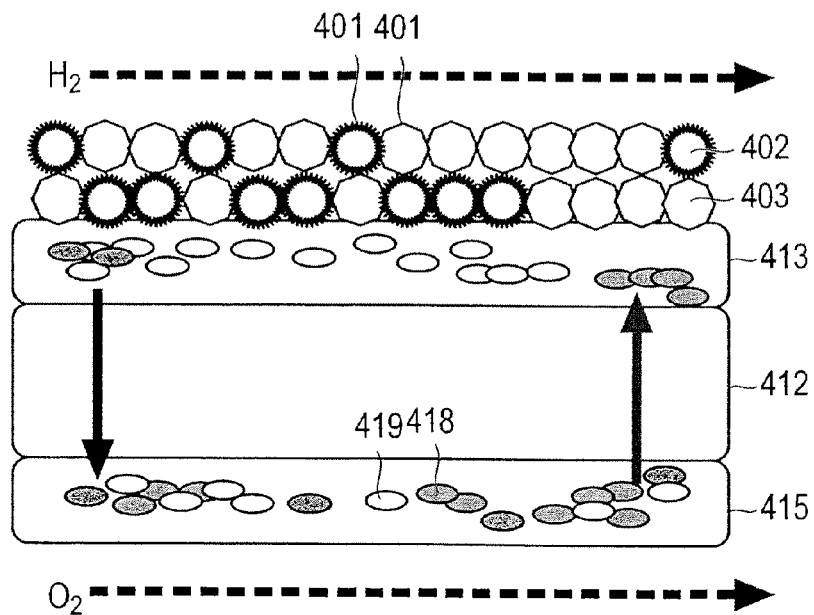
FIG. 19 is a cross-sectional typical view showing another embodiment including a hydrophilic porous layer.

Additionally, in case of intending to attain a high current density operation at high temperatures, (2) a mode (a seventh embodiment) where the section of the hydrophilic porous layer opposite to the cathode gas outlet contains the liquid water transportation promoting material more than the liquid water evaporation promoting material is preferable. FIG. 19 is a cross-sectional typical view illustrating the mode of the above-mentioned (2). For the purpose of simplicity of illustration, the gas diffusion layer is not shown. Additionally, while the hydrophilic porous layer is disposed only in the anode electrode in this embodiment, it may be disposed only in the cathode electrode or in both the anode electrode and the cathode electrode. Further, in this embodiment, the contents of the liquid water evaporation promoting material and the liquid water transportation promoting material are nearly the same in the upstream and intermediate sections; however, limitation is not made to such modes, in which a composition ratio of the liquid water evaporation promoting material and the liquid water transportation promoting material in the upstream and intermediate sections may be suitably designed.

The hydrophilic porous layer in which the electrically conductive material having a small cover area with the ion conductive material is much blended is adjacent to at least one of the anode catalyst layer or the cathode catalyst layer, opposite to the cathode gas outlet (making up counterflows), and therefore a liquid water transportation function can be further promoted. As a result, a water transportation of from the cathode electrode to the anode electrode can be improved thereby lowering the water transport resistance in whole MEA. Accordingly, when MEA of this embodiment is applied to a fuel cell, a sub-zero temperature starting ability and a high current density operation at normal temperature can be compatible with each other, in which the high current density operation can be particularly easily attained.

In an embodiment of FIG. 19, in the section opposite to the cathode gas outlet, a content mass of the liquid water transportation promoting material is preferably 1.1 to 10 and preferably 5 to 10 on the assumption that a content mass of the liquid water vaporization promoting material is 1. With such a range, a further high current density operation at the time of normal temperature becomes possible.

As discussed above, MEA according to the present invention (the third implementation mode) is featured by the hydrophilic porous layer. Accordingly, as other members constituting MEA, hitherto known configurations in the field of fuel cell can be employed as they are or upon being suitably improved. Hereinafter, typical modes of members other than the hydrophilic porous layer will be discussed for reference; however, the technical scope of the present invention is not limited to modes described below.

[Polymer Electrolyte Membrane]

The polymer electrolyte membrane is constituted of an ion exchange resin and has such a function that protons produced in the anode-side catalyst layer during operation of PEFC is selectively transmitted along its thickness direction to the cathode-side catalyst layer. Additionally, the polymer electrolyte membrane has a function to serve also as a partition wall which prevents mixing of a fuel gas supplied to the anode-side and an oxidizer gas supplied to the cathode-side.

A specific configuration of the polymer electrolyte membrane is not particularly limited, in which polymer electrolyte membranes which are hitherto known in the field of fuel cell can be suitably used. Polymer electrolyte membrane is roughly classified into fluorine-based polymer electrolyte membrane and hydrocarbon-based polymer electrolyte membrane according to kinds of ion exchange resins as constituting materials. Examples of ion exchange resin for constituting the fluorine-based polymer electrolyte membrane include, for example, perfluorocarbon sulfonic acid based polymer such as Nafion (registered trade name, produced by Dupont), Aciplex (trade name, produced by Asahi Kasei Chemicals Corporation), Flemion (registered trade name, produced by Asahi Glass Co., Ltd.) and the like, perfluorocarbon phosphonic acid based polymer, trifluorostyrene sulfonic acid based polymer, ethylenetetrafluoroethylene-g-styrene sulfonic acid based polymer, ethylenetrarafluoroethylene copolymer, polyvinylidene fluoride-perfluorocarbon sulfonic acid based polymer, and the like. From the viewpoints of electricity generation performances such as heat resistance, chemical stability and the like, these fluorine-based polymer electrolyte membranes are preferably used, and the fluorine-based polymer electrolyte membrane constituted of perfluorocarbon sulfonic acid based polymer is particularly preferably used.

Specific examples of the above-mentioned hydrocarbon-based electrolyte include sulfonated polyethersulfone (S-PES), sulfonated polyaryletherketone, sulfonated polybenzimidazole alkyl, phosphonated polybenzimidazole alkyl, sulfonated polystyrene, sulfonated polyetheretherketone (S-PEEK), sulfonated polyphenylene (S-PPP), and the like. These hydrocarbon-based polymer electrolyte membranes are preferably used from the productional viewpoints of raw materials being inexpensive, production process being simple, and selectivity of materials being high. It is to be noted that the above-mentioned ion exchange resin may be used one kind singly or in combination of two or more kinds. Additionally, it is a matter of course that limitation is not made to the above-mentioned materials so that other materials may be used.

A thickness of the polymer electrolyte membrane may be suitably decided upon taking account of the characteristics of obtained MEA and PEFC, and therefore is not particularly limited. It is to be noted that the thickness of the polymer electrolyte member is preferably 5 to 300 μm, more preferably 10 to 200 μm, and further preferably 15 to 150 μm. If the thickness is at a value within such a range, a balance among strength during film production, durability in use and power output characteristics in use can be suitably controlled.

[Catalyst Layer]

The catalyst layer is a layer where reaction actually proceeds. Specifically, an oxidation reaction of hydrogen proceeds in the anode-side catalyst layer, whereas a reduction reaction of oxygen proceeds in the cathode-side catalyst layer. The catalyst layer contains a catalyst component, an electrically conductive carrier carrying the catalyst component, and a proton conductive polymer electrolyte.

The catalyst component used in the anode-side catalyst layer is not particularly limited as far as it has a catalytic action to oxidation reaction of hydrogen, so that known catalysts can be similarly used for it. Additionally, the catalyst component used in the cathode-side catalyst layer is also not particularly limited as far as it has a catalytic action to reduction reaction of oxygen, so that known catalysts can be similarly used for it. Specifically, the catalyst component is selected from metal such as platinum, ruthenium, iridium, rhodium, palladium, osmium, tungsten, lead, iron, chromium, cobalt, nickel, manganese, vanadium, molybdenum, gallium, aluminum and the like, and alloy and the like thereof. It is a matter of course that other materials may be used for the catalyst component. Of these, the catalyst component containing at least platinum is preferably used in order to improve a catalytic activity, a poisoning resistance to carbon monoxide and the like, and a heat resistance. The composition of the above-mentioned alloy preferably contains 30 to 90 atomic % of platinum and 10 to 70 atomic % of a metal to be alloyed with platinum, according to kinds of metals to be alloyed with platinum. The composition of the alloy in case of using the alloy as the cathode-side catalyst is different according to kinds of metals to be alloyed so as to be suitably selected by persons skilled in the art, in which the composition of 30 to 90 atomic % of platinum and 10 to 70 atomic % of other metals to be alloyed is preferable. It is to be noted that the alloy is a generic name of ones which are prepared by adding one or more kinds of metal elements or non-metal elements to a metal element and which have metallic properties. As a structure of the alloy, there are an eutectic alloy which is, so to speak, a mixture where component elements form separate crystals, one in which component elements completely melt to form a solid solution, and one in which component elements form an intermetallic compound or a compound of metal and non-metal, in which either one may used for the present application. In this time, the catalyst component to be used for the anode catalyst layer and the catalyst component to be used for the cathode catalyst layer are selected from the above-mentioned ones. In the description of the present specification, the catalyst components of the anode catalyst layer and the cathode catalyst layer have similar definition between them, and therefore are referred to as "catalyst component" in the lump, if not otherwise specified. However, the catalyst components of the anode catalyst layer and the cathode catalyst layer are not required to be the same and therefore may be suitably selected so as to make the desired effects mentioned above.

The shape and size of the catalyst component is not particularly limited so that similar shape and size to those of known catalyst components may be used, in which the catalyst component is preferably granular. In this connection, the mean particle diameter of a catalyst particle is preferably 1 to 30 nm, more preferably 1.5 to 20 nm, most preferably 2 to 10 nm, and particularly preferably 2 to 5 nm. If the mean particle diameter of the catalyst particle is within such a range, a balance between a catalyst utilization factor in connection with an effective electrode area where an electrochemical reaction proceeds and a convenience in catalyst-carrying may be suitably controlled. It is to be noted that "the means particle diameter of the catalyst particle" may be measured as a crystal size determined from the half bandwidth of a diffraction peak of the catalyst component in a X-ray diffraction or as a mean value of the particle diameter of the catalyst component obtained from the image of a transmission electron microscope.

The electrically conductive carrier functions as a carrier for carrying the above-mentioned catalyst component, and as an electronically conductive path relating to electron transfer between it and the catalyst component.

As the electrically conductive carrier, it is sufficient to have a specific surface area for carrying the catalyst component in a desired dispersed state and a sufficient electronic conductivity, and it is preferable to be formed of a carbon-based material whose main component is carbon. Specifically, examples of the carbon-based material include carbon particles formed of carbon black, graphitization-treated carbon black, activated carbon, coke, natural graphite, artificial graphite, carbon nanotube, carbon nanohorn, carbon fibril structure, and/or the like. It is to be noted that the fact that "main component is carbon" means that carbon atom is contained as the main component, and therefore the fact is an idea including both a matter of being formed of only carbon atom and another matter of being substantially formed of carbon atom. According to cases, element(s) other than carbon atom may be contained in the electrically conductive carrier in order to improve the characteristics of a fuel cell. It is to be noted that the fact that "substantially formed of carbon atom" means that about 2 to 3 mass % or less of impurity getting mixed is permissible.

It is preferable that graphitized electrically conductive material such as graphitization-treated carbon black is used in the catalyst layer, particularly in the anode-side catalyst layer, in which graphitized carbon material is more preferably used for the electrically conductive carrier because a corrosion resistance of the electrically conductive material can be improved. However, the graphitized electrically conductive material is small in cover area with the ion conductive material and therefore small in evaporation area for liquid water, so as to have fears of freezing at sub-zero temperature or flooding at normal temperature. By disposing the hydrophilic porous layer adjacent to the catalyst layer using the graphitized electrically conductive material, the water-drainage can be improved thereby making the sub-zero temperature starting ability and the high current density operation at normal temperature compatible with each other and offering a membrane electrode assembly provided with the corrosion resistance for the electrically conductive material as discussed after. The graphitization-treated carbon black is preferably spherical, in which the means lattice spacing $d_{002}$ of [002] planes calculated under X-ray diffraction is preferably 0.343 to 0.358 nm, and the BET specific surface area is preferably 100 to 300 m$^2$/g.

The BET specific surface area of the electrically conductive carrier may be sufficient to allow the catalyst component to be carried under a highly dispersed state, in which it is preferably 20 to 1600 m$^2$/g and more preferably 80 to 1200 m$^2$/g. With the specific surface area within such a range, the balance between the dispersability of the catalyst component on the electrically conductive carrier and the effective utilization factor of the catalyst component can be suitably controlled.

A size of the electrically conductive carrier is not particularly limited, in which it is good that a mean particle diameter is 5 to 200 nm, preferably about 10 to 100 nm from the viewpoints of convenience of carrying, catalyst utilization factor and controlling the thickness of the electrode catalyst layer within a suitable range.

In a composite (hereinafter referred to as also "electrode catalyst") in which the catalyst component is carried on the electrically conductive carrier, a carried amount of the catalyst component is preferably 10 to 80 mass %, more preferably 30 to 70 mass % relative to the whole amount of the electrode catalyst. If the carried amount of the catalyst component is within such a range, a balance between a dispersion degree of the catalyst component on the electrically conductive carrier and a catalyst performance can be suitably controlled. It is to be noted that the carried amount of the catalyst component can be measured by an inductively coupled plasma emission spectrochemical analysis method (ICP).

Additionally, carrying the catalyst component on the carrier can be accomplished by known methods. For example, the known methods such as impregnation method, liquid phase reduction carrying method, evaporation to dryness method, colloid adsorption method, evaporative decomposition method, reversed micelle (microemulsion) method, and the like can be used.

Otherwise, in the present invention, marketed products may be used as the electrode catalyst. Examples of such marked products include, for example, one produced by Tanaka Kikinzoku Kogyo K.K., one produced by N.E. Chemcat Corporation, one produced by E-TEK, one produced by Johnson Matthey, and the like. These electrode catalysts are ones in which platinum or platinum alloy is carried on a carbon carrier (a carried concentration of a catalyst species: 20 to 70 mass %). In the above-mentioned, examples of the carbon carrier are Ketchen Black, Vulcan, acetylene black, Black Pearls, graphitization-treated carbon carrier which is previously heat-treated at a high temperature (for example, graphitization-treated Ketchen Black), carbon nanotube, carbon nanohorn, carbon fiber, mesoporous carbon, and the like.

The catalyst layer contains an ion conductive polymer electrolyte in addition to the electrode catalyst. The ion conductive polymer electrode is not particularly limited and suitably refers to hitherto known knowledge, in which, for example, an ion exchange resin constituting the above-mentioned polymer electrolyte membrane can be added as the above-mentioned polymer electrolyte into the catalyst layer. In case that the catalyst layer is the hydrophilic porous layer, the above-mentioned polymer electrolyte is used as the ion conductive material.

[Gas Diffusion Layer]

The gas diffusion layer has a function to promote diffusion of gas (fuel gas or oxidizer gas) supplied through a separator flow path into the catalyst layer and a function to serve as an electron conduction path.

A material constituting the base material of the gas diffusion layer is not particularly limited, in which hitherto known knowledge can be suitably referred to. Examples of the material include sheet-like materials having electrical conductivity and porosity such as a fabric made of carbon, a paper-like body formed by paper-making, a felt, and a nonwoven fabric. A thickness of the base material may be suitably decided upon taking account of the characteristics of the obtained gas diffusion layer, in which it is preferably about 30 to 500 μm. If the thickness of the base material is a value within such a range, a balance between a mechanical strength and diffusibility of gas and water can be suitably controlled.

The gas diffusion layer preferably includes a water repellent agent for the purpose of improving a water repellent property thereby preventing a flooding phenomena. The water repellent agent is not particularly limited, in which examples of it include a fluorine-based polymer material such as polytetrafluoroethylene (PTFE), polyvinylidene fluoride (PVdF), polyhexafluoropropylene, tetrafluoroethylene-hexafluoropropylene copolymer (FEP) and the like, polypropylene, polyethylene, and the like.

Additionally, in order to further improve the water repellent property, the gas diffusion layer may be provided, at the side of the catalyst layer, with a carbon particle layer (microporous layer: MPL) formed of aggregate of carbon particles containing a water repellent agent.

The carbon particles contained in the carbon particle layer are not particularly limited, in which hitherto known materials such as carbon black, graphite, expandable graphite and the like can be suitably used. Of these, carbon black such as oil furnace black, channel black, lamp black, thermal black, acetylene black and the like can be preferably used. A mean particle diameter of the carbon particle is preferably about 10 to 100 nm. By this, a high water-drainage due to capillary tube action can be obtained while it becomes possible to improve contact of the carbon particles with the catalyst layer.

As the water repellent agent used in the carbon particle layer, ones similar to the above-mentioned water repellent agents are given. Of these, fluorine-based polymer materials can be preferably used because of being excellent in water repellency and corrosion resistance and the like during electrode reaction.

A mixing ratio of the carbon particles and the water repellent agent is preferably about 90:10 to about 40:60 (carbon particles:water repellent agent) in mass ratio upon taking account of a balance between water repellent characteristics and electron conductivity. It is to be noted that a thickness of the carbon particle layer is not particularly limited, in which it may be suitably decided upon taking account of the water repellent characteristics of the obtained gas diffusion layer.

(Production Method of Membrane Electrode Assembly for Fuel Cell)

A production method of MEA of the above-mentioned embodiment is not particularly limited, in which MEA can be produced by hitherto known production methods.

Preferably the production method includes a step (referred to also as Step 1) of combining the catalyst layer and the hydrophilic porous layer, and a step (referred to also as Step 2) of subsequently combining the gas diffusion layer with the hydrophilic porous layer at a side opposite to a side at which the catalyst layer is combined. If the hydrophilic porous layer ink is applied onto the gas diffusion layer and then dried, there is a fear that a contact resistance rises. This can be solved by carrying out Step 1 and Step 2 in the order mentioned. Additionally, by employing such steps, it becomes possible to improve the continuity of the water transportation path.

Figure 20:
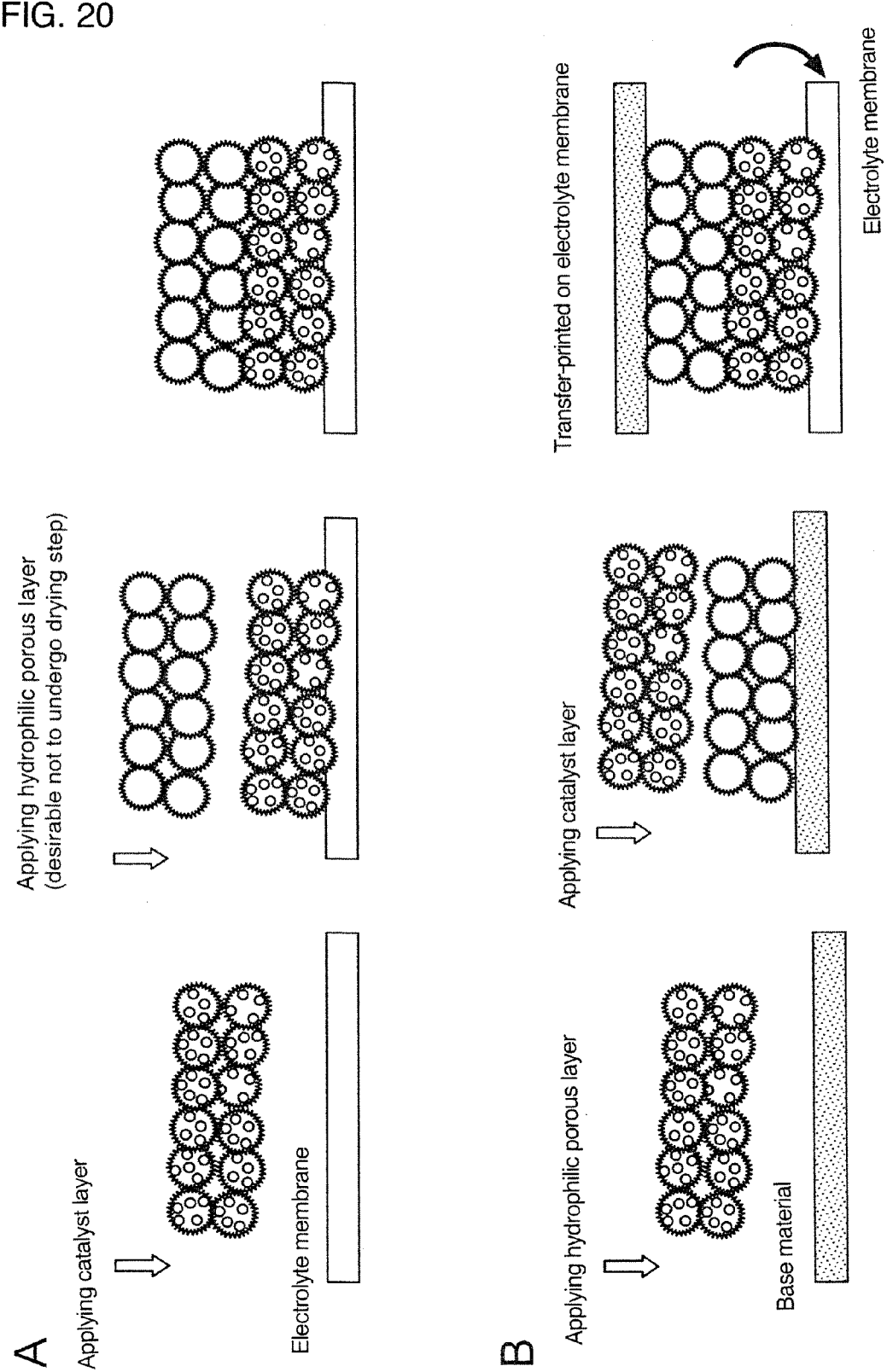
FIG. 20 in which A and B are typical views showing a specific embodiment of a process for combining a catalyst layer and a hydrophilic porous layer.

A specific embodiment of Step 1 is shown at A in FIG. 20. In the embodiment of A in FIG. 20, the electrode catalyst layer is produced on the electrolyte membrane before Step 1. Then, the ink for the hydrophilic porous layer is applied onto a surface of the formed electrode catalyst layer opposite to a surface at which the electrolyte membrane resides. At this time, it is preferable not to carry out drying because of preventing the liquid water transport resistance from rising.

Another embodiment of Step 1 is shown at B in FIG. 20. In the embodiment of B in FIG. 20, the hydrophilic porous layer slurry is applied onto the base material such as a sheet formed of PTFE or the like; and subsequently the catalyst layer is formed on the hydrophilic porous layer slurry. The thus obtained hydrophilic porous layer—the catalyst layer is formed on the electrolyte membrane by a transfer printing or the like. In case of using a sheet formed of PTFE as the base material, it is preferable that only the sheet formed of PTFE is peeled off after making a hot press, and thereafter the gas diffusion layer is laminated on the hydrophilic porous layer—the catalyst layer. It is to be noted that the step of drying the ink for the hydrophilic porous layer as discussed in the above-mentioned production method of the hydrophilic porous layer is preferably carried out at any stage in a MEA production process, so that limitation is not made to the mode where the ink for the hydrophilic porous layer is dried immediately after the ink for the hydrophilic porous layer is applied onto the base material.

Additionally, in case that the porosity and the composition ratio of the liquid water transportation promoting material and the liquid water vaporization promoting material are different among the upstream section, the intermediate section and the downstream section, the respective hydrophilic porous layer inks having suitable compositions are produced and applied to desired places thereby producing MEA.

(Fuel Cell)

Next, PEFC as a preferable embodiment using MEA of the third implementation mode will be discussed with reference to drawings.

Figure 21:
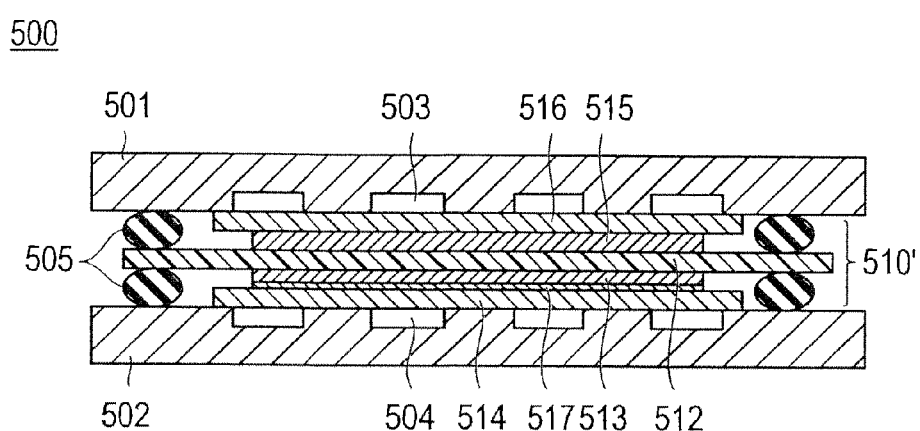
FIG. 21 is a cross-sectional typical view of PEFC including MEA of the present invention (the third implementation mode)

FIG. 21 is a typical sectional view showing a single cell of PEFC in which MEA for a fuel cell is interposed between two separators.

PEFC 500 shown in FIG. 21 is configured by interposing MEA 510' between an anode-side separator 502 and a cathode-side separator 501. Additionally, fuel gas and oxidizer gas to be supplied to MEA are supplied through a plurality of gas supply grooves 504, 503 and the like formed in each of the anode-side separator 502 and the cathode-side separator 501. Additionally, in PEFC in FIG. 21, a gasket 505 is disposed in such a manner as to surround the outer periphery of the electrode located at the surface of MEA 510'. The gasket is a seal member and may take such a configuration as to be fixed through an adhesive layer (not shown) to the outer surface of the solid polymer electrolyte membrane 512 of MEA 10. The gasket functions to secure a sealing ability between the separator and MEA. It is to be noted that the adhesive layer to be used if necessary is preferably disposed in the shape of a frame extending along the whole peripheral section of the electrolyte membrane and corresponding to the shape of the gasket, upon taking account of securing an adhesiveness.

Hereinafter, respective constituent elements of PEFC other than MEA will be successively discussed in detail.

[Gasket]

The gasket is disposed to surround the catalyst layer and the gas diffusion layer (or the gas diffusion electrode) and functions to prevent leaking of the supplied gas (fuel gas or oxidizer gas) from the gas diffusion layer.

A material constituting the gasket is sufficient to be impermeable to gas, particularly oxygen or hydrogen, and therefore is not particularly limited. Examples of the constituting material of the gasket include, for example, rubber materials such as fluorine-contained rubber, silicone rubber, ethylene propylene rubber (EPDM), polyisobutylene rubber and the like, and polymer materials such as polyethylene naphthalate (PEN), polyethylene terephthalate (PET), polytetrafluoroethylene (PTFE), polyvinylidene fluoride (PVdF) and the like. It is to be noted that it is a matter of course that other materials may be used.

A size of the gasket is not particularly limited, in which it may be suitably decided taking account of a desired gas sealing ability and the relationship between it and the size of other members.

[Separator]

MEA is interposed between the separators to constitute a single cell. It is general that PEFC has a stack structure in which a plurality of single cells are connected in series with each other. At this time, the separator functions to electrically connect respective MEAs in series with each other, and is provided with flow paths and a manifold for allowing different fluids such as fuel gas, oxidizer gas and coolant to flow and also functions to maintain a mechanical strength of the stack.

A material constituting the separator is not particularly limited, in which hitherto known knowledge can be suitably referred to. Examples of the material include, for example, a carbon material such as dense carbon graphite, carbon plate and the like, and a metal material such as stainless steel and the like, and the like. The size of the separator and the shape of the flow paths are not particularly limited, in which they may be suitably determined taking account of the output characteristics of PEFC.

A production method for PEFC is not particularly limited, in which PEFC can be produced by referring to hitherto known knowledge in the field of fuel cell.

Hereinbefore, discussion has been made on the polymer electrolyte type fuel cell as an example; however, an alkali type fuel cell, a direct methanol type fuel cell, a micro fuel cell and the like are given as a fuel cell in addition to the polymer electrolyte type fuel cell, in which the present invention is applicable to any fuel cells. Of these, the solid polymer type fuel cell (PEFC) is preferably given because of being possible to be small-sized and to be made highly dense and high in power output.

The above-mentioned fuel cell is useful for a stationary power source in addition to a power source for a movable body such as a vehicle or the like whose mounting space is limited, and suitably used particularly for a vehicle which frequently makes starting/stopping of a system and power output fluctuation, more preferably suitably used for an automotive vehicle.

EXAMPLES

Hereinafter, the present invention will be discussed in detail with reference to Examples. It is to be noted that the technical scope of the present invention is not limited to only Examples discussed after.

Example 1

As an electrically conductive material, a material prepared by making a heat treatment to Ketchen black EC (produced by Ketchen Black International Co., Ltd.) was used. The heat treatment was made at 3000° C. for 2 hours. The Ketchen black EC to which the heat treatment was made had a $S_{BET}$ of 151 m$^2$/g, $\theta_{ion}$ of 1.00 and a $S_{ion}$ of 151 m$^2$/g.

This electrically conductive material and an ion conductive material dispersion liquid (Nafion (registered trade name) D2020, produced by Dupont) were mixed with each other so as to have a mass ratio (I/C ratio) of the electrically conductive material and the ion conductive material being 0.9. Further, a propylene glycol aqueous solution (50 volume %) was added so as to have a solid content rate of an ink (a rate of a solid content relative to a whole mass of the ink) being 12 mass %, thereby preparing an ink.

A catalyst ink was prepared as follows: Electrode catalyst powder (TEC10E50E produced by Tanaka Kikinzoku Kogyo K.K.) and an ion conductive material dispersion liquid (Nafion (registered trade name) D2020, produced by Dupont) were mixed with each other so as to have a mass ratio of a carbon carrier and the ion conductive material being 0.9. Further, a propylene glycol aqueous solution (50 volume %) was added so as to have a solid content rate of the ink being 19 mass %. It is to be noted that the electrode catalyst powder had a BET nitrogen specific surface area of 561 m$^2$/g.

A hydrophilic porous layer was applied onto a polytetrafluoroethylene (PTFE) base material by a screen printing method so as to have a carbon carried amount of about 0.3 mg/cm$^2$. Thereafter, a heat treatment was made at 130° C. for 30 minutes in order to remove organic matters. A catalyst layer was applied onto the hydrophilic porous layer by a screen printing method so as to have a Pt carried amount of 0.05 mg/cm$^2$. Thereafter, a heat treatment was again made at 130° C. for 30 minutes. The hydrophilic porous layer had a porosity of 45% and a thickness of 8 μm. Additionally, the catalyst layer had a porosity of 40% and a thickness of 3 μm.

A laminate of the hydrophilic porous layer and the catalyst layer was transfer-printed onto an electrolyte membrane (Nafion (registered trade name) NR211, produced by Dupont) thereby obtaining an anode-side gas diffusion electrode. The transfer-printing was carried out under the condition of 150° C., 10 minutes and 0.8 MPa. Only the above-mentioned catalyst ink was applied onto an opposite surface (cathode-side) of the electrolyte membrane. By this, a laminate including the cathode-side catalyst layer, the electrolyte membrane, the anode-side catalyst layer and the hydrophilic porous layer laminated in the order mentioned was obtained.

The obtained laminate was interposed between gas diffusion layers (TGP-H060 produced by Toray Industries, Inc.) thereby completing a membrane electrode assembly.

Comparative Example 1

As an electrically conductive material, Ketchen black EC (produced by Ketchen Black International Co., Ltd.) which did not undergo a heat treatment was used. The Ketchen black EC which did not undergo a heat treatment had a $S_{BET}$ of 718 m$^2$/g, $\theta_{ion}$ of 0.34 and a $S_{ion}$ of 244 m$^2$/g.

A membrane electrode assembly was completed similarly to Example with the exception that Ketchen black which did not undergo a heat treatment was used, and the hydrophilic porous layer had a thickness of 60 µm.

Evaluation 1

Measurement of Water Transport Resistance

Using the membrane electrode assembly of Example, a water transport resistance of the hydrophilic porous layer was measured at 80° C., in which it was $15 \times 10^4$ s·cm$^2$·$\Delta$a·g$^{-1}$. Additionally, using the membrane electrode assembly of Comparative Example, a water transport resistance of the hydrophilic porous layer was measured at 80° C., in which it was $1600 \times 10^4$ s·cm$^2$·$\Delta$a·g$^{-1}$.

A water transport resistance of the catalyst layer formed commonly in Example and Comparative Example was measured at 80° C., in which it was $25 \times 10^4$ s·cm$^2$·$\Delta$a·g$^{-1}$.

Evaluation 2

Electricity Generation Test

Electricity generation tests were carried out respectively in two conditions shown in Table 7, in which a cell voltage was measured at a current density of 1.2 A/cm$^2$.

TABLE 7

Condition 1: Pressure: 102 kPa (normal pressure);
Relative humidity: anode(H$_2$)-side 40% RH,
cathode(Air)-side 40% RH; and
Flow amount: anode-side 4 NL/min., cathode-side 4 NL/min.
Condition 2: Pressure: 102 kPa (normal pressure);
Relative humidity: anode(H$_2$)-side 100% RH,
cathode(Air)-side 100% RH; and
Flow amount: anode-side 4 NL/min., cathode-side 4 NL/min.

Results are shown in Table 8 described below.

TABLE 8

|  | Condition 1 | Condition 2 |
| --- | --- | --- |
| Example 2 | 359 mV | 476 mV |
| Comparative Example | 323 mV | 465 mV |

From these results, it was confirmed that a cell voltage during electricity generation at a high current density is improved by lowering the water transport resistance of the hydrophilic porous layer at the anode-side.

Example 2

Carbon powder (Ketchen black EC produced by Ketchen Black International Co., Ltd.) as the electrically conductive material and an ion conductive material dispersion liquid (Nafion (registered trade name) D2020, produced by Dupont) were mixed with each other so as to have a mass ratio (I/C ratio) of the carbon powder and the ion conductive material being 0.7. Further, a propylene glycol aqueous solution (50 volume %) was added so as to have a solid content rate of an ink (a rate of a solid content relative to a whole mass of the ink) being 12 mass %, thereby preparing a hydrophilic porous layer ink.

A catalyst ink was prepared as follows: Electrode catalyst powder (TEC10E50E produced by Tanaka Kikinzoku Kogyo K.K.) and an ion conductive material dispersion liquid (Nafion (registered trade name) D2020, produced by Dupont) were mixed with each other so as to have a mass ratio of an electrically conductive carrier and the ion conductive material being 0.9. Further, a propylene glycol aqueous solution (50 volume %) was added so as to have a solid content rate of the ink being 19 mass %.

Next, a hydrophilic porous layer was applied onto a polytetrafluoroethylene (PTFE) base material by a screen printing method so as to have a carbon carried amount of 0.3 mg·cm$^{-2}$. Thereafter, a heat treatment was made at 130° C. for 30 minutes in order to remove organic matters. A catalyst layer was applied onto the hydrophilic porous layer by a screen printing method so as to have a Pt carried amount of 0.05 mg·cm$^{-2}$. Thereafter, a heat treatment was again made at 130° C. for 30 minutes.

The catalyst layer produced as discussed above was transfer-printed on an electrolyte membrane (Nafion (registered trade name) NR211, produced by Dupont). The transfer-printing was carried out under the condition of 150° C., 10 minutes and 0.8 MPa.

A gas diffusion layer base material (TGP-H-030 produced by Toray Industries, Inc.) having a thickness of about 120 µm was put on the obtained catalyst layer and the hydrophilic porous layer. Then, a bearing pressure of 1 MPa was impressed on the gas diffusion layer base material at 25° C. with a separator formed of graphite and a gold-plated collector plate formed of copper so that fibers of the gas diffusion layer base material bites into the hydrophilic porous layer in order to obtain effects of the present invention.

EVALUATION (Evaluation of Sub-Zero Temperature Starting Ability)

A membrane electrode assembly using the gas diffusion layer produced as discussed above as an anode (fuel electrode) and using GDL24BC produced by SGL Carbon Japan Co., Ltd. as a cathode (air electrode) was assembled in a small-size single cell, thereby confirming a sub-zero temperature electricity generation performance. Specifically, first, nitrogen gas having a relative humidity of 60% was supplied to the both electrodes at 50° C. for 3 hours for the purpose of conditioning. Subsequently, the temperature of the small-size single cell was cooled to −20° C. over about 1 hour. After the temperature was sufficiently stable, dried hydrogen (1.0 NL/min) and dried air (1.0 NL/min) were initiated to be supplied to the respective electrodes. After lapse of 90 seconds, a load (current density: 40 mA/cm$^2$) was picked up in a moment. Produced water was frozen to lower a cell voltage because of being under a sub-zero temperature circumstance, upon which it was supposed that a gas phase drainage was higher as a time at which such a condition was reached was longer. Accordingly, a time of from the initiation of electricity generation to a cell voltage of 0.2 V being reached was measured. Results are shown in FIG. 8.

Figure 10:
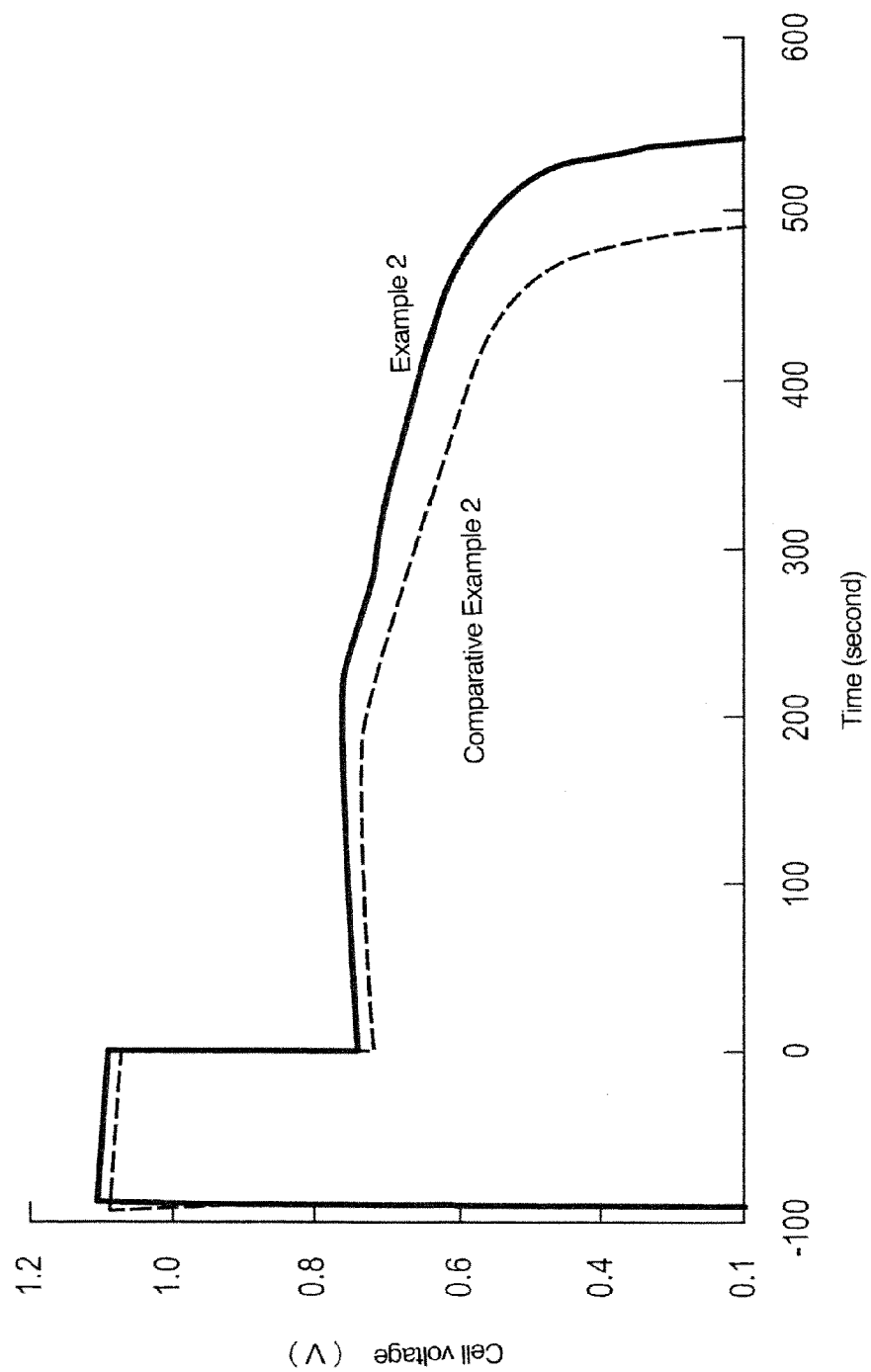
FIG. 10 is a graph in which sub-zero temperature electricity generation performances of cells produced respectively according to Example 2 and Comparative Example 2 were compared with each other.

As shown in FIG. 10, the time of from the initiation of electricity generation to the cell voltage of 0.2 V being reached was 543 seconds in case of the cell of Example 2, relative to 490 seconds in case of the cell of Comparative Example 2 using GDL24BC produced by SGL Carbon Japan Co., Ltd. as the gas diffusion layers of both electrodes. In other words, the cell of Example 2 was prolonged by 50 seconds or more in electricity generation capable time as compared with the cell of Comparative Example 2. Accordingly, according to the present invention, produced water can be effectively drained out of the membrane electrode assembly during a sub-zero temperature starting, thereby making it possible to suppress a voltage lowering of the cell for a further long time.

Example 3

As electrically conductive materials, Ketchen black EC (Ketchen Black International Co., Ltd.) and Ketchen black EC which had undergone a heat treatment (3000° C.) were prepared.

$S_{BET}$ and $\theta_{ion}$ of each electrically conductive material was calculated, in which Ketchen black EC had a $S_{BET}$: 718 m$^2$/g, a $\theta_{ion}$: 0.34 and an ion conductive cover area $S_{ion}$: 247 m$^2$/g; and Ketchen black EC which had undergone a heat treatment (3000° C.) had a $S_{BET}$: 151 m$^2$/g, a $\theta_{ion}$: 1.0 and an ion conductive cover area $S_{ion}$: 151 m$^2$/g. Ketchen black EC was used as the liquid water vaporization promoting material while Ketchen black EC which had undergone a heat treatment (3000° C.) was used as the liquid water transportation promoting material.

The electrically conductive material (the liquid water vaporization promoting material:the liquid water transportation promoting material=1:1 (mass ratio) and an ion conductive material dispersion liquid (Nafion (registered trade name) D2020, produced by Dupont: a mixture of Nafion and a solvent (water:NPA (normal propyl alcohol:propylene glycol=4:1:3 (mass ratio))) were mixed with each other so as to have a mass ratio (I/C ratio) of the electrically conductive material and the ion conductive material being 0.7. Further, a propylene glycol aqueous solution (50 volume %) was added so as to have a solid content rate (a rate of a solid content relative to a whole mass of the ink) of the ink being 12 mass %, thereby preparing a hydrophilic porous layer ink.

A catalyst ink was prepared as follows: Electrode catalyst powder (TEC10E50E produced by Tanaka Kikinzoku Kogyo K.K.) and an ion conductive material dispersion liquid (Nafion (registered trade name) D2020, produced by Dupont) were mixed with each other so as to have a mass ratio of a carbon carrier and the ion conductive material being 0.9. Further, a propylene glycol aqueous solution (50 volume %) was added so as to have a solid content rate of the ink being 19 mass %.

Next, a hydrophilic porous layer was applied onto a polytetrafluoroethylene (PTFE) base material by a screen printing method so as to have a carbon carried amount of about 0.3 mg·cm$^{-2}$. Thereafter, a heat treatment was made at 130° C. for 30 minutes in order to remove organic matters. A catalyst layer was applied onto the hydrophilic porous layer so as to have a Pt carried amount of 0.05 mg·cm$^{-2}$. Thereafter, a heat treatment was again made at 130° C. for 30 minutes.

The catalyst layer produced as discussed above was transfer-printed on an electrolyte membrane (Nafion (registered trade name) NR211, produced by Dupont). The transfer-printing was carried out under the condition of 150° C., 10 minutes and 0.8 MPa. A similar operation was made to the other side of the electrolyte membrane.

The obtained assembly was interposed between gas diffusion layers (TGP-H060 produced by Toray Industries, Inc.) to form a MEA. This was interposed between separators formed of graphite and further interposed between gold-plated collector plates formed of stainless steel, thereby to form a single cell.

5. Observation of Gas Diffusion Layer

Figure 23:
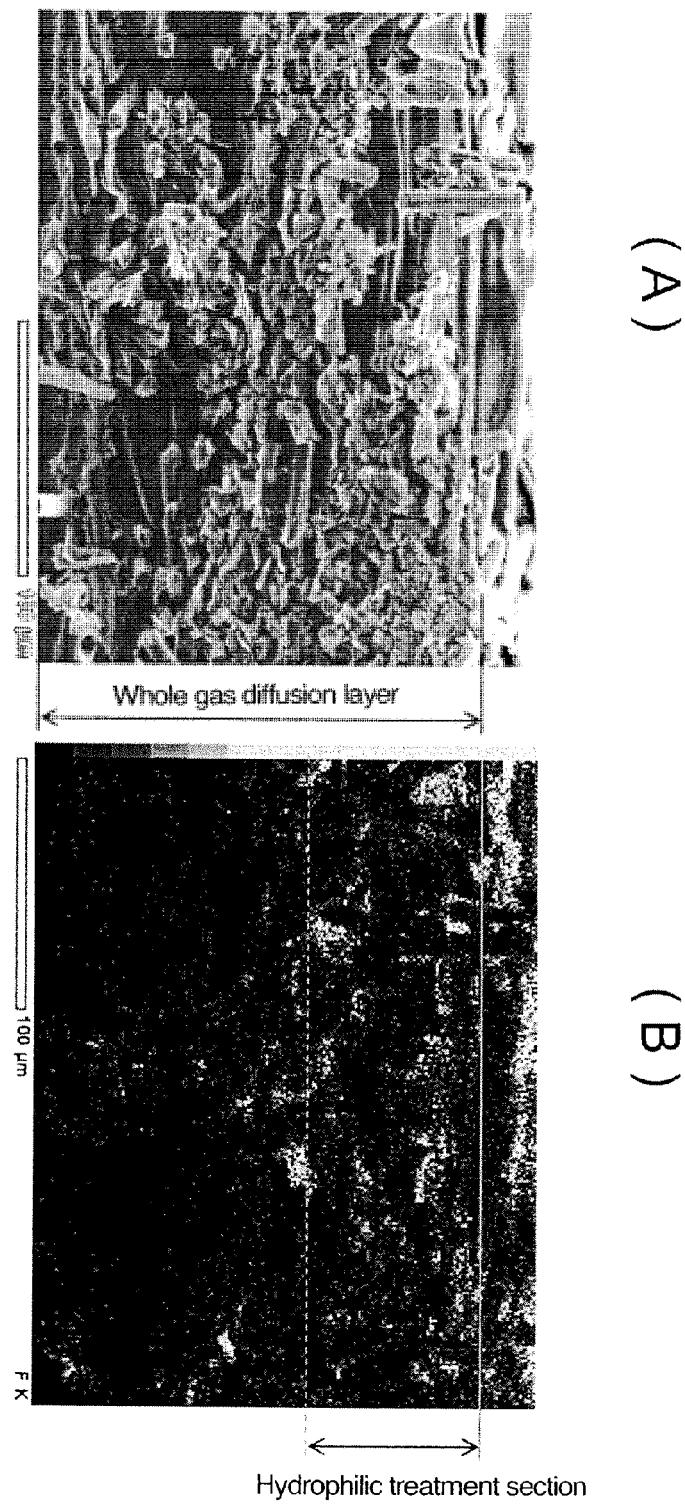
FIG. 23 includes views showing a result (A) of observation using a SEM (Scanning Electron Microscope) and a result (B) of analysis using an EPMA (Electron Probe Micro-Analyzer).

In order to confirm sites exhibiting a hydrophilicity or in order to confirm fluorine atoms of ionomers, the gas diffusion layer which had undergone a hydrophilic treatment by applying ionomers at its one surface was observed by using a SEM (Scanning Electron Microscope JSM-6380LA, produced by JEOL Ltd.) and analyzed by an EPMA (Electron Probe Micro-Analyzer). Results are shown in FIG. 23. (A) indicates an observation result by the SEM, and (B) indicates an observation result of the EPMA. According to the EPMA, a section located at an upper part of a photograph and light in color was a hydrophilic treatment section in which fluorine atoms were dispersed.

6. Sub-Zero Temperature Electricity Generation Test

A membrane electrode assembly using the gas diffusion layer prepared by providing a hydrophilic treatment section to a gas diffusion layer base material H-060 produced by Toray Industries, Inc. as an anode (fuel electrode) and using GDL24BC produced by SGL Carbon Japan Co., Ltd. as a cathode (air electrode) was assembled in a small-size single cell, thereby confirming a sub-zero electricity generation performance. Specifically, first, nitrogen gas having a relative humidity of 60% was supplied to the both electrodes at 50° C. for 3 hours for the purpose of conditioning. Subsequently, the temperature of the small-size single cell was cooled to −20° C. over about 1 hour. After the temperature was sufficiently stable, dried hydrogen (1.0 NL/min) and dried air (1.0 NL/min) were initiated to be supplied to the respective electrodes. After lapse of 90 seconds, a load (current density: 40 mA/cm$^2$) was picked up in a moment. Produced water was frozen to lower a cell voltage because of being under a sub-zero temperature circumstance, upon which it was supposed that a gas phase drainage of produced water was higher as a time at which such a condition was reached was longer. Accordingly, comparison was made on a time of from the initiation of electricity generation to a cell voltage of 0.2 V being reached. Results are shown in Table 9.

TABLE 9

|  | Comparative Example 3 | Example 3 |
|---|---|---|
| Electricity generation time | 175 seconds | 253 seconds |

As shown in Table 9, the time of from the initiation of electricity generation to the cell voltage of 0.2 V being reached was 253 seconds in case of the cell of Example 3, relative to 175 seconds in case of the cell using the above-mentioned gas diffusion layer to which the hydrophilic treatment of the present invention had not undergone, as the anode. In other words, the cell of Example 3 was prolonged by 70 seconds or more in electricity generation capable time as compared with the cell to which no hydrophilic treatment had been made. Accordingly, according to the present invention, produced water can be effectively drained out of the membrane electrode assembly during a sub-zero temperature starting, thereby making it possible to suppress a voltage lowering of the cell for a further long time.

EXPLANATION OF REFERENCE NUMERALS 10, 10a, 210, 240, 340, 410, 410', 510, 510' MEA,
11 anode,
12, 212, 312, 412, 512 solid polymer electrolyte membrane,
13, 313, 413, 513 anode-side electrode catalyst layer,
14, 314, 414, 514 anode-side gas diffusion layer,
15, 315, 415, 515 cathode-side electrode catalyst layer,
16, 316, 416, 516 cathode-side gas diffusion layer,
17, 217, 317, 417, 517 hydrophilic porous layer,
100, 300, 500 solid polymer electrolyte type fuel cell,
101, 301, 501 cathode-side separator,
102, 302, 502 anode-side separator,
103, 104, 303, 304, 503, 504 gas supply groove,
105, 305, 505 gasket,
213, 223, 313, 323 electrode catalyst layer,
214 gas diffusion layer,
215, 230 gas diffusion layer,
216 gas diffusion layer base material,
218, 218', 401 ion conductive material,
219 electrically conductive material,
219' electrically conductive carrier,
221 hydrophilic treatment section,
222 region in which hydrophilic porous layer is buried,
232 electrode catalyst,
402 liquid water evaporation promoting material,
403 liquid water transportation promoting material,
404 liquid water evaporation promoting material layer,
405 liquid water transportation promoting material layer,
418 water (liquid phase), and
419 water (vapor phase).

The invention claimed is:

1. A gas diffusion electrode for a fuel cell, comprising;
a hydrophilic porous layer including an electrically conductive material and an ion conductive material; and
a catalyst layer adjacent to the hydrophilic porous layer,
wherein a water transport resistance of the hydrophilic porous layer is smaller than a water transport resistance of the catalyst layer;
wherein the hydrophilic porous layer comprises a first electrically conductive material, a first ion conductive material covering a part of a surface of the first electrically conductive material, a second electrically conductive material, and a second ion conductive material covering a part of a surface of the second electrically conductive material; and
wherein the first electrically conductive material has a cover area of 200 to 1600 $m^2/g$ and the second electrically conductive material has a cover area of less than 200 $m^2/g$, a cover area being defined as an area of the part of the surface of the electrically conductive material covered by the ion conductive material and is given by $S_{ion}=S_{BET} \times \theta_{ion}$, where $S_{ion}$ is the cover area; $S_{BET}$ is a specific surface area of the electrically conductive material as measured by a BET nitrogen absorption method; and $\theta_{ion}$ is a covering ratio of the ion conductive material on the electrically conductive material.

2. A gas diffusion electrode as claimed in claim 1, wherein a layer containing the first electrically conductive material and a layer containing the second electrically conductive material are laminated in a thickness direction so as to form a stratified structure.

3. A gas diffusion electrode as claimed in claim 1, wherein particles of the first electrically conductive material and particles of the second electrically conductive material exist in a mixed state in the hydrophilic porous layer.

4. A membrane electrode assembly for a fuel cell, comprising a gas diffusion electrode as claimed in claim 1.

5. A membrane electrode assembly for a fuel cell, as claimed in claim 4, wherein the hydrophilic porous layer is disposed between the electrode catalyst layer and a gas diffusion layer.

6. A membrane electrode assembly for a fuel cell, as claimed in claim 4, wherein the hydrophilic porous layer is disposed in at least an anode electrode.

7. A membrane electrode assembly for a fuel cell, as claimed in claim 4, wherein a section of the hydrophilic porous layer opposite to a cathode gas outlet has a structure sparser than that of a section of the hydrophilic porous layer opposite to a cathode gas inlet.

8. A membrane electrode assembly for a fuel cell, as claimed in claim 4, wherein the section of the hydrophilic porous layer opposite to the cathode gas outlet contains the first electrically conductive material in an amount more than that of the second electrically conductive material.

9. A membrane electrode assembly for a fuel cell, as claimed in claim 4, wherein the section of the hydrophilic porous layer opposite to the cathode gas outlet contains the second electrically conductive material in an amount more than that of the first electrically conductive material.

10. A fuel cell which uses the membrane electrode assembly for a fuel cell as claimed in claim 4.

11. A vehicle on which the fuel cell as claimed in claim 10 is mounted.

12. A method of producing the gas diffusion electrode as claimed in claim 1, comprising the step of forming a stratified structure by using an ink containing the first electrically conductive material and an ink containing the second electrically conductive material, and the step of making a heat treatment.

13. A method of producing the gas diffusion electrode as claimed in claim 1, comprising the step of producing the hydrophilic porous layer by using an ink containing the first electrically conductive material and the second electrically conductive material.

14. A method of producing the membrane electrode assembly for a fuel cell as claimed in claim 5, comprising
the step of uniting the catalyst layer and the hydrophilic porous layer, and
the subsequent step of uniting the gas diffusion layer on an opposite side of the hydrophilic porous layer with respect to the catalyst layer.

15. A method of producing the membrane electrode assembly for a fuel cell as claimed in claim 4, wherein the sparser structure of the hydrophilic porous layer is formed by using an ink containing a solvent mixed with a high boiling point organic solvent having a boiling point exceeding 150° C.

16. A gas diffusion electrode comprising:
a gas diffusion layer including a porous gas diffusion layer base material;
a hydrophilic porous layer including an electrically conductive material and an ion conductive material, adjacent to the gas diffusion layer;
a catalyst layer adjacent to the hydrophilic porous layer,
wherein a surface of the gas diffusion layer base material, on a side of the hydrophilic porous layer has undergone a hydrophilic treatment, and the other surface of the gas diffusion layer base material having not undergone a hydrophilic treatment, wherein a water transport resistance of the hydrophilic porous layer is smaller than a water transport resistance of the catalyst layer, wherein the hydrophilic porous layer comprises a first electrically conductive material, a first ion conductive material covering a part of a surface of the first electrically conductive material, a second electrically conductive material, and a second ion conductive material covering a part of a surface of the second electrically conductive material, and wherein the first electrically conductive material has a cover area of 200 to 1600 m²/g and the second electrically conductive material has a cover area of less than 200 m²/g, a cover area being defined as an area of the part of the surface of the electrically conductive material covered by the ion conductive material and is given by $S_{ion}=S_{BET}\times\theta_{ion}$, where $S_{ion}$ is the cover area; $S_{BET}$ is a specific surface area of the electrically conductive material as measured by a BET nitrogen absorption method; and $\theta_{ion}$ is a covering ratio of the ion conductive material on the electrically conductive material.

17. A gas diffusion electrode as claimed in claim 16, wherein a porosity of the hydrophilic porous layer is larger than a porosity of the catalyst layer.

18. A gas diffusion electrode as claimed in claim 16, wherein the specific surface area of the electrically conductive material included in the hydrophilic porous layer as measured by the BET nitrogen absorption method is smaller than a specific surface area of an electrode catalyst contained in the catalyst layer as measured by the BET nitrogen absorption method.

19. A gas diffusion electrode as claimed in claim 16, wherein the hydrophilic porous layer is smaller in thickness than the catalyst layer.

20. A gas diffusion electrode as claimed in claim 16, wherein an effective diffusion coefficient D (m²/s) of water vapor in the gas diffusion layer base material satisfies the following equation at 1 atm and at −20° C.:

$$D \geq 2.0\times10^{-5}\times\epsilon\epsilon^{\gamma}$$

where $\epsilon$ is a porosity of the gas diffusion layer base material; and $\gamma$ is an inflection degree of the gas diffusion layer base material.

21. A gas diffusion electrode as claimed in claim 16, wherein minimum pore diameter of pores in the gas diffusion layer base material is not smaller than 1 μm.

22. A gas diffusion electrode as claimed in claim 16, wherein the surface undergone the hydrophilic treatment includes at least one selected from the group consisting of an ion conductive material, a metal oxide and a hydrophilic polymer.

23. A gas diffusion electrode as claimed in claim 16, wherein the catalyst layer includes an ion conductive material and an electrically conductive carrier carrying a catalyst component, the catalyst layer having a structure for forming a continuous transportation path for liquid water under adhesion of the ion conductive material and the ion conductive material with each other.

24. A gas diffusion electrode as claimed in claim 23, wherein the electrically conductive carrier is a graphitized carbon material.

25. A gas diffusion electrode as claimed in claim 16, wherein EW of the ion conductive material is not higher than 1000 g/eq.

26. A membrane electrode assembly comprising the gas diffusion electrode as claimed in claim 16.

27. A membrane electrode assembly as claimed in claim 26, wherein the gas diffusion layer is disposed in at least an anode electrode.

28. A fuel cell using a membrane electrode assembly as claimed in claim 26.

29. A vehicle on which a fuel cell as claimed in claim 28 is mounted.

30. A method of producing a gas diffusion layer as claimed in claim 16, comprising a step of previously combining the catalyst layer and the hydrophilic porous layer.

31. A method of producing a gas diffusion electrode as claimed in claim 16, comprising:
the step of applying a solution containing a hydrophilic agent onto a surface of a gas diffusion layer base material; and
the step of further applying an ink for a hydrophilic porous layer containing an electrically conductive material, an ion conductive material and a solvent before the solution is dried, and then making a drying.

32. A method of producing a membrane electrode assembly as claimed in claim 26, comprising:
the step of applying a catalyst ink containing an electrode catalyst, an ion conductive material and a solvent, onto an electrolyte membrane;
the step of further applying a hydrophilic porous layer slurry containing an electrically conductive material, an ion conductive material and a solvent; and
the step of placing a surface of a gas diffusion layer base material to which a solution containing a hydrophilic agent is applied, onto a surface to which the hydrophilic porous layer slurry is applied, and making a hot press, wherein these respective steps are successively carried out.

* * * * *